(12) United States Patent
Luo

(10) Patent No.: US 11,569,851 B2
(45) Date of Patent: Jan. 31, 2023

(54) SELF INTERFERENCE NOISE CANCELLATION TO SUPPORT MULTIPLE FREQUENCY BANDS WITH NEURAL NETWORKS OR RECURRENT NEURAL NETWORKS

(71) Applicant: MICRON TECHNOLOGY, INC., Boise, ID (US)

(72) Inventor: Fa-Long Luo, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/647,640

(22) Filed: Jan. 11, 2022

(65) Prior Publication Data

US 2022/0140850 A1   May 5, 2022

Related U.S. Application Data

(62) Division of application No. 16/848,514, filed on Apr. 14, 2020, now Pat. No. 11,258,473.

(51) Int. Cl.
*H04B 1/10* (2006.01)
*G06N 3/04* (2006.01)
*H04B 7/0413* (2017.01)

(52) U.S. Cl.
CPC .............. *H04B 1/10* (2013.01); *G06N 3/0445* (2013.01); *H04B 7/0413* (2013.01)

(58) Field of Classification Search
CPC .......... H04B 1/10; H04B 1/12; H04B 7/0413; G06N 3/0445
See application file for complete search history.

(56) References Cited

U.S. PATENT DOCUMENTS 5,377,108 A   12/1994   Nishio
6,199,057 B1   3/2001   Tawel
(Continued)

FOREIGN PATENT DOCUMENTS

CN   101547021 A   9/2009
CN   101563851 A   10/2009
(Continued)

OTHER PUBLICATIONS

US 11,088,716 B2, 08/2021, Luo et al. (withdrawn)
(Continued)

*Primary Examiner* — Thanh C Le
(74) *Attorney, Agent, or Firm* — Dorsey & Whitney LLP

(57) ABSTRACT

Examples described herein include systems and methods which include wireless devices and systems with examples of multiple frequency bands transmission with a recurrent neural network that compensates for the self-interference noise generated by power amplifiers at harmonic frequencies of a respective wireless receiver. The recurrent neural network may be coupled to antennas of a wireless device and configured to generate the adjusted signals that compensate self-interference. The recurrent neural network may include a network of processing elements configured to combine transmission signals into sets of intermediate results. Each set of intermediate results may be summed in the recurrent neural network to generate a corresponding adjusted signal. The adjusted signal is receivable by a corresponding wireless receiver to compensate for the self-interference noise generated by a wireless transmitter transmitting on the same or different frequency band as the wireless receiver is receiving.

18 Claims, 19 Drawing Sheets

(56) References Cited

U.S. PATENT DOCUMENTS

| | | |
|---|---|---|
| 6,515,978 B1 | 2/2003 | Buehrer et al. |
| 6,765,495 B1 | 7/2004 | Dunning et al. |
| 7,965,990 B2 | 6/2011 | Luz et al. |
| 9,147,353 B1 | 9/2015 | Slusar |
| 9,172,441 B2 | 10/2015 | Granger-Jones et al. |
| 9,391,680 B2 | 7/2016 | Le-Ngoc et al. |
| 9,467,220 B2 | 10/2016 | Walsh et al. |
| 10,050,663 B1 | 8/2018 | Ku et al. |
| 10,070,432 B1 | 9/2018 | Luo et al. |
| 10,142,137 B2 | 11/2018 | Luo et al. |
| 10,185,998 B1 | 1/2019 | Konrardy et al. |
| 10,554,375 B2 | 2/2020 | Luo et al. |
| 10,778,403 B2 | 9/2020 | Luo et al. |
| 10,805,128 B2 | 10/2020 | Luo et al. |
| 10,880,132 B1 | 12/2020 | Mirfakhraei et al. |
| 10,924,139 B2 | 2/2021 | Cong et al. |
| 10,972,139 B1 | 4/2021 | Luo |
| 10,979,097 B2 | 4/2021 | Luo |
| 11,206,050 B2 | 12/2021 | Luo et al. |
| 11,258,473 B2 | 2/2022 | Luo |
| 11,387,976 B2 | 7/2022 | Luo et al. |
| 2002/0155821 A1 | 10/2002 | Louis et al. |
| 2005/0060069 A1 | 3/2005 | Breed et al. |
| 2005/0078615 A1 | 4/2005 | Muri |
| 2006/0162985 A1 | 7/2006 | Tanaka et al. |
| 2007/0160014 A1 | 7/2007 | Larsson |
| 2008/0117411 A1 | 5/2008 | Vuong et al. |
| 2009/0180404 A1 | 7/2009 | Jung et al. |
| 2009/0233555 A1 | 9/2009 | Nakamura |
| 2009/0316842 A1 | 12/2009 | Lu et al. |
| 2010/0027688 A1 | 2/2010 | Suh et al. |
| 2010/0191391 A1 | 7/2010 | Zeng |
| 2011/0106442 A1 | 5/2011 | Desai et al. |
| 2011/0171922 A1 | 7/2011 | Kim et al. |
| 2011/0216662 A1 | 9/2011 | Nie et al. |
| 2012/0170619 A1 | 7/2012 | Chang et al. |
| 2012/0300680 A1 | 11/2012 | Pietsch et al. |
| 2013/0044791 A1 | 2/2013 | Rimini et al. |
| 2013/0158852 A1 | 6/2013 | Stahlin et al. |
| 2014/0003264 A1 | 1/2014 | Shin |
| 2014/0056229 A1 | 2/2014 | Li et al. |
| 2014/0169236 A1 | 6/2014 | Choi et al. |
| 2014/0219139 A1 | 8/2014 | Choi et al. |
| 2015/0018043 A1 | 1/2015 | Taniuchi et al. |
| 2015/0043323 A1 | 2/2015 | Choi et al. |
| 2015/0055568 A1 | 2/2015 | Jindal et al. |
| 2015/0085944 A1 | 3/2015 | Mobasher et al. |
| 2015/0139347 A1 | 5/2015 | Murch et al. |
| 2015/0140926 A1 | 5/2015 | Fujio et al. |
| 2015/0244436 A1 | 8/2015 | Le-Ngoc et al. |
| 2016/0036504 A1 | 2/2016 | Khojastepour et al. |
| 2016/0036582 A1 | 2/2016 | Jana et al. |
| 2016/0100415 A1 | 4/2016 | Mishra et al. |
| 2016/0226535 A1 | 8/2016 | Choi et al. |
| 2016/0226653 A1 | 8/2016 | Bharadia et al. |
| 2016/0233903 A1 | 8/2016 | Wu et al. |
| 2017/0061625 A1 | 3/2017 | Estrada et al. |
| 2017/0091953 A1 | 3/2017 | Bleiweiss et al. |
| 2017/0104576 A1 | 4/2017 | Liu et al. |
| 2017/0131719 A1 | 5/2017 | Micks et al. |
| 2017/0150481 A1 | 5/2017 | Gupta et al. |
| 2017/0188264 A1 | 6/2017 | Hwang et al. |
| 2017/0237547 A1 | 8/2017 | Eltawil et al. |
| 2017/0257180 A1 | 9/2017 | Aggarwal et al. |
| 2017/0273090 A1 | 9/2017 | Jung et al. |
| 2017/0303285 A1 | 10/2017 | Kenney et al. |
| 2018/0006690 A1 | 1/2018 | Shepard et al. |
| 2018/0006794 A1 | 1/2018 | Lee et al. |
| 2018/0048339 A1 | 2/2018 | Wu et al. |
| 2018/0076947 A1 | 3/2018 | Kazakevich et al. |
| 2018/0123683 A1 | 5/2018 | Wakabayashi et al. |
| 2018/0152330 A1 | 5/2018 | Chritz et al. |
| 2018/0206176 A1 | 7/2018 | Panteleev et al. |
| 2018/0254930 A1 | 9/2018 | Luo et al. |
| 2018/0278290 A1 | 9/2018 | Moorti et al. |
| 2018/0302048 A1 | 10/2018 | Donoghue et al. |
| 2018/0309526 A1 | 10/2018 | Zhang et al. |
| 2018/0315157 A1 | 11/2018 | Ould-Ahmed-Vall et al. |
| 2018/0367192 A1 | 12/2018 | O'Shea et al. |
| 2019/0007242 A1 | 1/2019 | Luo et al. |
| 2019/0020381 A1 | 1/2019 | Tooher et al. |
| 2019/0027824 A1 | 1/2019 | Pajona et al. |
| 2019/0028260 A1 | 1/2019 | Karlsson et al. |
| 2019/0065945 A1 | 2/2019 | Luo et al. |
| 2019/0065951 A1 | 2/2019 | Luo et al. |
| 2019/0081766 A1 | 3/2019 | Luo et al. |
| 2019/0081767 A1 | 3/2019 | Luo et al. |
| 2019/0123442 A1 | 4/2019 | Vannucci et al. |
| 2019/0229884 A1 | 7/2019 | Xue et al. |
| 2019/0245565 A1 | 8/2019 | Luo et al. |
| 2019/0245566 A1 | 8/2019 | Luo et al. |
| 2019/0325928 A1 | 10/2019 | Jain et al. |
| 2019/0393948 A1 | 12/2019 | Zhao et al. |
| 2020/0127803 A1 | 4/2020 | Luo et al. |
| 2020/0196326 A1 | 6/2020 | Li et al. |
| 2020/0205156 A1 | 6/2020 | Adjakple et al. |
| 2020/0205230 A1 | 6/2020 | Haustein et al. |
| 2020/0358177 A1 | 11/2020 | Ge et al. |
| 2020/0366538 A1 | 11/2020 | Luo et al. |
| 2020/0405204 A1 | 12/2020 | Howard |
| 2020/0412518 A1 | 12/2020 | Luo et al. |
| 2021/0075464 A1* | 3/2021 | Luo .................. H04L 25/0254 |
| 2021/0258038 A1 | 8/2021 | Luo |
| 2021/0275050 A1 | 9/2021 | Ren et al. |
| 2021/0320678 A1 | 10/2021 | Luo |
| 2022/0108157 A1* | 4/2022 | Hunter ................ G06N 3/0454 |
| 2022/0116130 A1* | 4/2022 | Elmaghbub ........ H04B 17/3913 |
| 2022/0217724 A1* | 7/2022 | Pezeshki .............. H04L 5/0048 |

FOREIGN PATENT DOCUMENTS

| | | |
|---|---|---|
| CN | 104052529 A | 9/2014 |
| CN | 104468055 A | 3/2015 |
| CN | 104539341 A | 4/2015 |
| CN | 105075157 A | 11/2015 |
| CN | 105594131 A | 5/2016 |
| CN | 105934889 A | 9/2016 |
| CN | 106301419 A | 1/2017 |
| CN | 107124245 A | 9/2017 |
| CN | 110383720 A | 10/2019 |
| DE | 102015015021 A1 | 5/2016 |
| EP | 1164758 A2 | 12/2001 |
| EP | 3075095 A1 | 10/2016 |
| JP | 2016529837 A | 9/2016 |
| JP | 2016225908 A | 12/2016 |
| KR | 20070116736 A | 12/2007 |
| KR | 20100095650 A | 8/2010 |
| KR | 20130132817 A | 12/2013 |
| KR | 20160090372 A | 7/2016 |
| KR | 20160127099 A | 11/2016 |
| KR | 20160146655 A | 12/2016 |
| KR | 20190091818 A | 8/2019 |
| WO | 2004095625 A2 | 11/2004 |
| WO | 2016111638 A1 | 7/2016 |
| WO | 2016154219 A1 | 9/2016 |
| WO | 2017026970 A1 | 2/2017 |
| WO | 2017069300 A1 | 4/2017 |
| WO | 2017121487 A1 | 7/2017 |
| WO | 2018160664 A1 | 9/2018 |
| WO | 2019046103 A1 | 3/2019 |
| WO | 2019050980 A1 | 3/2019 |
| WO | 2019148106 A1 | 8/2019 |
| WO | 2019156820 A1 | 8/2019 |
| WO | 2021211560 | 10/2021 |

OTHER PUBLICATIONS

US 11,424,969 B2, 08/2022, Luo et al. (withdrawn)
U.S. Con U.S. Appl. No. 17/811,472 titled "Full Duplex Device-To-Device Cooperative Communication" filed Jul. 8, 2022, pp. all pages of application as filed.
E. Lee and H. Yeo; "A Study On the Rear-End Collision Warning System By Considering Different Perception-Reaction Time Using

(56) References Cited

OTHER PUBLICATIONS

Multi-Layer Perception Neural Network"; 2015 IEEE Intelligent Vehicles Symposium (IV); Jun. 28-Jul. 1, 2015; COEX, Seoul, Korea, pp. all.
U.S. Appl. No. 16/718,930 titled "Full Duplex Device-To-Device Cooperation Communication", filed Dec. 18, 2019; pp. all pages of application as filed.
U.S. Appl. No. 17/018,256 titled "Full Duplex Device-To-Device Cooperative Communication" filed Sep. 11, 2020; pp. all pages of application as filed.
U.S. Appl. No. 16/561,868 titled "Wireless Devices and Systems Including Examples of Full Duplex Transmission Using Neural Networks or Recurrent Neural Networks" filed Sep. 5, 2019; pp. all pages of application as filed.
U.S. Appl. No. 16/848,514 titled "Self Interference Noise Cancellation To Support Multiple Frequency Bands With Neural Networks or Recurrent Neural Networks" filed Apr. 14, 2020 pp. all pages of application as filed.
International Search Report and Written Opinion for PCT Application No. PCT/US2021/027053, dated Aug. 4, 2021; pp. all pages of application as filed.
U.S. Appl. No. 17/224,962 titled "Wireless Devices and Systems Including Examples of Full Duplex Transmission Using Neural Networks or Recurrent Neural Networks" filed Apr. 7, 2021; pp. all pages of application as filed.
U.S. Appl. No. 16/983,797 titled "Wireless Devices and Systems Including Examples of Full Duplex Transmission" filed Aug. 3, 2020; pp. all pages of application as filed.
U.S. Appl. No. 15/890,275 entitled "Self Interference Noise Cancellation To Support Multiple Frequency Bands" filed Feb. 6, 2018; pp. all pages of application as filed.
U.S. Appl. No. 16/114,923 titled "Cooperative Learning Neural Networksand Systems" filed Aug. 28, 2018; pp. all pages of application as filed.
U.S. Appl. No. 16/116,365 titled "Full Duplex Device-To-Device Cooperative Communication" filed Aug. 29, 2018; pp. all pages of application as filed.
U.S. Appl. No. 15/693,142, entitled "Cooperative Learning Neural Networks and Systems", filed Aug. 31, 2017, pp. all pages of application as filed.
U.S. Appl. No. 15/701,007 entitled "Full Duplex Device-To-Device Cooperative Communication" filed Sep. 11, 2017, pp. all pages of application as filed.
U.S. Appl. No. 16/105,915 titled "Wireless Devices and Systems Including Examples of Full Duplex Transmission", filed Aug. 20, 2018, pp. all pages of application as filed.
U.S. Appl. No. 16/113,995 titled "Self Interference Noise Cancellation To Support Multiple Frequency Bands"; filed Aug. 27, 2018, pp. all pages of application as filed.
U.S. Appl. No. 15/447,731 entitled "Wireless Devicesand Systems Including Examples of Full Duplex Transmission", filed Mar. 2, 2017, pp. all pages of application as filed.
Anttila, Lauri , et al., "Modeling and Efficient Cancellation of Nonlinear Self-Interference in MIMO Full-Duplex Transceivers", IEEE, Oct. 2014, 7 pgs.
Anttila, Lauri , et al., "Modeling and Efficient Cancellation of Nonlinear Self-Interference in MIMO Full-Duplex Transceivers", IEEE Globecom Workshops, Dec. 2014, 7 pgs.
Chang, Bao Rong, et al., "Intelligent Data Fusion System for Predicting Vehicle Collision Warning Using Vision/GPS Sensing"; Expert Systems with Applications 37 (2010) 2439-2450; Mar. 2010; pp. 1-12.
Chang, Bao Rong , et al., "Simulation for Implementation of High-Performance Collision Warning System for Motor Behicle Safety Using Embedded Anfis Prediction"; 3rd International Conference on Innovative Computing Information and Control (ICICIC '08); IEEE; 2008; pp. all.
Chen Chen, et al., "A rear-end collision prediction scheme based on deep learning in the Internet of Vehicles"; J. Parallel Distribut. Comput.; Elsevier, 2017, pp. all.
Geevarghese, Biju , et al., "CDMA Interferance Cancellation Techniques Using Neural Networks in Rayleigh Channels", IEEE: International Conference on Information Communication and Embedded Systems (ICICES), Feb. 2013, 5 pgs.
Kang Min-Joo, et al., "Intrusion Detection System Using Deep Neural Network for In-Vehicle Network Security" Research Article; The Department of Electronics Engineering, Ewha W. University, Seoul, Republic of Korea, Jun. 7, 2016, pp. all.
Zhang, Zhongshan , et al., "Full Duplex Techniquest for 5G Networks: Self-Interference Cancellation, Protocol Design, and Relay Selection", IEEE Communications Magazine, May 2015, 10 pgs.
Kehtarnavaz, Nasser , "A Transportable Neural-Network Approach To Autonomous Vehicle Following", IEEE Transactions on Vehicular Technology, vol. 47, No. 2, May 1998; pp. all.
Kim, Seunghyeon , et al., "Transfer Learning for Automated Optical Inspection"; 2017 International Conference on Neural Networks (IJCNN), Jul. 3, 2017; pp. all.
Kristensen, Toftegaard Andreas, et al., "Advanced Machine Learning Techniques for Selfinterference Cancellation in Full-Duplex Radios", 53rd Asilomar Conference on Signals, Systems, and Computers, Date of Conference: Nov. 3-6, 2019, pp. 1-5.
Sulaiman, Ahmed , et al., "Elman Recurrent Neural Network Application in Adaptive Beamforming of Smart Antenna System", International Journal of Computer Applications (0975-8887), vol. 129, No. 11, Nov. 2015, pp. 38-43.
Tarver, Chance , et al., "Neural Network DPD Via Backpropagation Through Neural Network Model of the PA", 53rd Asilomar Conference on Signals, Systems, and Computers, Date of Conference Nov. 3-6, 2019, pp. 1-5 and figure 4.
Wang, Li , "Exploiting Full Duplex for Device-To-Device Communications in Heterogeneous Networks", IEEE Communications Magazine, May 2015; pp. all.
Young, Chung-Ping , et al., "Highway Vehicle Accident Reconstruction Using Cooperative Collision Warning Based Motor Vehicle Event Data Recorder"; IEEE, 2009, pp. all.
Campolo, Claudia , et al., "Full-Deplex Radios for Vehicular Communications", IEEE Communications Magazine, Jun. 2017; pp. all.
Tran , et al., "On the Performance of Distributed Space-Time Coded Cooperative Relay Networks Based On Inter-Relay Communications", Eurasip Journal on Wireless Communications and Networking, Oct. 2013; pp. all.
Wang, Li, et al., "Exploiting Full Duplex for Device-To-Device Communications in Heterogeneous Networks", IEEE Communications Magazine, May 2015; pp. all.
U.S. Appl. No. 17/821,419, titled, "Wireless Devices and Systems Including Examples of Full Duplex Transmission," filed Aug. 22, 2022, pp. all pages of application as filed.
Linsen Chong et al. "A Rule-Based Neural Network Approach to Model Driver Naturalistic Behavior in Traffic" Transportation Research Part C; www.elsevier.com/locate/trc; vol. 32, Jul. 2013, pp. 207-223.

* cited by examiner

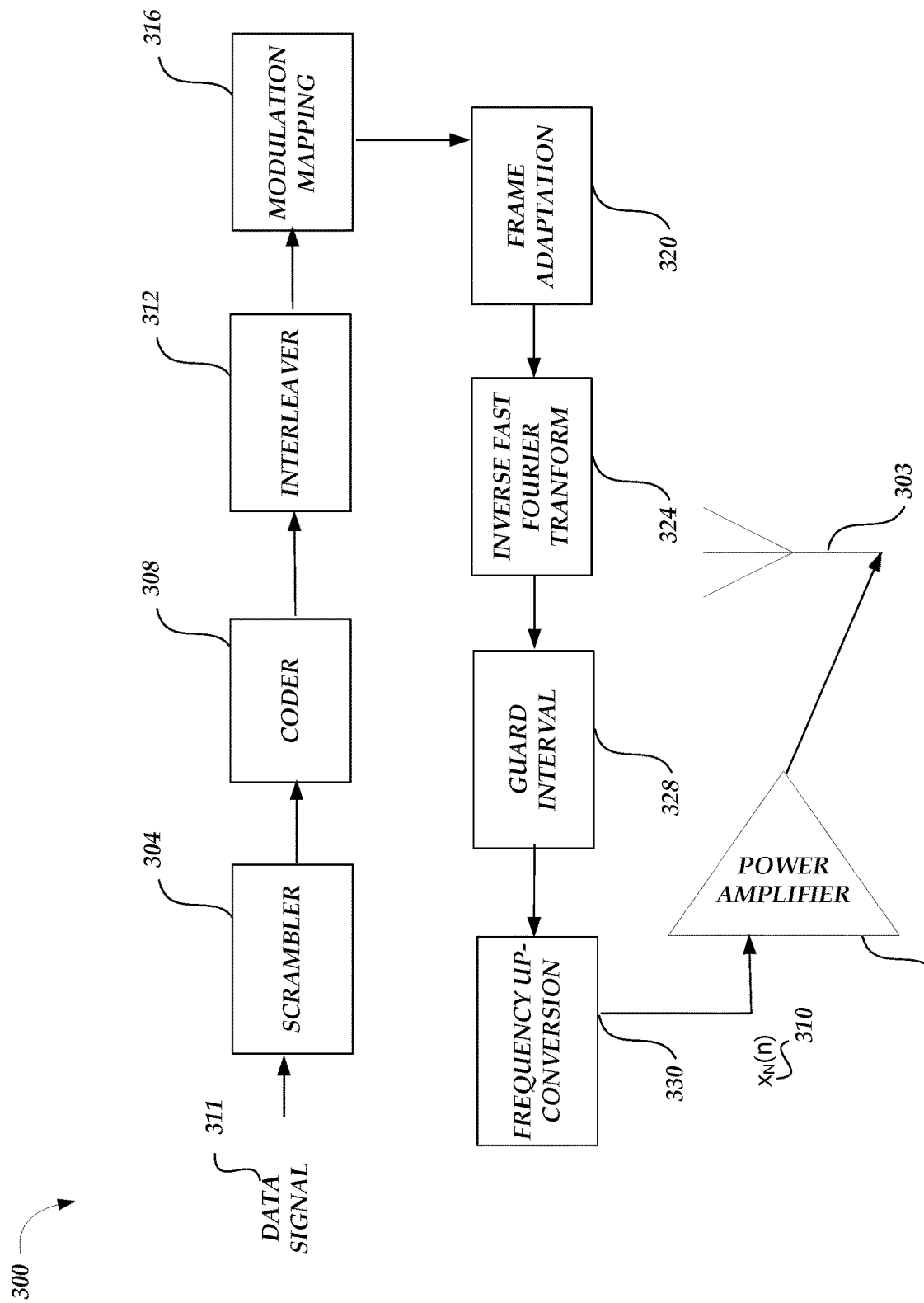

SELF INTERFERENCE NOISE CANCELLATION TO SUPPORT MULTIPLE FREQUENCY BANDS WITH NEURAL NETWORKS OR RECURRENT NEURAL NETWORKS

CROSS REFERENCE TO RELATED APPLICATION(S)

This application is a divisional of pending U.S. patent application Ser. No. 16/848,514 filed Apr. 14, 2020. The aforementioned application is incorporated herein by reference, in its entirety, for any purpose.

BACKGROUND

There is a need for wireless communication systems to support "fifth generation" (5G) systems, with some wireless communication systems already implementing specific 5G protocols (e.g., a protocol to operate at 3.5 GHz). Such 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

Moreover, machine learning (ML) and artificial intelligence (AI) techniques are in need of higher-capacity and widely-connected infrastructures to train devices that use such techniques. For example, machine learning is a type of AI that uses data sets, often a large volume of data, to train machines on statistical methods of analysis. And there is need for higher-capacity memory and multichip packages to facilitate AI training and inference engines, whether in the cloud or embedded in mobile and edge devices. For example, large volumes of data are needed in real-time to train AI systems and accelerate inference. Additionally, there is a need for communication capacity at mobile or sensor devices at the edge network, for example, to facilitate processing of data acquired at the edge network, e.g., to efficiently offload such data to a data center for AI or ML techniques to be applied.

BRIEF DESCRIPTION OF THE DRAWINGS

FIG. 3 is a schematic illustration of a wireless transmitter.

DETAILED DESCRIPTION

Figure 1:
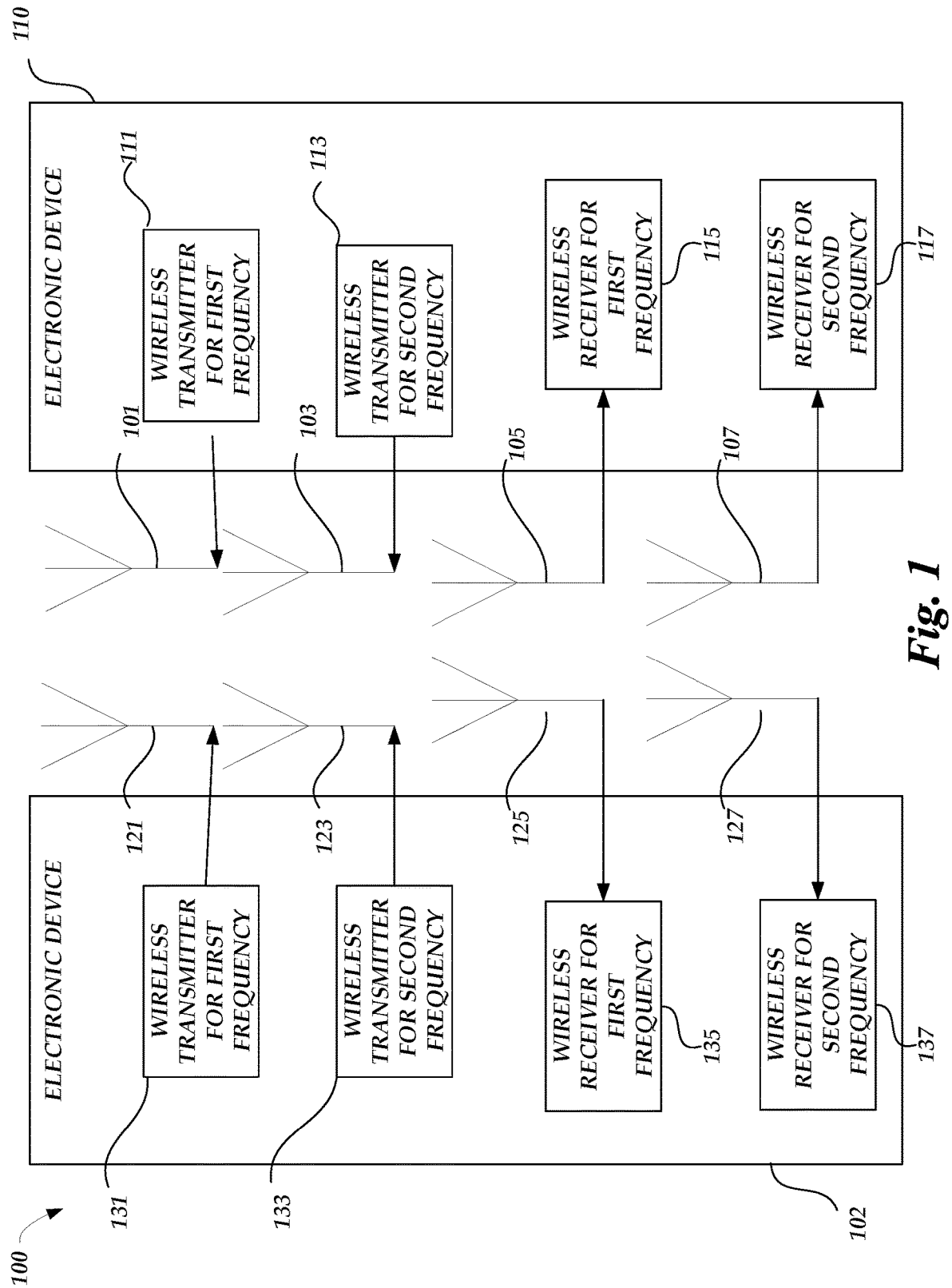
FIG. 1 is a schematic illustration of a system arranged in accordance with examples described herein.

Full duplex communication may be desirable for a variety of devices. Full duplex communication generally may refer to an ability to both send and receive transmissions, in some cases simultaneously and/or partially simultaneously. In examples of systems employing full duplex communication, it may be desirable to cancel the interference generated by antennas or nonlinear power amplifiers in the system, e.g., self-interference. Moreover, full duplex communication may be desirable on devices that employ multiple frequency bands, including separate frequency bands for different communication protocols.

Different communication protocols may exist for varying generations of wireless devices. For example, a wireless device may include a transceiver system for 5G wireless communications intended to transmit and receive at 3.5 GHz (e.g., referred to as the New Radio (NR) Band), and another transceiver system for 4G wireless communications intended to transmit and receive at 1.8 GHz (e.g., referred to as the Long-Term Evolution (LTE) band). In some implementations, such transceiver systems that operate wholly on a specific generational system may be referred to as a standalone system. For example, a 5G wireless system, including various 5G devices such as 5G Internet of Things ("IoT") wireless sensor devices, to communicate data to a data center may be referred to as a 5G standalone system. Such a 5G standalone system may still experience effects of interference, for example, from a 4G standalone system that operates on a different frequency band, which may generate interfering frequencies that interfere with communicated signals transmitted or received via the 5G standalone system, e.g., when communicating data to the data center. Accordingly, a wireless device that may communicate using either the 4G or 5G bands may create self-interference on one of the bands. Accordingly, there is a need to compensate for such self-interference in an efficient and timely manner such that a standalone system may operate on the wireless device in a network that may experience the effects of interference from a different standalone system of another wireless device or another standalone system on the wireless device itself. As described herein, a recurrent neural network may be used compensate for such interference using, in part, higher-order memory effects that model the effects of leading and lagging envelopes of self-interference signals.

Moreover, such 5G standalone systems may be preferable to operate in a remote setting, e.g., not near a city with a wireless metropolitan access network (MAN)). Such 5G systems can operate over greater distances (e.g., 1 km, 5 km, 50 km, 500 km, or 5000 km); in contrast to a metropolitan-geographic area, which may be restricted to smaller distances (e.g., 10 m, 100 m, 1 km, or 5 km). Accordingly, a 5G transceiver system may need to communicate long distances in an environment with various degrading environmental effects. Therefore, the 5G systems and devices described herein can communicate data in wireless environments that experience effects of weather conditions over great distances and/or other environmental effects to the wireless environment.

On top of the challenges of environmental effects and distance, the transceiver system may experience interference. For example, in contrast to a conventional wireless MAN system that may have a line-of-sight (LOS) with a wireless subscriber, a 5G wireless system may include a data center communicating with a remote agricultural device that is experiencing cloudy weather in a temperate environment (e.g., the Puget Sound region). As such, the remote agricultural device may not have a direct LOS with the data center because the LOS is occluded by clouds or other environmental factors. In such a case, examples described herein may compensate for interference generated by other antennas or nonlinear power amplifiers co-located on the same physical device or system; as well as compensating for the environmental effects that a 5G communication signal may experience due to its communication path over a greater distance than that of a wireless MAN.

Examples described herein may compensate for interference generated by other antennas co-located on the same physical device or system (e.g., interference created by an antenna on a MIMO device). For example, a transmitting antenna may generate interference for nearby receiving antennas, including one or more antennas which may be co-located on a same physical device or system. The transmitting antenna may generate energy at the transmitting frequency and also at harmonics of the transmitting frequency. Accordingly, receiving systems sensitive to the transmitting frequency or harmonics of the transmitting frequency may be particularly susceptible to interference from the transmitting antenna in some examples.

Moreover, nonlinear power amplifiers, which are frequently employed in transmitters and/or transceivers of wireless communication systems, may contribute to creation of interference at harmonics of the transmitting frequency. For example, a nonlinear power amplifier may create power amplifier noise that interferes with a frequency band that is twice or three times the frequency to be amplified (e.g., the transmitting frequency). Multiples of the frequency to be amplified may be referred to as harmonic frequencies. Accordingly, a frequency that is twice the frequency to be amplified may be referred to as a second-order harmonic ($2f_0$); and a frequency that is thrice the frequency to be amplified, a third-order harmonic ($3f_0$), where $f_0$ is the frequency to be amplified. Such harmonic frequency components may be introduced into transmitted signals by the power amplifier, which may generate energy at the harmonic frequencies due in part to the nonlinear characteristics of the power amplifier.

Such nonlinear characteristics of the power amplifier may also introduce other nonlinear components into transmitted signals, for example, if more than one frequency is involved in the data signal (e.g., a data signal to be transmitted) when provided to the power amplifier. For example, if an additional frequency $f_1$ is also to be amplified in conjunction with $f_0$, additional frequency components may be introduced by power amplifier noise into the transmitted signals at varying frequencies representing combinations of the frequencies to be amplified and/or their harmonics, such as $f_0$-$f_1$, $2f_0$-$f_1$, and $3f_0$-$f_1$. For example, in a mathematical representation, non-linear characteristics or additional frequency components may be incorporated into a model of power amplifier behavior as harmonic components added into the amplified response of a data signal at a particular frequency, with the harmonic components and additional frequency components being related to that particular frequency.

In the example of full duplexing (FD), an antenna transmitting a transmission on a certain frequency band may create interference for a nearby antenna (e.g., an antenna co-located on the same device), which may be intended to receive a transmission on a different frequency band. Such interference may be referred to as self-interference. Self-interference may disrupt the accuracy of signals transmitted or received by the MIMO device. Examples described herein may compensate for self-interference at an electronic device, which may aid in achieving full duplex transmission, thereby also achieving higher-capacity for a wireless network, e.g., a 5G wireless network. A network of processing elements may be used to generate adjusted signals to compensate for self-interference generated by the antennas of the electronic device.

5G systems may advantageously make improved usage of additional frequency bands, for example, to improve spectrum efficiency. Frequency bands in some systems may be assigned by regulatory authorities such as the Federal Communication Commission (FCC). Assignments may be made, for example, according to different applications such as digital broadcasting and wireless communication. These licensed and assigned frequencies may be inefficiently used if there is simply time-division duplex (TDD), frequency-division duplex (FDD) or half-duplex FDD mode, which are duplexing modes often used in existing wireless applications. Such modes may not be acceptable when improved efficiency is demanded from the wireless spectrum.

Moreover, with the fast development of digital transmission and communications, there are fewer and fewer unlicensed frequency bands, and it may be advantageous to use those licensed frequency bands in a full duplex transmission mode (e.g., transmitting and receiving on multiple frequency bands). For example, the FCC has officially proposed to open a frequency range around or about 3.5 GHz. Moreover, some 5G standards specify that such new frequency bands are to be utilized in conjunction with existing frequency bands (e.g., 4G frequency bands). Examples described herein may be utilized to achieve full duplex transmission in some examples on multiple frequency bands including the aforementioned frequency ranges of the 4G and 5G stand-alone systems. In some examples described herein, a wireless device or system may transmit and receive on this new narrowband frequency range, while also transmitting and receiving on other frequency bands, such as legacy frequency bands at 4G frequency bands (e.g., 1.8 GHz) or other 5G frequency bands. Full-duplex (FD) transmission may allow such a wireless communication system to transmit and receive the signals, at least partially simultaneously, on different frequency bands. This may allow FD 5G systems to interoperate with other frequency bands.

Examples described herein include systems and methods which include wireless devices and systems with a recurrent neural network. The recurrent neural network may utilize a network of processing elements to generate a corresponding adjusted signal for self-interference that an antenna of the wireless device or system is expected to experience due to signals to be transmitted by another antenna of the wireless device or system. Such a network of processing elements may combine transmission signals to provide intermediate processing results that are further combined, based on respective weights, to generate adjusted signals. The network of processing elements may be referred to as a neural network. In some implementations with delayed versions of intermediate processing results being utilized, such a network of processing elements may be referred to as a recurrent neural network. A respective weight vector applied to the intermediate processing result may be based on an amount of interference expected for the respective transmission signal from the corresponding intermediate processing result.

In some examples, a recurrent neural network may include bit manipulation units, multiplication/accumulation (MAC) processing units, and/or memory look-up (MLU) units. For example, layers of MAC processing units may weight the intermediate processing results using a plurality of coefficients (e.g., weights) based on a minimized error for the all or some of the adjustment signals that may generated by a recurrent neural network. In minimizing the error for the adjustment signals, a wireless device or system may achieve full duplex transmission utilizing the recurrent neural network.

Examples described herein additionally include systems and methods which include wireless devices and systems with examples of mixing input data with such coefficient data in multiple layers of multiplication/accumulation units (MAC units) and corresponding memory look-up units (MLUs). For example, a number of layers of MAC units may correspond to a number of wireless channels, such as a number of channels received at respective antennas of a plurality of antennas. In addition, a number of MAC units and MLUs utilized is associated with the number of channels. For example, a second layer of MAC units and MLUs may include m−1 MAC units and MLUs, where m represents the number of antennas, each antenna receiving a portion of input data. Advantageously, in utilizing such a hardware framework, the processing capability of generated output data may be maintained while reducing a number of MAC units and MLUs, which are utilized for such processing in an electronic device. In some examples, however, where board space may be available, a hardware framework may be utilized that includes m MAC units and m MLUs in each layer, where m represents the number of antennas.

Multi-layer neural networks (NNs) and/or multi-layer recurrent neural networks (RNNs) may be used to transmit wireless input data (e.g., as wireless input data to be transmitted via an antenna). The NNs and/or RNNs may have nonlinear mapping and distributed processing capabilities which may be advantageous in many wireless systems, such as those involved in processing wireless input data having time-varying wireless channels (e.g., autonomous vehicular networks, drone networks, or Internet-of-Things (IoT) networks). In this manner, neural networks and/or recurrent neural networks described herein may be used to generate adjusted signals to compensate for self-interference generated by the power amplifiers of the electronic device, thereby facilitating full duplex communication for various wireless protocols (e.g., 5G wireless protocols).

In cancelling for self-interference using RNNs, wireless systems and devices described herein may increase capacity of their respective communication networks, with such systems being more invariant to noise than traditional wireless systems that do not use RNNs (e.g., utilizing time-delayed versions of processing results). For example, the recurrent neural networks may be used to reduce self-interference noise that will be present in transmitted signals (e.g., amplified signals from a power amplifier of a wireless transceiver) based partly on the signals to be transmitted, e.g., as output from a power amplifier to an antenna for transmission. Using time-delayed versions of processing results in an RNN of amplified signals, the self-interference noise created by power amplifiers may be compensated, as the RNN utilizes respective power amplifier outputs with respect to the time-delayed versions of the input data (e.g., power amplifier output data). In this manner, recurrent neural networks may be used to reduce and/or improve errors which may be introduced by such self-interference noise. Advantageously, with such an implementation, wireless systems and devices implementing such RNNs increase capacity of their respective wireless networks because additional data may be transmitted in such networks, which would not otherwise be transmitted due to the effects of self-interference noise, e.g., which limits the amount of data to be transmitted due to compensation schemes in traditional wireless systems.

FIG. 1 is a schematic illustration of a system arranged in accordance with examples described herein. System 100 includes electronic device 102, electronic device 110, antenna 101, antenna 103, antenna 105, antenna 107, antenna 121, antenna 123, antenna 125, antenna 127, wireless transmitter 131, wireless transmitter 133, wireless receiver 135 and, wireless receiver 137. Antennas 101, 103, 105, 107, 121, 123, 125, and 127 may be dynamically tuned to different frequencies or bands, in some examples. The electronic device 102 may include antenna 121 associated with a first frequency, antenna 123 associated with a second frequency, antenna 125 associated with the first frequency, antenna 127 associated with the second frequency, wireless transmitter 131 for the first frequency, wireless transmitter 133 for the second frequency, wireless receiver 135 for the first frequency, and wireless receiver 137 the second frequency. The electronic device 110 may include the antenna 101 associated with the first frequency, antenna 103 associated with the second frequency, antenna 105 associated with the first frequency, antenna 107 associated with the second frequency, wireless transmitter 111 for the first frequency, wireless transmitter 113 for the second frequency, wireless receiver 115 for the first frequency, and wireless receiver 117 the second frequency.

In operation, electronic devices 102, 110 can operate in a full duplex transmission mode between the respective antennas of each electronic device. In an example of a full duplex transmission mode, on a first frequency band, wireless transmitter 131 coupled to antenna 121 may transmit to antenna 105 coupled to wireless receiver 115; while, at the same time or during at least a portion of a common time period, on a second frequency band, wireless transmitter 113 coupled to antenna 103 may transmit to antenna 127 coupled to wireless receiver 137, in some examples. Self-interference received by antenna 127 or antenna 105 from the respective transmissions at antenna 121 and antenna 103 may be at least partially compensated by the systems and methods described herein. Self-interference may generally refer to any wireless interference generated by transmissions from antennas of an electronic device to signals received by other antennas, or same antennas, on that same electronic device.

The electronic device 102 can receive self-interference noise associated with the first frequency from antenna 121 on a wireless path from the antenna 121 to the antenna 127. The self-interference noise received at the antenna 127 may be interference generated at frequencies based on the first frequency transmitted by the antenna 121 and/or one or more harmonics of the first frequency transmitted by the antenna 121. Similarly, the electronic device 110 can receive self-interference noise at the antenna 107 associated with the second frequency from antenna 103 on a wireless path from the antenna 103 to the antenna 107. The self-interference noise received at the antenna 107 may be interference generated by frequencies based on the same, second frequency transmitted by the antenna 103. While the antennas 127 and 107 may not be receiving wireless transmission from electronic devices 102, 110 in this example, the antennas 127, 107 may be receiving wireless transmission signals from other electronic devices in system 100, such that the self-interference noise received at antennas 127, 107 may degrade the reception of such signals. With the systems and methods described herein, such self-interference noise may be compensated for so that the respective wireless receivers 137, 117 may experience improved ability to receive their desired signals.

In some examples of the full duplex transmission mode, on a first frequency band, wireless transmitter 131 coupled to antenna 121 may transmit to antenna 105 coupled to wireless receiver 115; while, at the same time or during at least a portion of the same time, on a second frequency band, wireless transmitter 133 coupled to antenna 123 may transmit to antenna 107 coupled to wireless receiver 117, in some examples. Antenna 127 may accordingly have incident energy from transmissions from the antenna 121 at the first frequency and related frequencies (e.g., harmonics) and incident energy from transmissions from the antenna 123 at the second frequency and related frequencies (e.g., harmonics). The incident energy from the antennas 121 and 123 may in some examples be sufficiently close to the intended receive frequency at the antenna 127 that they interfere with transmissions intended to be received by the antenna 127. Similarly, antenna 125 may have incident energy at the first frequency and related frequencies from the antenna 121 and at the second frequency and related frequencies from the antenna 123.

However, in some examples, the energy at least second frequency and related frequencies from the antenna 123 may not be sufficiently close to (e.g., within the sensitivity of the receiver) the intended receive frequency of the antenna 125. Note also that the antennas 127 and 125 may be, at least partially simultaneously during transmission of signals from antennas 121 and 123, receiving wireless transmissions from electronic device 110 or another electronic device in system 100, such that the energy from other antennas incident at antennas 127, 125 may degrade the reception of such signals. With the systems and methods described herein, such self-interference noise may be at least partially compensated so that the respective wireless receivers 137, 135 may have improved reception of the intended transmissions.

Electronic devices described herein, such as electronic device 102 and electronic device 110 shown in FIG. 1 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, electronic device 102 and/or electronic device 110 may include any of a variety of components in some examples, including, but not limited to, memory, input/output devices, circuitry, processing units (e.g. processing elements and/or processors), or combinations thereof. For example, electronic device 102 or electronic device 110 may each implement one or more processing units described herein, such as a recurrent neural network 512 with reference to FIGS. 5C-5E, or any combinations thereof.

The electronic device 102 and the electronic device 110 may each include multiple antennas. For example, the electronic device 102 and electronic device 110 may each have more than two antennas. Three antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the electronic device 102 and electronic device 110 may have a same number of antennas, as shown in FIG. 1. In other examples, the electronic device 102 and electronic device 110 may have different numbers of antennas.

Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 8) antennas to transmit and/or receive transmissions. As the number of antennas increase, so generally does the complexity involved in accurately transmitting and/or receiving transmissions.

Although two electronic devices (e.g. electronic device 102 and electronic device 110) are shown in FIG. 1, generally the system 100 may include any number of electronic devices.

Electronic devices described herein may include receivers, transmitters, and/or transceivers. For example, the electronic device 102 of FIG. 1 includes wireless transmitter 131 and wireless receiver 135, and the electronic device 110 includes wireless transmitter 111 and wireless receiver 115. Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 1 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antennas 121 and 123, while other transceivers of electronic device 110 may be used to provide transmissions to and/or receive transmissions from antenna 101 and antenna 103.

Generally, multiple receivers, transmitters, and/or transceivers may be provided in an electronic device—one in communication with each of the antennas of the electronic device. The transmissions may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards.

Examples of transmitters, receivers, and/or transceivers described herein, such as the wireless transmitter 131, wireless transmitter 133, wireless receiver 115, or wireless receiver 117, may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 2A:
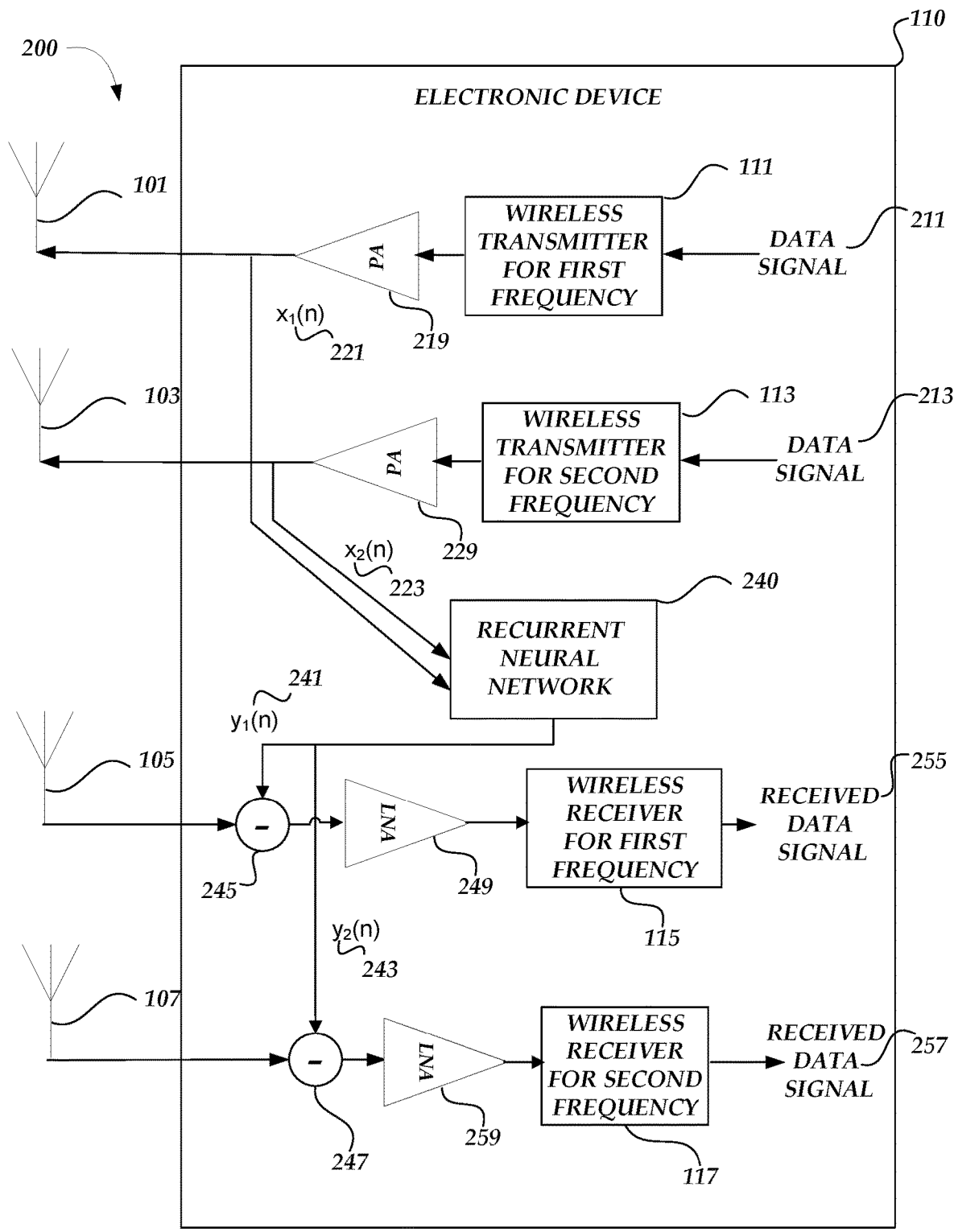
FIG. 2A is a schematic illustration of an electronic device arranged in accordance with examples described herein.

FIG. 2A is a schematic illustration 200 of an electronic device 110 arranged in accordance with examples described herein. The electronic device 110 may also include recurrent neural network 240, compensation component 245, and compensation component 247. Each wireless transmitter 111, 113 may be in communication with a respective antenna, such as antenna 101, antenna 103 via respective power amplifiers, such as power amplifiers 219, 229. Each wireless transmitter 111, 113 receives a respective data signal, such as data signals 211, 213. The wireless transmitters 111, 113 may process the data signals 211, 213 with the operations of a radio-frequency (RF) front-end and in conjunction with the power amplifiers 219, 229 generate amplified signals $x_1(n)$, $x_2(n)$ 221, 223. Recurrent neural network 240 and power amplifiers 219, 229 may be in communication with one another, e.g., to receive the generated amplified signals $x_1(n)$, $x_2(n)$ 221, 223.

The amplified data signals $x_1(n)$ 221 and $x_2(n)$ 223 are provided in the electronic device 110 to the recurrent neural network 240. For example, the amplified data signals $x_1(n)$, $x_2(n)$ 221, 223 may be provided to the recurrent neural network 240 via an internal path from an output of a respective power amplifier 219, 229. Accordingly, output paths of the wireless transmitters 111, 113 and the recurrent neural network 240 may be in communication with one another. The recurrent neural network 240, therefore, receives a first amplified data signal $x_1(n)$ 221 associated with a first frequency from the wireless transmitter 111 for the first frequency and the power amplifier 219; and, a second amplified data signal $x_2(n)$ 223 associated with the second frequency from the wireless transmitter 113 for the second frequency and the power amplifier 229.

Recurrent neural network 240 and compensation components 245, 247 may be in communication with one another. Each wireless receiver may be in communication with a respective antenna, such as antenna 105, 107 via a respective compensation component, such as compensation component 245, 247, and respective low-noise amplifiers (LNA) 249, 259. In some examples, a wireless transmission received at antennas 105, 107 may be communicated to wireless receiver 115, 117 after compensation of self-interference by the respective compensation component 245, 247 and amplification of the compensated, received signal by LNAs 249, 259. Each wireless receiver 115, 117 processes the received compensated, and amplified wireless transmission to produce a respective received data signal, such as received data signals 255, 257. In other examples, fewer, additional, and/or different components may be provided.

Examples of recurrent neural networks described herein may generate and provide adjusted signals to compensation components. So, for example, the recurrent neural network 240 may generate adjusted signals $y_1(n)$ 241 and $y_2(n)$ 243 and provide such adjusted signals to the compensation components 245, 247. The recurrent neural network 240 may generate such adjusted signals $y_1(n)$, $y_2(n)$ 241, 243 according to the amplified data signals $x_1(n)$, $x_2(n)$ 221, 223. The recurrent neural network 240 may be in communication with multiple (e.g. all) wireless transmitters paths of the electronic device 110 and all the respective compensation components coupled to respective wireless receivers, and may provide adjusted signals based on transmitter output data signals and/or amplifier output data signals, such as amplified data signals $x_1(n)$, $x_2(n)$ 221, 223.

It may be desirable in some examples to compensate for self-interference noise to allow for and/or improve full duplex transmission. For example, it may be desirable for wireless transmitters 111, 113 of the electronic device 110 to transmit wireless transmission signals at a certain frequency band; and, at the same time or simultaneously, wireless receivers 105, 107 receive wireless transmission signals on a different frequency band. The recurrent neural network 240 may determine the self-interference contributed from each wireless transmission based on the amplified signals to compensate for each received wireless transmission with an adjusted signal $y_1(n)$ 241 and/or $y_2(n)$ 243.

Particularly as wireless communications move toward or employ 5G standards, efficient use of wireless spectra may become increasingly important. Accordingly, the adjusted signals $y_1(n)$ 241 and $y_2(n)$ 243 may compensate for interference generated by one or more of the power amplifiers 219, 229 at harmonic frequencies of certain frequencies and/or at additional frequency components based on the frequency being amplified at respective power amplifiers 219, 229. For example, with the amplified data signals $x_1(n)$, $x_2(n)$ 221, 223, the recurrent neural network may compensate for intermodulation components generated by the power amplifiers 219, 229. Particularly as wireless communications move toward 5G standards, efficient use of wireless spectra may become increasingly important.

An intermodulation component may be generated internally in the electronic device 110 by the difference of the two frequencies being amplified or by the nonlinear characteristics of the power amplifiers 219, 229. In an example, interference may be created in the 1.8 GHz band from difference of two frequencies. The wireless transmitter 111 modulates the data signal 211 to the 1.8 GHz band (e.g., the first frequency). The wireless transmitter 113 modulates the data signal 213 to the 3.5 GHz band (e.g., the second frequency). Interference may be created, by the power amplifiers 219, 229, at a frequency that is the difference of these two frequencies (e.g., 1.7 GHz), which may cause some interference at the 1.8 GHZ band. Accordingly, if the first and second transmitter 111, 113 generate a difference frequency that is close to the intended transmission frequency of the first or second frequency, the compensation components 245, 247 may be utilized to compensate that interference utilizing the adjusted signals $y_1(n)$ 241 and $y_2(n)$ 243.

Examples of recurrent neural networks described herein may provide the adjusted signals $y_1(n)$, $y_2(n)$ 241, 243 to receiver(s) and/or transceiver(s). Compensation components 245, 247 may receive the adjusted signals $y_1(n)$, $y_2(n)$ 241, 243 and compensate for an incoming received wireless transmission from antennas 105, 107. For example, the compensation components 245, 247 may combine the adjusted signals with the incoming received wireless transmission in a manner which compensates for (e.g. reduces) self-interference. In some examples, the compensation components 245, 247 may subtract the adjusted signals $y_1(n)$, $y_2(n)$ 241, 243 from the received wireless transmission to produce compensated received signals for the respective wireless receivers 115, 117. For example, the compensation components 245, 247 may be implemented as adders and/or subtractors. The compensation components 245, 247 may communicate the compensated received signals to the wireless receivers 115, 117.

The wireless receivers 115, 117 may process the compensated received signal with the operations of a radio-frequency (RF) front-end. The wireless receiver may process the compensated received signals as a wireless receiver 400, described below with reference to FIG. 4, for example. While the compensation components 245, 247 have been described in terms of subtracting an adjusting signal from a received wireless transmission, it can be appreciated that various compensations may be possible, such as adjusted signal that operates as a transfer function compensating the received wireless transmission or an adjusted signal that operates as an optimization vector to multiply the received wireless transmission. Responsive to such compensation, electronic device 110 may transmit and receive wireless communications signals in a full duplex transmission mode.

Figure 5A:
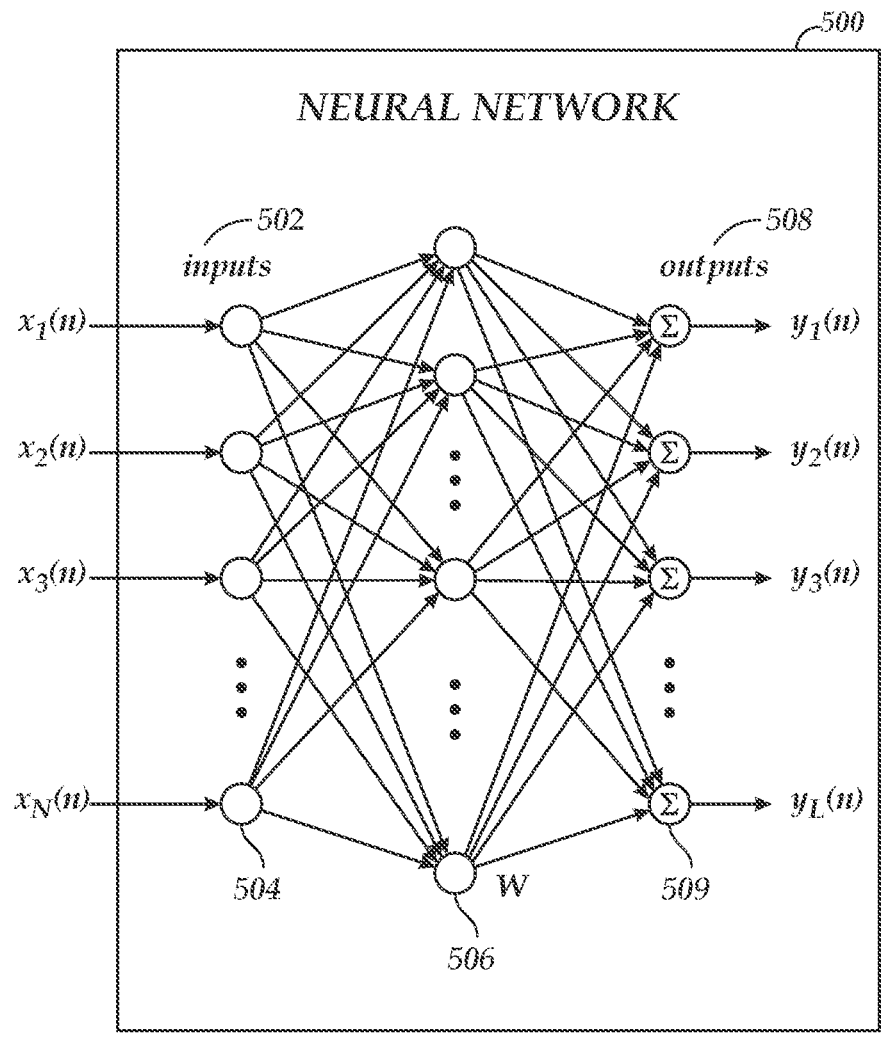
FIG. 5A is a schematic illustration of an example neural network in accordance with examples described herein.

Examples of recurrent neural networks described herein, including the recurrent neural network 240 of FIG. 2A may be implemented using hardware, software, firmware, or combinations thereof. For example, recurrent neural network 240 may be implemented using circuitry and/or one or more processing unit(s) (e.g. processors) and memory encoded with executable instructions for causing the recurrent neural network to perform one or more functions described herein. FIG. 5A depicts an exemplary recurrent neural network.

Figure 2B:
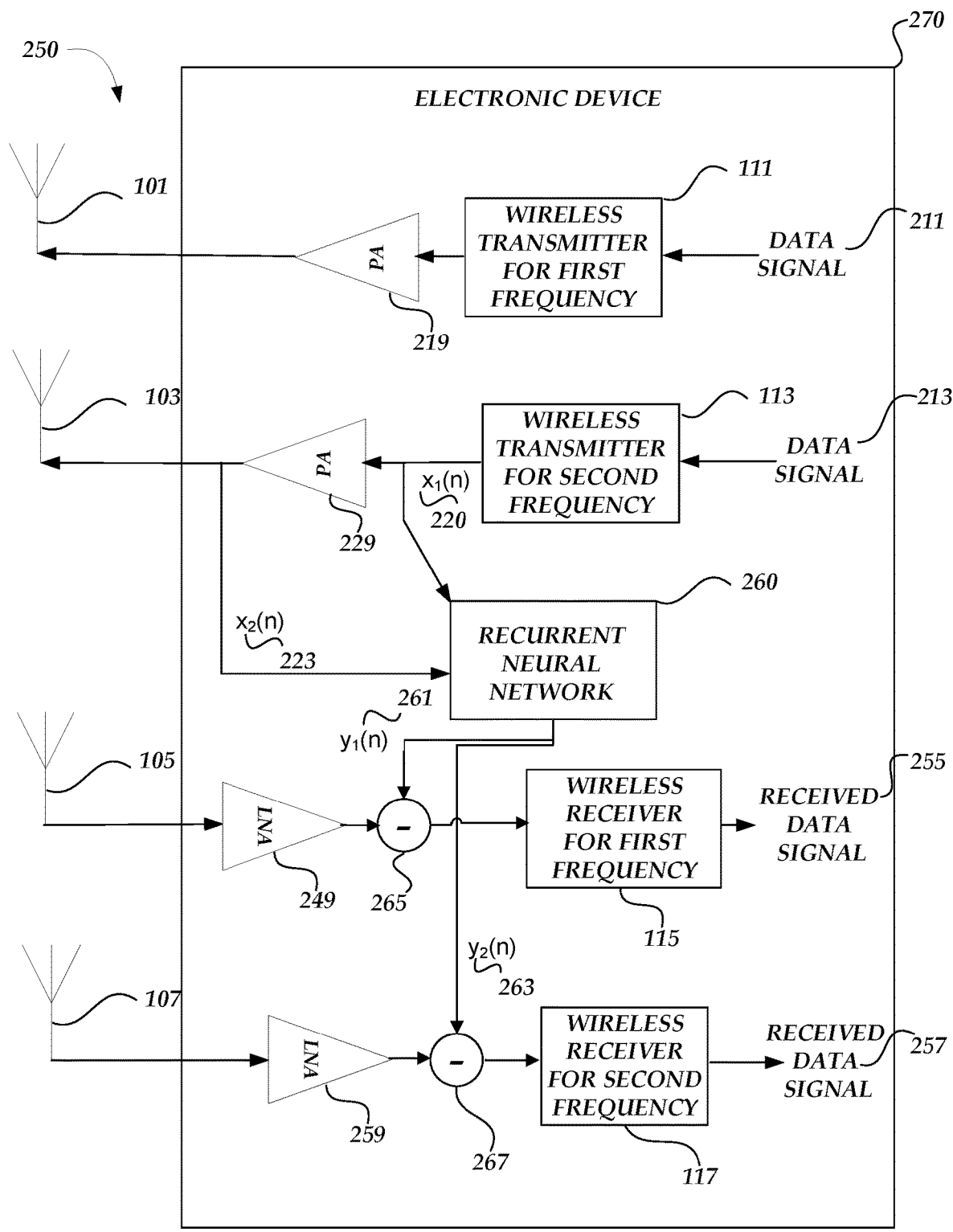
FIG. 2B is a schematic illustration of an electronic device arranged in accordance with examples described herein.

FIG. 2B is a schematic illustration 250 of an electronic device 270 arranged in accordance with examples described herein. Similarly, numbered elements of FIG. 2B include analogous functionality to those numbered elements of FIG. 2A. The electronic device 270 may also include recurrent neural network 260, compensation component 265, and compensation component 267. Each wireless transmitter 111, 113 may be in communication with a respective antenna, such as antenna 101, antenna 103 via respective power amplifiers, such as power amplifiers 219, 229. Each wireless transmitter 111, 113 receives a respective data signal, such as data signals 211, 213. The wireless transmitter 113 may process the data signal 213 with the operations of a radio-frequency (RF) front-end to generate signal $x_1(n)$ 220. The signal $x_1(n)$ 220 may be amplified by the power amplifier 229 to generate amplified signal $x_2(n)$ 223.

The data signals $x_1(n)$, $x_2(n)$ 220, 223 are provided in the electronic device 110 to the recurrent neural network 260. For example, the data signals $x_1(n)$, $x_2(n)$ 220, 223 may be provided to the recurrent neural network 260 via internal paths from an output of the wireless transmitter 113 and an output of the power amplifier 229. Accordingly, paths stemming from the wireless transmitter 113 and the recurrent neural network 260 may be in communication with one another. The recurrent neural network 260, therefore, receives a first data signal $x_1(n)$ 220 associated with the second frequency from the wireless transmitter 113 for the second frequency and a second amplified data signal $x_2(n)$ 223 associated with the second frequency the power amplifier 229.

Recurrent neural network 260 and compensation components 265, 267 may be in communication with one another. Each wireless receiver may be in communication with a respective antenna via a receiver path of the respective wireless receivers 115, 117, such as antenna 105, 107 via a respective compensation component, such as compensation component 265, 267, and respective low-noise amplifiers (LNA) 249, 259. In some examples, a wireless transmission received at antennas 105, 107 may be communicated to wireless receiver 115, 117 after amplification of the received signal by LNAs 249, 259 and compensation of self-interference by the respective compensation component 265, 267. Each wireless receiver 115, 117 processes the received, amplified, and compensated wireless transmission to produce a respective received data signal, such as received data signals 255, 257. In other examples, fewer, additional, and/or different components may be provided.

Examples of recurrent neural networks described herein may generate and provide adjusted signals to compensation components. So, for example, the recurrent neural network 260 may generate adjusted signals $y_1(n)$, $y_2(n)$ 261, 263 and provide such adjusted signals to the compensation components 265, 267. The recurrent neural network 260 may generate such adjusted signals $y_1(n)$, $y_2(n)$ 261, 263 based on the data signals $x_1(n)$, $x_2(n)$ 220, 223. The recurrent neural network 260 may be in communication with multiple (e.g. all) wireless transmitters paths of the electronic device 110 and all the respective compensation components coupled to respective wireless receivers, and may provide adjusted signals based on transmitter output data signals and/or amplifier output data signals, such as data signals $x_1(n)$, $x_2(n)$ 220, 223.

It may be desirable in some examples to compensate for the self-interference noise to achieve full duplex transmission. For example, it may be desirable for wireless transmitters 111, 113 of the electronic device 110 to transmit wireless transmission signals at a certain frequency band; and, at the same time or simultaneously, wireless receivers 105, 107 receive wireless transmission signals on a different frequency band. The recurrent neural network 260 may determine the self-interference contributed from each wireless transmission based on the amplified signals to compensate for each received wireless transmission with an adjusted signal $y_1(n)$, $y_2(n)$ 261, 263. Accordingly, the adjusted signals $y_1(n)$, $y_2(n)$ 261, 263 may compensate for interference generated by the power amplifier 229 at harmonic frequencies of certain frequencies or additional frequency components derived from the frequency being amplified at the power amplifier 229. For example, with the data signals $x_1(n)$, $x_2(n)$ 220, 223, the recurrent neural network may compensate for harmonic frequencies generated by the power amplifier 229.

A harmonic frequency may be generated internally in the electronic device 110 or by the nonlinear characteristics of the power amplifier 229 based on the frequency being amplified. In an example, interference may be created in the 3.5 GHz band from a second-order harmonic frequency of the frequency being amplified by the power amplifier 229. In an example, the first frequency of the wireless transmitter 111 may modulate the data signal 211 to the 3.5 GHz band and the second frequency of the wireless transmitter 113 may modulate the data signal 213 to the 1.8 GHz band. Accordingly, the power amplifier 229 may amplify the modulated data signal $x_1(n)$ 220 having a frequency in the 1.8 GHz band, and may introduce harmonic components into the amplified data signal $x_2(n)$ 223, such as a second-order harmonic component at 3.6 GHz, which may interfere with the 3.5 GHz band. Accordingly, if the first and second transmitter 111, 113 generate a harmonic component that is close to the intended transmission frequency of the first or second frequency, the compensation components 265, 267 may be utilized to compensate that interference utilizing the adjusted signals $y_1(n)$, $y_2(n)$ 261, 263.

While FIGS. 2A and 2B depict respective self-interference calculators 240, 260 operating on data signals from the same or different paths of wireless transmitters 111, 113 at varying frequencies, it can be appreciated that various paths with data signals, whether amplified, modulated, or initial, may be provided to a recurrent neural network, such as self-interference calculators 240, 260, to compensate for noise from interference generated by respective received transmission signals, such as transmission signals received at antennas 105, 107. For example, in an embodiment, a self-interference calculator may receive each of the data signals being received in FIGS. 2A and 2B (e.g., data signals 221, 223, and 220) and may provide adjusted signals to varying points in a receiver path, for example, as adjusted signals 241, 243, 261, and 263 are provided to paths of wireless receiver 115 and/or wireless receiver 117. Accordingly, the electronic devices 110, 270 of FIGS. 2A and 2B may be utilized in system 100 as electronic devices 102 and/or 110 to compensate for self-interference noise generated in transmitting data signals from the electronic devices communicating in such a system.

FIG. 3 is a schematic illustration of a wireless transmitter 300. The wireless transmitter 300 receives a data signal 311 and performs operations to generate wireless communication signals for transmission via the antenna 303. The wireless transmitter 300 may be utilized to implement the wireless transmitters 111, 113 in FIGS. 1, 2A, 2B, or wireless transmitters 131, 133 of FIG. 1, for example. The transmitter output data $x_N(n)$ 310 is amplified by a power amplifier 332 before the output data are transmitted on an RF antenna 303. The operations to the RF-front end may generally be performed with analog circuitry or processed as a digital baseband operation for implementation of a digital front-end. The operations of the RF-front end include a scrambler 304, a coder 308, an interleaver 312, a modulation mapping 316, a frame adaptation 320, an IFFT 324, a guard interval 328, and frequency up-conversion 330.

The scrambler 304 may convert the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 304 are possible.

The coder 308 may encode the data outputted from the scrambler to code the data. For example, a Reed-Solomon (RS) encoder, turbo encoder may be used as a first coder to generate a parity block for each randomized transport packet fed by the scrambler 304. In some examples, the length of parity block and the transport packet can vary according to various wireless protocols. The interleaver 312 may interleave the parity blocks output by the coder 308, for example, the interleaver 312 may utilize convolutional byte interleaving. In some examples, additional coding and interleaving can be performed after the coder 308 and interleaver 312. For example, additional coding may include a second coder that may further code data output from the interleaver, for example, with a punctured convolutional coding having a certain constraint length. Additional interleaving may include an inner interleaver that forms groups of joined blocks. While described in the context of a RS coding, turbo coding, and punctured convolution coding, various coders 308 are possible, such as a low-density parity-check (LDPC) coder or a polar coder. While described in the context of convolutional byte interleaving, various interleavers 312 are possible.

The modulation mapping 316 may modulate the data output from the interleaver 312. For example, quadrature amplitude modulation (QAM) may be used to map the data by changing (e.g., modulating) the amplitude of the related carriers. Various modulation mappings may be used, including, but not limited to: Quadrature Phase Shift Keying (QPSK), SCMA NOMA, and MUSA (Multi-user Shared Access). Output from the modulation mapping 316 may be referred to as data symbols. While described in the context of QAM modulation, various modulation mappings 316 are possible. The frame adaptation 320 may arrange the output from the modulation mapping according to bit sequences that represent corresponding modulation symbols, carriers, and frames.

The IFFT 324 may transform symbols that have been framed into sub-carriers (e.g., by frame adaptation 320) into time-domain symbols. Taking an example of a 5G wireless protocol scheme, the IFFT can be applied as N-point IFFT:

$$x_k = \sum_{n=1}^{N} X_n e^{j2\pi kn/N} \quad (1)$$

where $X_n$ is the modulated symbol sent in the nth 5G sub-carrier. Accordingly, the output of the IFFT 324 may form time-domain 5G symbols. In some examples, the IFFT 324 may be replaced by a pulse shaping filter or poly-phase filtering banks to output symbols for frequency up-conversion 330.

In the example of FIG. 3, the guard interval 328 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme.

The frequency up-conversion 330 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission.

Before transmission, at the antenna 303, a power amplifier 332 may amplify the transmitter output data $x_N(n)$ 310 to output data for an RF transmission in an RF domain at the antenna 303. The antenna 303 may be an antenna designed to radiate at a specific radio frequency. For example, the antenna 303 may radiate at the frequency at which the 5G symbols were up-converted. Accordingly, the wireless transmitter 300 may transmit an RF transmission via the antenna 303 based on the data signal 311 received at the scrambler 304. As described above with respect to FIG. 3, the operations of the wireless transmitter 300 can include a variety of processing operations. Such operations can be implemented in a conventional wireless transmitter, with each operation implemented by specifically-designed hardware for that respective operation. For example, a DSP processing unit may be specifically-designed to implement the IFFT 324. As can be appreciated, additional operations of wireless transmitter 300 may be included in a conventional wireless receiver.

Figure 4:
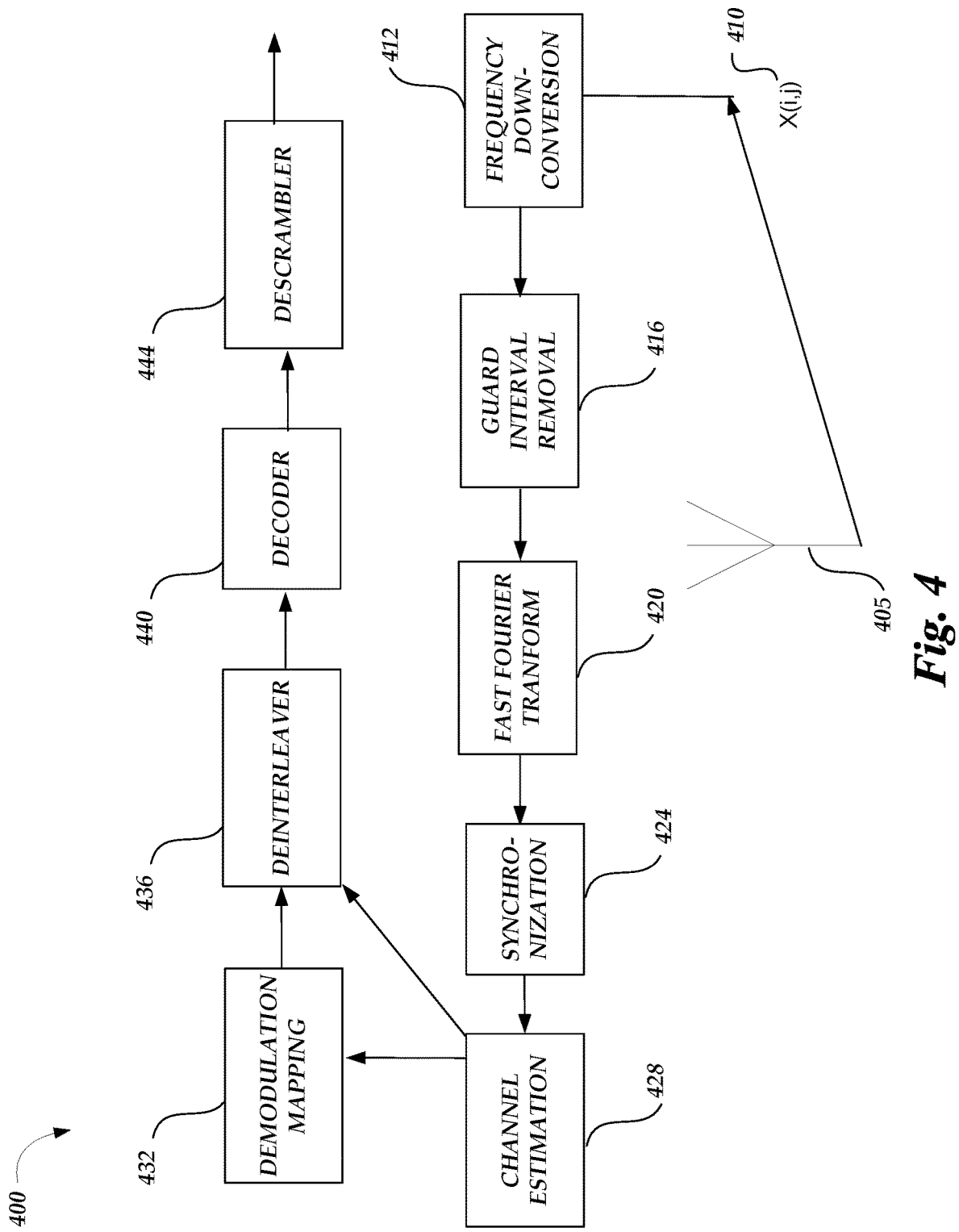
FIG. 4 is a schematic illustration of wireless receiver.

FIG. 4 is a schematic illustration of wireless receiver 400. The wireless receiver 400 receives input data X (i,j) 410 from an antenna 405 and performs operations of a wireless receiver to generate receiver output data at the descrambler 444. The wireless receiver 400 may be utilized to implement the wireless receivers 115, 117 in FIGS. 1, 2A, 2B, for example or wireless receivers 135, 137 of FIG. 1. The antenna 405 may be an antenna designed to receive at a specific radio frequency. The operations of the wireless receiver may be performed with analog circuitry or processed as a digital baseband operation for implementation of a digital front-end. The operations of the wireless receiver include a frequency down-conversion 412, guard interval removal 416, a fast Fourier transform (FFT) 420, synchronization 424, channel estimation 428, a demodulation mapping 432, a deinterleaver 436, a decoder 440, and a descrambler 444.

The frequency down-conversion 412 may down-convert the frequency domain symbols to a baseband processing range. For example, continuing in the example of a 5G implementation, the frequency-domain 5G symbols may be mixed with a local oscillator frequency to generate 5G symbols at a baseband frequency range. A digital down-converter (DDC) may also be utilized to convert the frequency domain symbols. Accordingly, the RF transmission including time-domain 5G symbols may be down-converted to baseband. The guard interval removal 416 may remove a guard interval from the frequency-domain 5G symbols. The FFT 420 may transform the time-domain 5G symbols into frequency-domain 5G symbols. Taking an example of a 5G wireless protocol scheme, the FFT can be applied as N-point FFT:

$$X_n = \sum_{k=1}^{N} x_k e^{-i2\pi kn/N} \quad (2)$$

where $X_n$ is the modulated symbol sent in the nth 5G sub-carrier. Accordingly, the output of the FFT 420 may form frequency-domain 5G symbols. In some examples, the FFT 420 may be replaced by poly-phase filtering banks to output symbols for synchronization 424.

The synchronization 424 may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 400 for frame synchronization. With the frames synchronized, the 5G symbols proceed to channel estimation 428. The channel estimation 428 may also use the time-domain pilot symbols and additional frequency-domain pilot symbols to estimate the time or frequency effects (e.g., path loss) to the received signal.

For example, a channel may be estimated according to N signals received through N antennas (in addition to the antenna 405) in a preamble period of each signal. In some examples, the channel estimation 428 may also use the guard interval that was removed at the guard interval removal 416.

With the channel estimate processing, the channel estimation 428 may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system.

The demodulation mapping 432 may demodulate the data outputted from the channel estimation 428. For example, a quadrature amplitude modulation (QAM) demodulator can map the data by changing (e.g., modulating) the amplitude of the related carriers. Any modulation mapping described herein can have a corresponding demodulation mapping as performed by demodulation mapping 432. In some examples, the demodulation mapping 432 may detect the phase of the carrier signal to facilitate the demodulation of the 5G symbols. The demodulation mapping 432 may generate bit data from the 5G symbols to be further processed by the deinterleaver 436.

The deinterleaver 436 may deinterleave the data bits, arranged as parity block from demodulation mapping into a bit stream for the decoder 440, for example, the deinterleaver 436 may perform an inverse operation to convolutional byte interleaving. The deinterleaver 436 may also use the channel estimation to compensate for channel effects to the parity blocks.

The decoder 440 may decode the data outputted from the scrambler to code the data. For example, a Reed-Solomon (RS) decoder or turbo decoder may be used as a decoder to generate a decoded bit stream for the descrambler 444. For example, a turbo decoder may implement a parallel concatenated decoding scheme. In some examples, additional decoding and/or deinterleaving may be performed after the decoder 440 and deinterleaver 436. For example, additional decoding may include another decoder that may further decode data output from the decoder 440. While described in the context of a RS decoding and turbo decoding, various decoders 440 are possible, such as low-density parity-check (LDPC) decoder or a polar decoder.

The descrambler 444 may convert the output data from decoder 440 from a pseudo-random or random binary sequence to original source data. For example, the descrambler 44 may convert decoded data to a transport layer destination (e.g., MPEG-2 transport stream) that is descrambled with an inverse to the generator polynomial of the scrambler 304. The descrambler thus outputs receiver output data. Accordingly, the wireless receiver 400 receives an RF transmission including input data X (i,j) 410 via to generate the receiver output data.

As described herein, for example with respect to FIG. 4, the operations of the wireless receiver 400 can include a variety of processing operations. Such operations can be implemented in a conventional wireless receiver, with each operation implemented by specifically-designed hardware for that respective operation. For example, a DSP processing unit may be specifically-designed to implement the FFT 420. As can be appreciated, additional operations of wireless receiver 400 may be included in a conventional wireless receiver.

FIG. 5A is a schematic illustration of an example neural network 500 arranged in accordance with examples described herein. The neural network 500 includes a network of processing elements 504, 506, 509 that output adjusted signals $y_1(n)$, $y_2(n)$, $y_3(n)$, $y_L(n)$ 508 based on amplified signals $x_1(n)$, $x_2(n)$, $x_3(n)$, $x_N(n)$ 502. For example, the amplified signals $x_1(n)$, $x_2(n)$, $x_3(n)$, $x_N(n)$ 502 may correspond to inputs for respective antennas of each transmitter generating the respective $x_1(n)$, $x_2(n)$, $x_3(n)$, $x_N(n)$ 502. The processing elements 504 receive the amplified signals $x_1(n)$, $x_2(n)$, $x_3(n)$, $x_N(n)$ 502 as inputs.

The processing elements 504 may be implemented, for example, using bit manipulation units that may forward the amplified signals $x_1(n)$, $x_2(n)$, $x_3(n)$, $x_N(n)$ 502 to processing elements 506. In some implementations, a bit manipulation unit may perform a digital logic operation on a bitwise basis. For example, a bit manipulation unit may be a NOT logic unit, an AND logic unit, an OR logic unit, a NOR logic unit, a NAND logic unit, or an XOR logic unit. Processing elements 506 may be implemented, for example, using multiplication units that include a non-linear vector set (e.g., center vectors) based on a non-linear function, such as a Gaussian function $$\left(\text{e.g.,: } f(r) = \exp\left(-\frac{r^2}{\sigma^2}\right)\right),$$

a multi-quadratic function (e.g., $f(r)=(r^2+\sigma^2)$), an inverse multi-quadratic function (e.g., $f(r)=(r^2+\sigma^2)$), a thin-plate spine function (e.g., $f(r)=r^2 \log(r)$), a piece-wise linear function (e.g., $f(r)=\frac{1}{2}(|r+1|-|r-1|)$), or a cubic approximation function (e.g., $f(r)=\frac{1}{2}(|r^3+1|-|r^3-1|)$). In some examples, the parameter $\sigma$ is a real parameter (e.g., a scaling parameter) and r is the distance between the input signal (e.g., $x_1(n)$, $x_2(n)$, $x_3(n)$, $x_N(n)$ 502) and a vector of the non-linear vector set. Processing elements 509 may be implemented, for example, using accumulation units that sum the intermediate processing results received from each of the processing elements 506. In communicating the intermediate processing results, each intermediate processing result may be weighted with a weight 'W'. For example, the multiplication processing units may weight the intermediate processing results based on a minimized error for the all or some of the adjustment signals that may generated by a neural network.

The processing elements 506 include a non-linear vector set that may be denoted as $C_i$ (for i=1, 2, ... H). H may represent the number of processing elements 506. With the amplified signals $x_1(n)$, $x_2(n)$, $x_3(n)$, $x_N(n)$ 502 received as inputs to processing elements 506, after forwarding by processing elements 504, the output of the processing elements 506, operating as multiplication processing units, may be expressed as $h_i(n)$, such that:

$$h_i(n) = f_i(\|X(n) - C_i\|) \quad (i = 1, 2, \ldots\ldots, H) \tag{3}$$

$f_i$ may represent a non-linear function that is applied to the magnitude of the difference between $x_1(n)$, $x_2(n)$, $x_3(n)$, $x_N(n)$ 502 and the center vectors $C_i$. The output $h_i(n)$ may represent a non-linear function such as a Gaussian function, multi-quadratic function, an inverse multi-quadratic function, a thin-plate spine function, or a cubic approximation function.

The output $h_i(n)$ of the processing elements 506 may be weighted with a weight matrix 'W'. The output $h_i(n)$ of the processing elements 506 can be referred to as intermediate processing results of the neural network 500. For example, the connection between the processing elements 506 and processing elements 509 may be a linear function such that the summation of a weighted output $h_i(n)$ such that the adjusted signals $y_1(n)$, $y_2(n)$, $y_3(n)$, $y_L(n)$ 508 may be expressed, in Equation 4 as:

$$y_i(n) = \sum_{j=1}^{H} W_{ij} h_j(n) = \sum_{j=1}^{H} W_{ij} f_j(\|X(n) - C_j\|) \quad (i = 1, 2, \ldots\ldots, L) \tag{4}$$

Accordingly, the adjusted signals $y_1(n)$, $y_2(n)$, $y_3(n)$, $y_L(n)$ 508 may be the output $y_i(n)$ of the i'th processing element 509 at time n, where L is the number of processing elements 509. $W_{ij}$ is the connection weight between j'th processing element 506 and i'th processing element 509 in the output layer. For example, as described with respect to the example of FIG. 6A, the center vectors $C_i$ and the connection weights $W_{ij}$ of each layer of processing elements may be determined by a training unit 645 that utilizes sample vectors 660 to train a recurrent neural network 640. Advantageously, the adjusted signals $y_1(n)$, $y_2(n)$, $y_3(n)$, $y_L(n)$ 508 generated from the amplified signals $x_1(n)$, $x_2(n)$, $x_3(n)$, $x_N(n)$ 502 may be computed with near-zero latency such that self-interference compensation may be achieved in any electronic device including a neural network, such as the neural network 500. A wireless device or system that implements a neural network 500 may achieve full duplex transmission. For example, the adjusted signals generated by the neural network 500 may compensate self-interference that an antenna of the wireless device or system will experience due to transmission signals (e.g., amplified signals) by a power amplifier of the wireless device or system.

While the neural network 500 has been described with respect to a single layer of processing elements 506 that include multiplication units, it can be appreciated that additional layers of processing elements with multiplication units may be added between the processing elements 504 and the processing elements 509. The neural network is scalable in hardware form, with additional multiplication units being added to accommodate additional layers. Using the methods and systems described herein, additional layer (s) of processing elements including multiplication processing units and the processing elements 506 may be optimized to determine the center vectors $C_i$ and the connection weights $W_{ij}$ of each layer of processing elements including multiplication units. In some implementations, for example as described with reference to FIGS. 5C-5E, layers of processing elements 506 may include multiplication/accumulation (MAC) units, with each layer having additional MAC units. Such implementations, having accumulated the intermediate processing results in a respective processing elements (e.g., the respective MAC unit), may also include memory look-up (MLU) units that are configured to retrieve a plurality of coefficients and provide the plurality of coefficients as the connection weights for the respective layer of processing elements 506 to be mixed with the input data.

The neural network 500 can be implemented using one or more processors, for example, having any number of cores. An example processor core can include an arithmetic logic unit (ALU), a bit manipulation unit, a multiplication unit, an accumulation unit, a multiplication/accumulation (MAC) unit, an adder unit, a look-up table unit, a memory look-up unit, or any combination thereof. In some examples, the neural network 240 may include circuitry, including custom circuitry, and/or firmware for performing functions described herein. For example, circuitry can include multiplication unit, accumulation units, MAC units, and/or bit manipulation units for performing the described functions, as described herein. The neural network 240 may be implemented in any type of processor architecture including but not limited to a microprocessor or a digital signal processor (DSP), or any combination thereof.

Figure 5B:
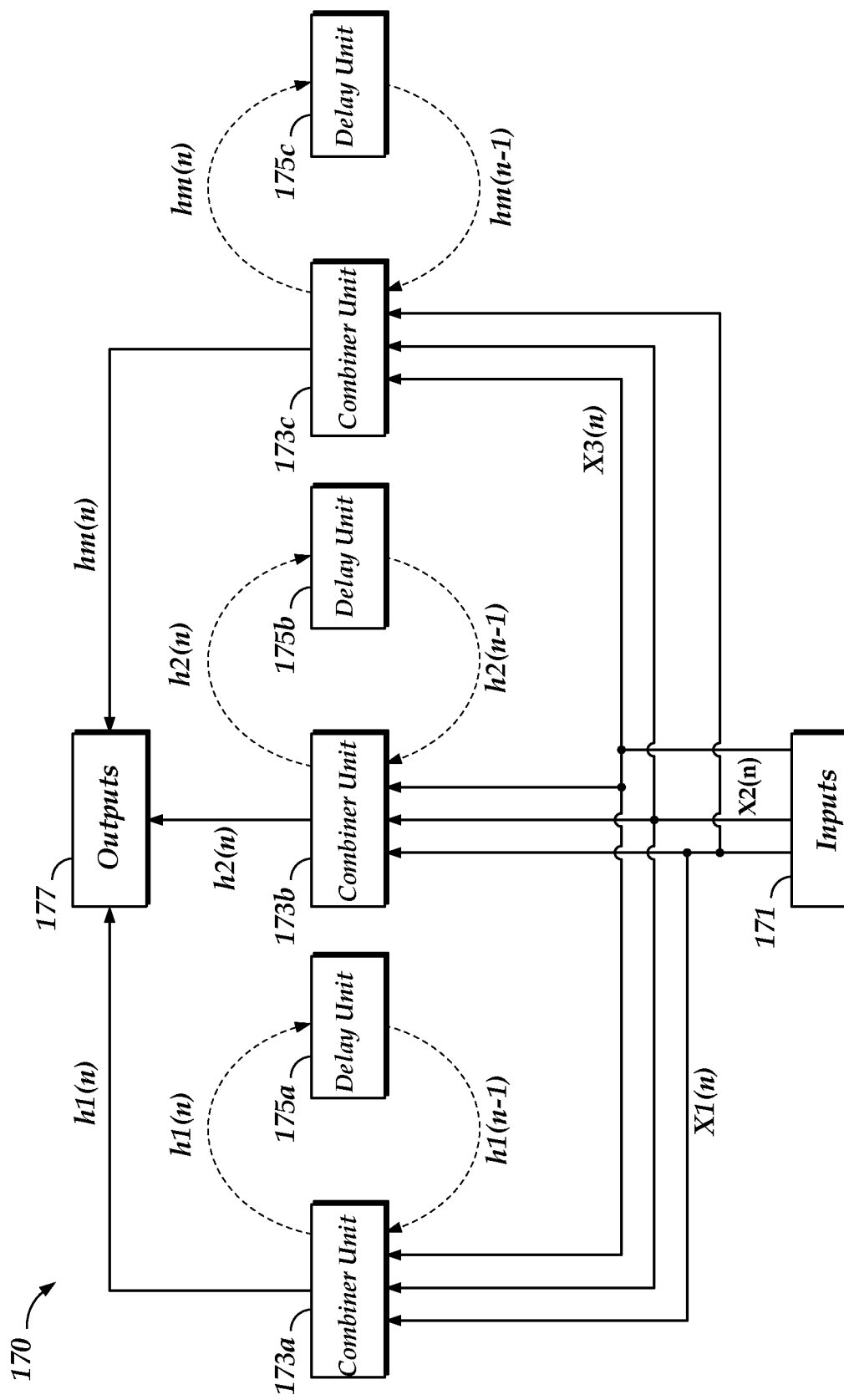
FIG. 5B is a schematic illustration of a recurrent neural network arranged in accordance with examples described herein.

FIG. 5B is a schematic illustration of a recurrent neural network arranged in accordance with examples described herein. The recurrent neural network 170 include three stages (e.g., layers): an inputs stage 171; a combiner stage 173 and 175, and an outputs stage 177. While three stages are shown in FIG. 5B, any number of stages may be used in other examples, e.g., as described with reference to FIGS. 5C-5E. In some implementations, the recurrent neural network 170 may have multiple combiner stages such that outputs from one combiner stage is provided to another combiners stage, until being providing to an outputs stage 177. As described with reference to FIG. 5C, for example, there may be multiple combiner stages in a neural network 170. As depicted in FIG. 5B, the delay units 175a, 175b, and 175c may be optional components of the neural network 170. When such delay units 175a, 175b, and 175c are utilized as described herein, the neural network 170 may be referred to as a recurrent neural network. Accordingly, the recurrent neural network 170 can be used to implement any of the recurrent neural networks described herein; for example, the recurrent neural network 240 of FIG. 2A or recurrent neural network 260 of FIG. 2B.

The first stage of the neural network 170 includes inputs node 171. The inputs node 171 may receive input data at various inputs of the recurrent neural network. The second stage of the neural network 170 is a combiner stage including combiner units 173a, 173b, 173c; and delay units 175a, 175b, 175c. Accordingly, the combiner units 173 and delay units 175 may be collectively referred to as a stage of combiners. Accordingly, in the example of FIG. 5C with recurrent neural network 512 implementing such combiners, such a recurrent neural network 512 can implements the combiner units 173a-c and delay units 175a-c in the second stage. In such an implementation, the recurrent neural network 512 may perform a nonlinear activation function using the input data from the inputs node 171 (e.g., input signals X1(n), X2(n), and X3(n)). The third stage of neural network 170 includes the outputs node 177. Additional, fewer, and/or different components may be used in other examples. Accordingly, the recurrent neural network 170 can be used to implement any of the recurrent neural networks described herein; for example, any of the recurrent neural networks 512 of FIGS. 5C-5E.

The recurrent neural network 170 includes delay units 175a, 175b, and 175c, which generate delayed versions of the output from the respective combiner units 173a-c based on receiving such output data from the respective combiner units 173a-c. In the example, the output data of combiner units 173a-c may be represented as h(n); and, accordingly, each of the delay units 175a-c delay the output data of the combiner units 173a-c to generate delayed versions of the output data from the combiner units 173a-c, which may be represented as h(n-t). In various implementations, the amount of the delay, t, may also vary, e.g., one clock cycle, two clock cycles, or one hundred clock cycles. That is, the delay unit 175 may receive a clock signal and utilize the clock signal to identify the amount of the delay. In the example of FIG. 5B, the delayed versions are delayed by one time period, where '1' represents a time period. A time period may corresponds to any number of units of time, such as a time period defined by a clock signal or a time period defined by another element of the neural network 170. In various implementations, the delayed versions of the output from the respective combiner units 173a-c may be referred to as signaling that is based on the output data of combiner units 173a-c.

Continuing in the example of FIG. 5B, each delay unit 175a-c provides the delayed versions of the output data from the combiner units 173a-c as input to the combiner units 173a-c, to operate, optionally, as a recurrent neural network. Such delay units 175a-c may provide respective delayed versions of the output data from nodes of the combiner units 173a-c to respective input units/nodes of the combiner units 173a-c. In utilizing delayed versions of output data from combiner units 173a-c, the recurrent neural network 170 may train weights at the combiner units 173 a-c that incorporate time-varying aspects of input data to be processed by such a recurrent neural network 170. Once trained, in some examples, the inputs node 171 receives wireless data to be transmitted from nonlinear power amplifiers, which create transmissions at frequencies that interfere with other frequencies of interest (e.g., a 5G protocol frequency). Accordingly, the input nodes 171 receive such amplified signals (e.g., output data $x_1(n)$, $x_2(n)$ 221, 223) and process that input data in the recurrent neural network 170 a. Each stream of input data may correspond to a signal to be transmitted (e.g., the amplified signals) at corresponding antennas (e.g., antennas 101 and 103 FIG. 1). Accordingly, because an RNN 170 incorporates the delayed versions of output data from combiner units 173a-c, the time-varying nature of the input data may provide faster and more efficient processing of the input data.

Examples of recurrent neural network training and inference can be described mathematically. Again, as an example, consider input data at a time instant (n), given as: $X(n)=[x_1(n), x_2(n), \ldots x_m(n)]^T$. The center vector for each element in hidden layer(s) of the recurrent neural network 170 (e.g., combiner units 173a-c) may be denoted as $C_i$ (for i=1, 2, ..., H, where H is the element number in the hidden layer).

The output of each element in a hidden layer may then be given as:

$$h_i(n) = f_i(\|X(n) + h_i(n-t) - C_i\|) \text{ for } (i = 1, 2, \ldots \ldots, H) \quad (5)$$

t may be the delay at the delay unit 175 such that the output of the combiner units 173 includes a delayed version of the output of the combiner units 173. In some examples, this may be referred to as feedback of the combiner units 173. Accordingly, each of the connections between a last hidden layer and the output layer may be weighted. Each element in the output layer may have a linear input-output relationship such that it may perform a summation (e.g., a weighted summation). Accordingly, an output of the i'th element in the output layer at time n may be written as:

$$y_i(n) = \sum_{j=1}^{H} W_{ij}h_j(n) + W_{ij}h_j(n-t) = \sum_{j=1}^{H} W_{ij}f_j(\|X(n) + h_i(n-t) - C_j\|) \quad (6)$$

for (i=1, 2, ..., L) and where L is the element number of the output of the output layer and $W_{ij}$ is the connection weight between the j'th element in the hidden layer and the i'th element in the output layer.

Additionally or alternatively, while FIG. 5B has been described with respect to a single stage of combiners (e.g., second stage) including the combiner units 173a-c and delay units 175a-c, it can be appreciated that multiple stages of similar combiner stages may be included in the neural network 170 with varying types of combiner units and varying types of delay units with varying delays, for example, as will now be described with reference to FIGS. 5C-5E.

Figure 5C:
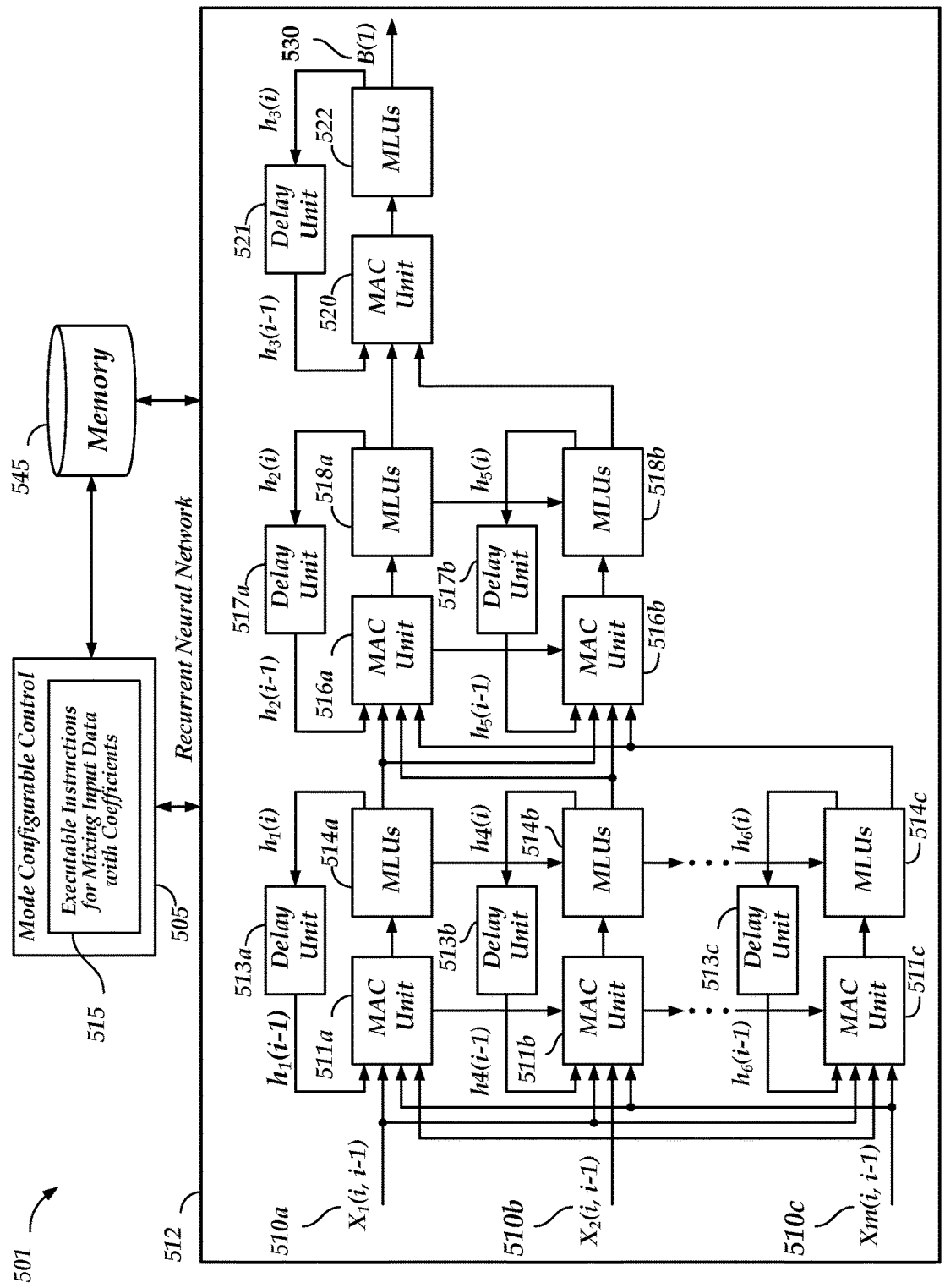
FIGS. 5C-5E are schematic illustrations of example recurrent neural networks in accordance with examples described herein.

FIG. 5C is a schematic illustration of a recurrent neural network 512 arranged in a system 501 in accordance with examples described herein. Such a hardware implementation (e.g., system 501) may be used, for example, to implement one or more neural networks, such as the recurrent neural network 240 of FIG. 2, the neural network 500 of FIG. 5A or recurrent neural network 170 of FIG. 5B. Additionally or alternatively, in some implementations, the recurrent neural network 512 may receive input data 510a, 510b, and 510c from such a computing system. The input data 510a, 510b, and 510c may be data to be transmitted, which may be stored in a memory 545. In some examples, data stored in the memory 545 may be input data to be transmitted from a plurality of antennas coupled to an electronic device 110 in which the recurrent neural network 512 is implemented. In an example in which the electronic device 110 is coupled to the plurality of antennas 101 and 103, the input data 510a $X_1(i, i-1)$ may correspond to a first RF transmission to be transmitted at the antenna 101 at a first frequency; the input data 510b $X_2(i, i-1)$ may correspond to a second RF transmission to be transmitted at the antenna 103 at a second frequency; and the input data 510c $X_m(i, i-1)$ may correspond to a m'th RF transmission to be transmitted at an m'th antenna at a m'th frequency. m may represent the number of antennas, with each antenna transmitting a portion of input data.

In some examples, m may also correspond to a number of wireless channels over which the input data is to be transmitted; for example, in a MIMO transmission, an RF transmission may be sent over multiple wireless channels at the plurality of antennas 101 and 103. In an example of the input data being received (in contrast to being transmitted), the input data 510a, 510b, 510c may correspond to portions of input data to be transmitted at multiple antennas after having been processed by nonlinear power amplifiers 219, 229, for example. Accordingly, the output data 530 B(1) may be a MIMO output signal to be transmitted at the antennas 101 and 103 at an electronic device that is implementing the recurrent neural network 512 of the computing system 501.

As denoted in the representation of the input data signals, the input data 510a $X_1(i, i-1)$ includes a current portion of the input data, at time i, and a previous portion of the input data, at time i−1. For example, a current portion of the input data may be a sample obtained at the antenna 101 at a certain time period (e.g., at time i), while a previous portion of the input data may be a sample obtained at the antenna 101 at a time period previous to the certain time period (e.g., at time i−1). Accordingly, the previous portion of the input data may be referred to as a time-delayed version of the current portion of the input data. The portions of the input data at each time period may be obtained in a vector or matrix format, for example. In an example, a current portion of the input data, at time i, may be a single value; and a previous portion of the input data, at time i−1, may be a single value. Thus, the input data 510a $X_1(i, i-1)$ may be a vector. In some examples, the current portion of the input data, at time i, may be a vector value; and a previous portion of the input data, at time i−1, may be a vector value. Thus, the input data 510a $X_1(i, i-1)$ may be a matrix.

Such input data, which is obtained with a current and previous portion of input data, may be representative of a Markov process, such that a causal relationship between at least the current sample and the previous sample may improve the accuracy of weight estimation for training of coefficient data to be utilized by the MAC units and MLUs of the recurrent neural network 512. As noted previously, the input data 510 may represent data to be transmitted (e.g., amplified signals) at a first frequency and/or data to be transmitted at a first wireless channel. Accordingly, the input data 510b X2(i, i−1) may represent data to be transmitted at a second frequency or at a second wireless channel, including a current portion of the input data, at time i, and a previous portion of the input data, at time i−1. And, the number of input signals to be transmitted by the recurrent neural network 512 may equal in some examples to a number of antennas coupled to an electronic device 110 implementing the recurrent neural network 512. Accordingly, the input data 510c Xm(i, i−1) may represent data to be transmitted at a m'th frequency or at a m'th wireless channel, including a current portion of the input data, at time i, and a previous portion of the input data, at time i−1.

The recurrent neural network 512 may include multiplication unit/accumulation (MAC) units 511a-c, 516a-b, and 520; delay units 513a-c, 517a-b, and 521; and memory lookup units (MLUs) 514a-c, 518a-b, and 522 that, when mixed with input data to be transmitted from the memory 545, may generate output data (e.g. B (1)) 530. Each set of MAC units and MLU units having different element numbers may be referred to as a respective stage of combiners for the recurrent neural network 512. For example, a first stage of combiners includes MAC units 511a-c and MLUs 514a-c, operating in conjunction with delay units 513a-c, to form a first stage or "layer," as referenced with respect to FIG. 5A having "hidden" layers as various combiner stages. Continuing in the example, the second stage of combiners includes MAC units 516a-b and MLUs 518a-b, operating in conjunction with delay units 517a-b, to form a second stage or second layer of hidden layers. And the third stage of combiners may be a single combiner including the MAC unit 520 and MLU 522, operating in conjunction with delay unit 521, to form a third stage or third layer of hidden layers.

The recurrent neural network 512, may be provided instructions 515, stored at the mode configurable control 505, to cause the recurrent neural network 512 to configure the multiplication units 511a-c, 516a-c, and 520 to multiply and/or accumulate input data 510a, 510b, and 510c and delayed versions of processing results from the delay units 513a-c, 517a-b, and 521 (e.g., respective outputs of the respective layers of MAC units) with coefficient data to generate the output data 530 B(1). For example, the mode configurable control 505 may execute instructions that cause the memory 545 to provide coefficient data (e.g., weights and/or other parameters) stored in the memory 545 to the MLUs 514a-c, 518a-b, and 522 as weights for the MAC units 511a-c, 516a-b, and 520 and delay units 513a-c, 517a-b, and 521. During operation, the mode configuration control 505 may be used to select weights and/or other parameters in memory 545 based on an indicated self-interference noise to calculate, e.g., the self-interference noise from a certain transmitting antenna to another transmitting antenna.

As denoted in the representation of the respective outputs of the respective layers of MAC units (e.g., the outputs of the MLUs 514a-c, 518a-b, and 522), the input data to each MAC unit 511a-c, 516a-b, and 520 includes a current portion of input data, at time i, and a delayed version of a processing result, at time i−1. For example, a current portion of the input data may be a sample obtained at the antenna 101 at a certain time period (e.g., at time i), while a delayed version of a processing result may be obtained from the output of the delay units 513a-c, 517a-b, and 521, which is representative of a time period previous to the certain time period (e.g., as a result of the introduced delay). Accordingly, in using such input data, obtained from both a current period and at least one previous period, output data B(1) 530 may be representative of a Markov process, such that a causal relationship between at least data from a current time period and a previous time period may improve the accuracy of weight estimation for training of coefficient data to be utilized by the MAC units and MLUs of the recurrent neural network 512 or inference of signals to be transmitted in utilizing the recurrent neural network 512. As noted previously, the input data 510 may represent amplified signals $x_1(n)$, $x_2(n)$ 221, 223. Accordingly, the input data 510b X2(i, i−1) may represent amplified signal $x_2(n)$ 223. And, the number of input signals obtained by the recurrent neural network 512 may equal in some examples to a number of antennas coupled to an electronic device 110 implementing the recurrent neural network 512. Accordingly, the input data 510c Xm(i, i−1) may represent data obtained at a m'th frequency or at a m'th wireless channel, including a current portion of the input data, at time i. Accordingly, in utilizing delayed versions of output data from 513a-c, 517a-b, and 521 the recurrent neural network 170 provides individualized frequency-band, time-correlation data for processing of signals to be transmitted.

In an example of executing such instructions 515 for mixing input data with coefficients, at a first layer of the MAC units 511a-c and MLUs 514a-c, the multiplication unit/accumulation units 511a-c are configured to multiply and accumulate at least two operands from corresponding input data 510a, 510b, or 510c and an operand from a respective delay unit 513a-c to generate a multiplication processing result that is provided to the MLUs 514a-c. For example, the multiplication unit/accumulation units 511a-c may perform a multiply-accumulate operation such that three operands, MN, and T are multiplied with respective coefficient data, and then added with P to generate a new version of P that is stored in its respective MLU 514a-c. Accordingly, the MLU 514a latches the multiplication processing result, until such time that the stored multiplication processing result is be provided to a next layer of MAC units. The MLUs 514a-c, 518a-b, and 522 may be implemented by any number of processing elements that operate as a memory look-up unit such as a D, T, SR, and/or JK latches.

Additionally in the example, the MLU 514a provides the processing result to the delay unit 513a. The delay unit 513a delays the processing result (e.g., h1(i)) to generate a delayed version of the processing result (e.g, h1(i−1)) to output to the MAC unit 511a as operand T. While the delay units 513a-c, 517a-b, and 521 of FIG. 5C are depicted introducing a delay of '1', it can be appreciated that varying amounts of delay may be introduced to the outputs of first layer of MAC units. For example, a clock signal that introduced a sample delay of '1' (e.g., h1(i−1)) may instead introduce a sample delay of '2', '4', or '100'. In various implementations, the delay units 513a-c, 517a-b, and 521 may correspond to any number of processing units that can introduce a delay into processing circuitry using a clock signal or other time-oriented signal, such as flops (e.g., D-flops) and/or one or more various logic gates (e.g., AND, OR, NOR, etc. . . . ) that may operate as a delay unit.

In the example of a first hidden layer of a recurrent neural network, the MLUs 514a-c may retrieve coefficient data stored in the memory 545, which may be weights associated with weights to be applied to the first layer of MAC units to both the data from the current period and data from a previous period (e.g., the delayed versions of first layer processing results). For example, the MLU 514a can be a table look-up that retrieves one or more coefficients (e.g., specific coefficients associated with a first frequency) to be applied to both operands M and N, as well as an additional coefficient to be applied to operand T. The MLUs 514a-c also provide the generated multiplication processing results to the next layer of the MAC units 516a-b and MLUs 518a-b. The additional layers of the MAC units 516a, 516b and MAC unit 520 working in conjunction with the MLUs 518a, 518b and MLU 522, respectively, may continue to process the multiplication results to generate the output data 530 B(n). Using such a circuitry arrangement, the output data 530 B(1) may be generated from the input data 510a, 510b, and 510c.

Figure 5D:
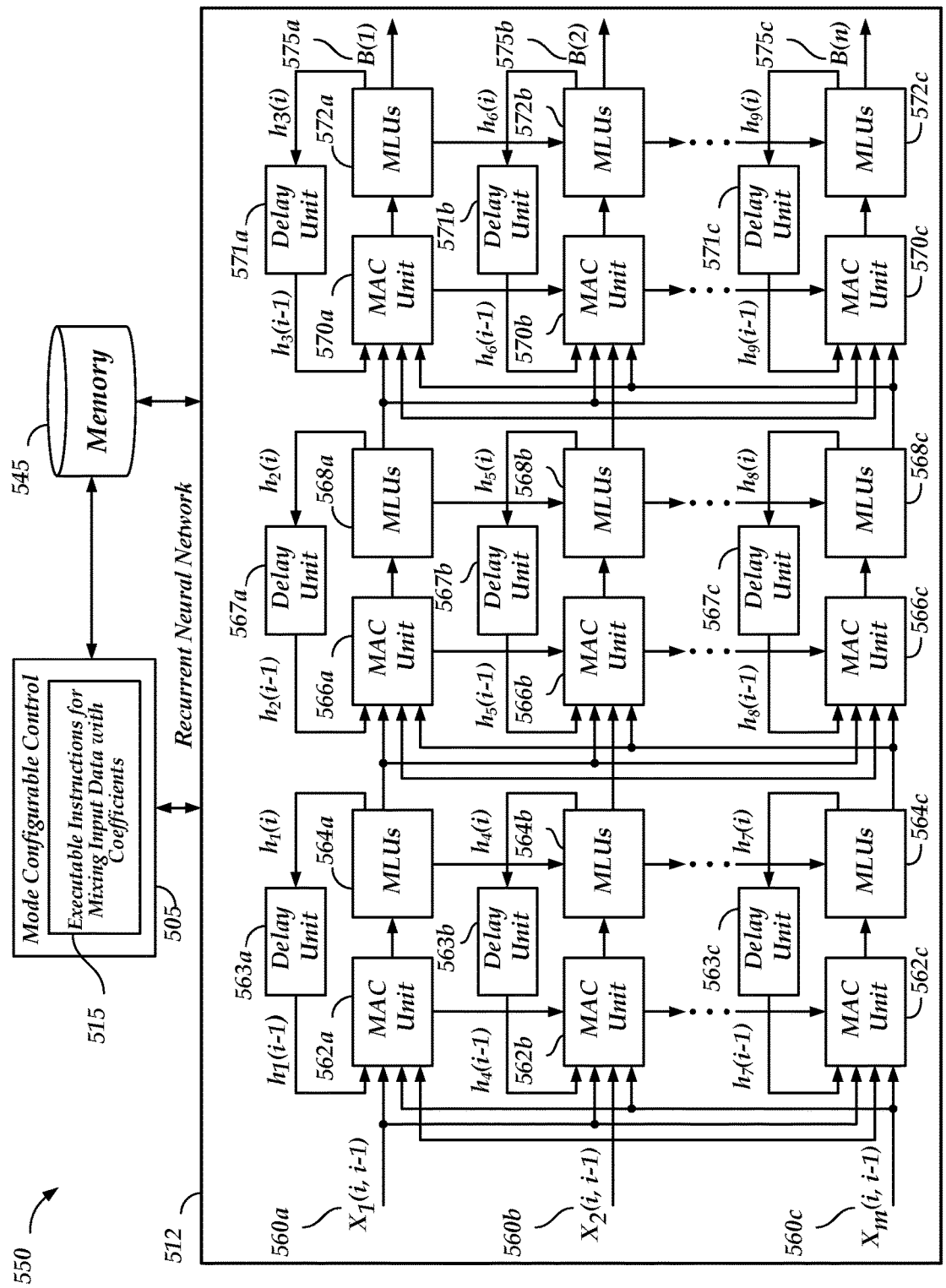

Advantageously, the recurrent neural network 512 of system 501 may utilize a reduced number of MAC units and/or MLUs, e.g., as compared to the recurrent neural network 512 of FIG. 5D. The number of MAC units and MLUs in each layer of the recurrent neural network 512 is associated with a number of channels and/or a number of antennas coupled to a device in which the recurrent neural network 512 is being implemented. For example, the first layer of the MAC units and MLUs may include m number of those units, where m represents the number of antennas, each antenna receiving a portion of input data. Each subsequent layer may have a reduced portion of MAC units, delay units, and MLUs. As depicted, in FIG. 5C for example, a second layer of MAC units 516a-b, delay unit 517a-b, and MLUs 518a-b may include m−1 MAC units and MLUs, when m=3. Accordingly, the last layer in the recurrent neural network 512, including the MAC unit 520, delay unit 521, and MLU 522, includes only one MAC, one delay unit, and one MLU. Because the recurrent neural network 512 utilizes input data 510a, 510b, and 510c that may represent a Markov process, the number of MAC units and MLUs in each subsequent layer of the processing unit may be reduced, without a substantial loss in precision as to the output data 530 B(1); for example, when compared to a recurrent neural network 512 that includes the same number of MAC units and MLUs in each layer, like that of recurrent neural network 512 of system 550.

The coefficient data, for example from memory 545, can be mixed with the input data 510a-510c and delayed version of processing results to generate the output data 530 B(1). For example, the relationship of the coefficient data to the output data 530 B(1) based on the input data 510a-c and the delayed versions of processing results may be expressed as:

$$B(1) = a^1 * f\left(\sum_{j=1}^{m-1} a^{(m-1)} f_j\left(\sum_{k=1}^{m} a^{(m)} X_k(i)\right)\right) \quad (7)$$

where a(m), a(m−1), a1 are coefficients for the first layer of multiplication/accumulation units 511a-c and outputs of delay units 513a-c; the second layer of multiplication/accumulation units 516a-b and outputs of delay units 517a-b; and last layer with the multiplication/accumulation unit 520 and output of delay unit 521, respectively; and where f(•) is the mapping relationship which may be performed by the memory look-up units 514a-c and 518a-b. As described above, the memory look-up units 514a-c and 518a-b retrieve coefficients to mix with the input data and respective delayed versions of each layer of MAC units. Accordingly, the output data may be provided by manipulating the input data and delayed versions of the MAC units with the respective multiplication/accumulation units using a set of coefficients stored in the memory. The set of coefficients may be associated with vectors representative of self-interference noise. For example, in the case of signals to be transmitted, each coefficient of a set of coefficients may be an individual vector of self-interference of a respective wireless path to a first transmitting antenna of the plurality of antennas from at least one other transmitting antenna of the plurality of transmitting antennas. The set of coefficients may be based on connection weights obtained from the training of a recurrent neural network (e.g., recurrent neural network 170). The resulting mapped data may be manipulated by additional multiplication/accumulation units and additional delay units using additional sets of coefficients stored in the memory associated with the desired wireless protocol. The sets of coefficients multiplied at each stage of the recurrent neural network 512 may represent or provide an estimation of the processing of the input data in specifically-designed hardware (e.g., an FPGA).

Further, it can be shown that the system 501, as represented by Equation (7), may approximate any nonlinear mapping with arbitrarily small error in some examples and the mapping of system 501 may be determined by the coefficients a(m), a(m−1), a1. For example, if such coefficient data is specified, any mapping and processing between the input data 510a-510c and the output data 530 may be accomplished by the system 501. For example, the coefficient data may represent non-linear mappings of the input data 510a-c to the output data B(1) 530. In some examples, the non-linear mappings of the coefficient data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 514a-c, 518a-b may be deactivated. For example, one or more of the memory look-up units 514a-c, 518a-b may operate as a gain unit with the unity gain. Such a relationship, as derived from the circuitry arrangement depicted in system 501, may be used to train an entity of the computing system 501 to generate coefficient data. For example, using Equation (7), an entity of the computing system 501 may compare input data to the output data to generate the coefficient data.

Each of the multiplication unit/accumulation units 511a-c, 516a-b, and 520 may include multiple multipliers, multiple accumulation unit, or and/or multiple adders. Any one of the multiplication unit/accumulation units 511a-c, 516a-b, and 520 may be implemented using an ALU. In some examples, any one of the multiplication unit/accumulation units 511a-c, 516a-b, and 520 can include one multiplier and one adder that each perform, respectively, multiple multiplications and multiple additions. The input-output relationship of a multiplication/accumulation unit 511a-c, 516a-b, and 520 may be represented as:

$$B_{out} = \sum_{i=1}^{I} C_i * B_{in}(i) \quad (8)$$

where "I" represents a number to perform the multiplications in that unit, $C_i$ the coefficients which may be accessed from a memory, such as memory 545, and $B_{in}(i)$ represents a factor from either the input data 510a-c or an output from multiplication unit/accumulation units 511a-c, 516a-b, and 520. In an example, the output of a set of multiplication unit/accumulation units, $B_{out}$, equals the sum of coefficient data, $C_i$ multiplied by the output of another set of multiplication unit/accumulation units, $B_{in}(i)$, $B_{in}(i)$ may also be the input data such that the output of a set of multiplication unit/accumulation units, $B^{out}$, equals the sum of coefficient data, $C_i$ multiplied by input data.

While described in FIG. 5C as a recurrent neural network 512, it can be appreciated that the recurrent neural network 512 may be implemented in or as any of the recurrent neural networks described herein, in operation to cancel and/or compensate self-interference noise via the calculation of such noise as implemented in a recurrent neural network. For example, the recurrent neural network 512 can be used to implement any of the recurrent neural networks described herein; for example, the recurrent neural network 240 of FIG. 2A or recurrent neural network 260 of FIG. 2B. In such implementations, recurrent neural networks may be used to reduce and/or improve errors which may be introduced by self-interference noise. Advantageously, with such an implementation, wireless systems and devices implementing such RNNs increase capacity of their respective wireless networks because additional data may be transmitted in such networks, which would not otherwise be transmitted due to the effects of self-interference noise.

FIG. 5D is a schematic illustration of a recurrent neural network 512 arranged in a system 550 in accordance with examples described herein. Such a hardware implementation (e.g., system 550) may be used, for example, to implement one or more neural networks, such as the recurrent neural network 240 of FIG. 2, the neural network 500 of FIG. 5A, or recurrent neural network 170 of FIG. 5B. Similarly described elements of FIG. 5D may operate as described with respect to FIG. 5C, but may also include additional features as described with respect to FIG. 5D. For example, FIG. 5D depicts MAC units 562a-c and delay units 563a-c that may operate as described with respect MAC units 511a-c and delay units 513a-c of FIG. 5C. Accordingly, elements of FIG. 5D, whose numerical indicator is offset by 50 with respect to FIG. 5C, include similarly elements of the recurrent neural network 512; e.g., MAC unit 566a operates similarly with respect to MAC unit 516a. The system 550, including recurrent neural network 512, also includes additional features not highlighted in the recurrent neural network 512 of FIG. 5C. For example, the recurrent neural network 512 of FIG. 5D additionally includes MAC units 566c and 570b-c; delay units 567c and 571b-c; and MLUs 568c and 572b-c, such that the output data is provided as 575a-c, rather than as singularly in FIG. 5C as B(1) 530. Advantageously, the system 550 including a recurrent neural network 512 may process the input data 560a-c to generate the output data 575a-c with greater precision. For example, the recurrent neural network 512 may process the input data 560a-560c with additional coefficient retrieved at MLU 568c and multiplied and/or accumulated by additional MAC units 566c and 570b-c and additional delay units 567c and 571b-c, to generate output data 575a-c with greater precision. For example, such additional processing may result in output data that is more precise with respect providing output data that estimates a vector representative of self-interference noise between two different antennas. In implementations where board space (e.g., a printed circuit board) is not a primary factor in design, implementations of the recurrent neural network 512 of FIG. 5D may be desirable as compared to that of recurrent neural network 512 of FIG. 5C; which, in some implementations may occupy less board space as a result of having fewer elements than the recurrent neural network 512 of FIG. 5D.

Figure 5E:
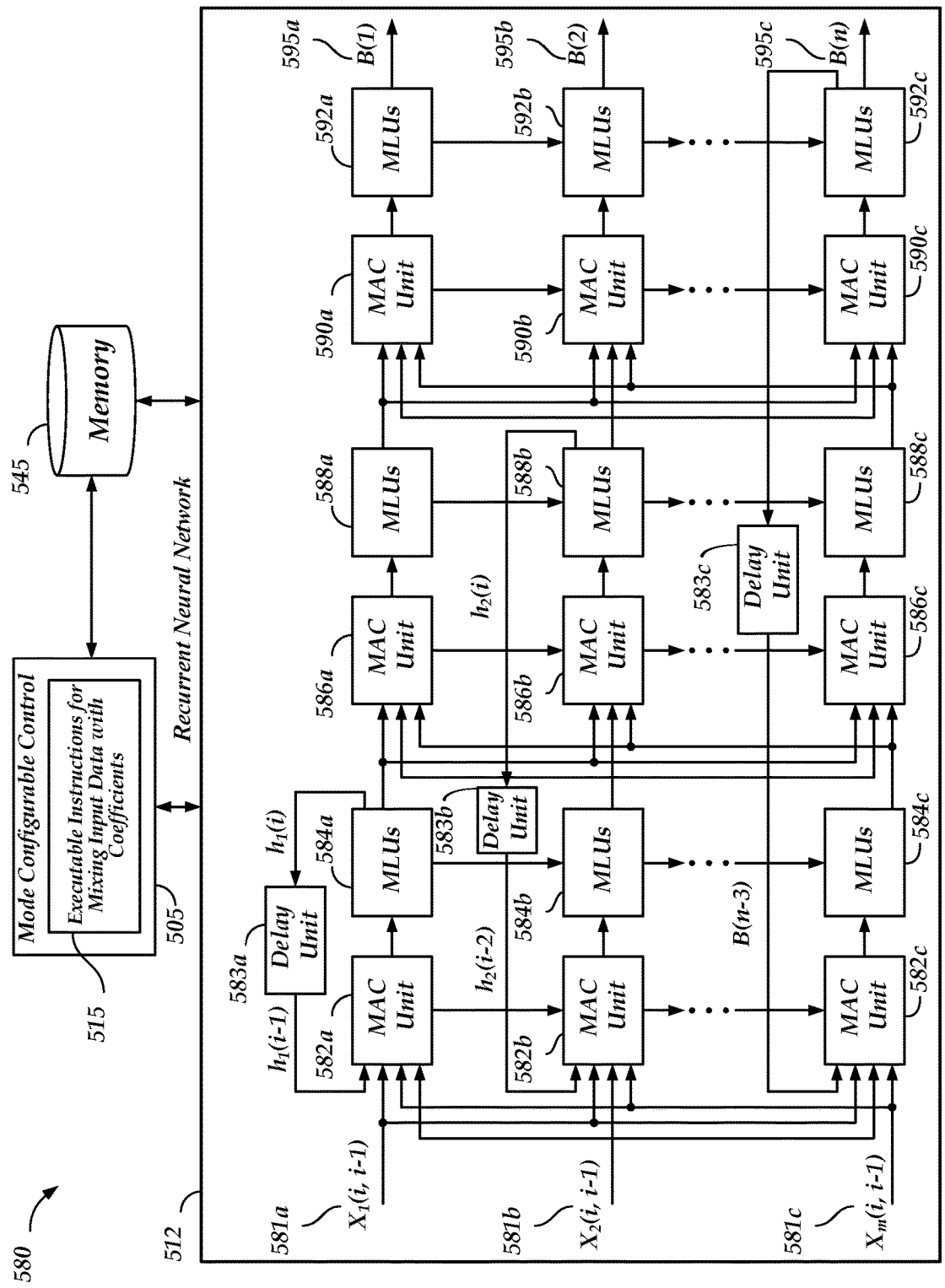

FIG. 5E is a schematic illustration of a recurrent neural network 512 arranged in a system 580 in accordance with examples described herein. Such a hardware implementation (e.g., system 580) may be used, for example, to implement one or more neural networks, such as the recurrent neural network 240 of FIG. 2, neural network 500 of FIG. 5A, or recurrent neural network 170 of FIG. 5B. Similarly described elements of FIG. 5E may operate as described with respect to FIG. 5D, except for the delay units 563a-c, 567a-c, and 571a-c of FIG. 5D. For example, FIG. 5E depicts MAC units 582a-c and delay units 583a-c that may operate as described with respect to MAC units 562a-c and delay units 563a-c of FIG. 5D. Accordingly, elements of FIG. 5E, whose numerical indicator is offset by 20 with respect to FIG. 5D, include similarly elements of the recurrent neural network 512; e.g., MAC unit 586a operates similarly with respect to MAC unit 566a.

The system 580, including recurrent neural network 512, also includes additional features not highlighted in the recurrent neural network 512 of FIG. 5D. Different than FIG. 5D, FIG. 5E depicts delay units 583a, 583b, and 583c. Accordingly, the processing unit of FIG. 5E illustrate that recurrent neural network 512 may include varying arrangements to the placement of the inputs and outputs of delay units, as illustrated with delay units 583a, 583b, and 583c. For example, the output of MLUs 588b may be provided to delay unit 583b, to generate a delayed version of that processing result from the second layer of MAC units, as an input to the first layer of MAC units, e.g., as an input to MAC unit 582b. Accordingly, the recurrent neural network 512 of system 580 is illustrative that delayed versions of processing results may be provided as inputs to other hidden layers, different than the recurrent neural network 512 of system 550 in FIG. 5D showing respective delayed versions being provided as inputs to the same layer in which those delayed versions were generated (e.g., the output of MLU 568b is provided to delay unit 567b, to generate a delayed version for the MAC unit 566b in the same layer from which the processing result was outputted). Therefore, in the example, even the output B(n) 595c may be provided, from the last hidden layer, to the first hidden layer (e.g., as an input to MAC unit 582c).

Advantageously, such delayed versions of processing results, which may be provided as inputs to different or additional hidden layers, may better compensate "higher-order" memory effects in a recurrent neural network 170 that implements one or more recurrent neural network 512 of FIG. 5E, e.g., as compared to the recurrent neural network 512 of FIG. 5C or 5D. For example, higher-order memory effects model the effects of leading and lagging envelope signals used during training of the recurrent neural network 170, to provide output data that estimates a vector representative of self-interference noise between two different antennas of an electronic device 110. In the example, a recurrent neural network 170 that estimates that vector (e.g., a Volterra series model) may include varying delayed versions of processing results that corresponds to such leading and lagging envelopes (e.g., of various envelopes encapsulating the vector). Accordingly, implementing the recurrent neural network 512 incorporates such higher-order memory effects, e.g., for an inference of a recurrent neural network 170, to provide output data 595a-c based on input data 581a-c.

While described in FIGS. 5D and 5E respectively describe a recurrent neural network 512, it can be appreciated that the recurrent neural network 512 or combinations thereof may be implemented in or as any of the recurrent neural networks described herein, in operation to cancel and/or compensate self-interference noise via the calculation of such noise as implemented in a recurrent neural network. In such implementations, recurrent neural networks may be used to reduce and/or improve errors which may be introduced by self-interference noise. Advantageously, with such an implementation, wireless systems and devices implementing such RNNs increase capacity of their respective wireless networks because additional data may be transmitted in such networks, which would not otherwise be transmitted due to the effects of self-interference noise.

Figure 6A:
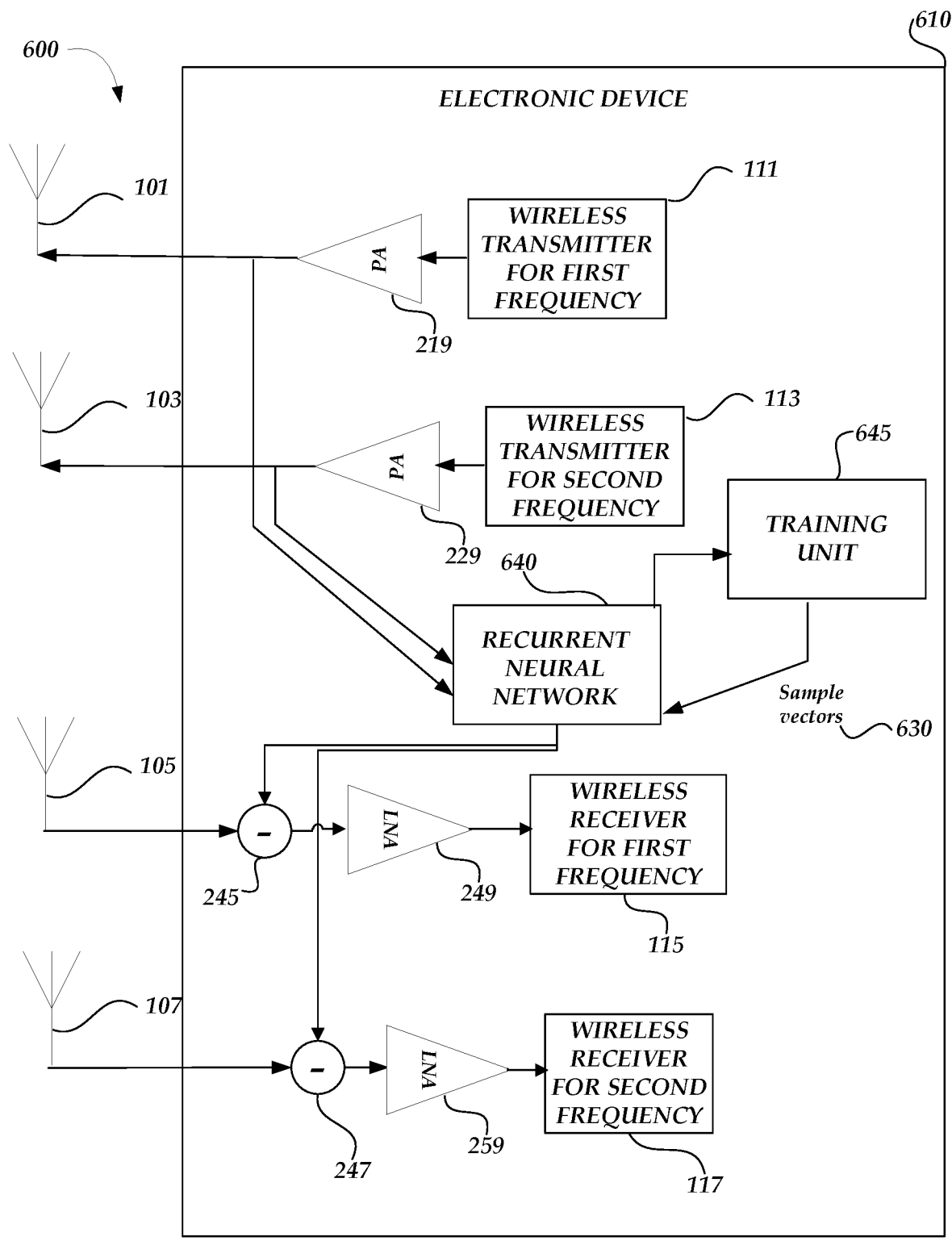
FIG. 6A is a schematic illustration of an electronic device arranged in accordance with examples described herein.

FIG. 6A is a schematic illustration 600 of an electronic device 610 arranged in accordance with examples described herein. The electronic device 610 includes antennas 101, 103, 105, 107; wireless transmitters 111, 113; power amplifiers 219, 229; wireless receivers 115, 117; compensation components 245, 247; and LNAs 249, 259, which may operate in a similar fashion as described with reference to FIG. 2A. The electronic device 610 also includes the recurrent neural network 640 and training unit 645 that may provide sample vectors 660 to the recurrent neural network 640. The recurrent neural network 170 may be utilized to implement the recurrent neural network 640, for example. The training unit 645 may determine center vectors $C_i$ and the connection weights $W_{ij}$, for example, by optimizing the minimized error of adjusted signals (e.g., adjusted signals 508 $y_i(n)$ of FIG. 5A). For example, an optimization problem can be solved utilizing a gradient descent procedure that computes the error, such that the minimized error may be expressed as:

$$E = \sum_{n=1}^{M} \left\| Y(n) - \widehat{Y(n)} \right\|^2 \quad (9)$$

$\widehat{Y(n)}$ may be a corresponding desired output vector. To solve this minimization problem, the training unit 645 may utilize sample vectors to determine the center vectors $C_i$ and the connection weights $W_{ij}$.

To determine the center vectors $C_i$, the training unit 645 may perform a cluster analysis (e.g., a k-means cluster algorithm) to determine at least one center vector among a corresponding set of vectors, such as sample vectors 630 based on training points or random vectors. In the sample vector approach, a training point may be selected towards the center for each of the sample vectors 630. The training point may be center of each cluster partition of a set of the sample vectors 630, such that optimizing the cluster center is expressed as minimized error away from the cluster center for a given training point in the cluster partition. Such a relationship may be expressed as:

$$E_{k\_means} = \sum_{j=1}^{H} \sum_{n=1}^{M} B_{jn} \| X(n) - C_j \|^2 \quad (10)$$

where $B_{jn}$ is the cluster partition or membership function forming an H×M matrix. Each column of H×M matrix represents an available sample vector and each row of H×M matrix represents a cluster. Each column may include a single "1" in the row corresponding to the cluster nearest to that training point and zeroes in the other entries of that column. The training unit 645 may initialize the center of each cluster to a different randomly chosen training point. Then each training example may be assigned by the training unit 645 to a processing element (e.g., a processing element 506) nearest to it. When all training points have been assigned by the training unit 645, the training unit 645 may find the average position of the training point for each cluster and may move the cluster center to that point, when the error away from the cluster center for each training point is minimized, denoting the set of center vectors $C_i$ for the processing elements (e.g., the processing elements 506).

To determine the connection weights $W_{ij}$ for the connections between processing elements 506 and processing elements 509, the training unit 645 may utilize a linear least-squares optimization according to a minimization of the weights expressed as:

$$\min_W \sum_{n=1}^M \|Y(n) - \widehat{Y(n)}\|^2 = \min_W \|WF - \hat{Y}\|^2 \quad (11)$$

where $W=\{W_{ij}\}$ is the L×H matrix of the connection weights, F is an H×M matrix comprising the outputs $h_i(n)$ of the processing elements 506, expressed in Equation 11. $\widehat{Y(n)}$ may be a corresponding desired output matrix, with an L×M size. Accordingly, in matrix algebra form, connection weight matrix W may be expressed as $$\widehat{W} = \hat{Y} F^+ = \lim_{Y\alpha\to 0} F^T(FF^T + \alpha I)^{-1} \quad (12)$$

where $F^+$ is the pseudo-inverse of F.

In some examples, for example in the context of self-interference calculator 500 implemented as recurrent neural network 640, to determine the connection weights $W_{ij}$ for the connections between processing elements 506 and processing elements 509, a training unit 645 may utilize a batch-processing embodiment where sample sets are readily available (e.g., available to be retrieved from a memory). The training unit 645 may randomly initialize the connection weights in the connection weight matrix W. The output vector Y(n) may be computed in accordance with Equation 12. An error term $e_i(n)$ may be computed for each processing element 506, which may be expressed as:

$$e_i(n) = y_i(n) - \widehat{y}_i(n) \quad (i = 1, 2, \ldots \ldots L) \quad (13)$$

where $\widehat{y}_i(n)$ is a corresponding desired output vector. The connection weights may be adjusted in batch-processing examples in accordance with a machine learning expression where a γ is the learning-rate parameter which could be fixed or time-varying. In the example, the machine learning expression may be:

$$W_{ij}(n+1) = \quad (14)$$
$$W_{ij}(n) + \gamma e_i(n) f_j(\|X(n) - C_j\|) \quad (i = 1, 2, \ldots \ldots L; j = 1, 2, \ldots \ldots, M)$$

Such a process may iterate until passing a specified error threshold. In the example, the total error may be expressed as:

$$\epsilon = \|Y(n) - \widehat{Y(n)}\|^2$$

Accordingly, the training unit 645 may iterate recursively the process described herein until the error ϵ passes the specified error threshold, such as passing below the specified error threshold.

In some examples, when the training unit 645 is determining the center vectors $C_i$ that are a non-linear set of vectors fitting a Gaussian function, a scaling factor σ may be used before determination of the connection weights $W_{ij}$ for the connections between processing elements 506 and processing elements 509 of a recurrent neural network 640. In a Gaussian function example, a convex hull of the vectors $C_i$ may be used such that the training points allow a smooth fit for the output of the processing elements 506. Accordingly, each center vector $C_i$ may be related to another center vector $C_i$ of the processing elements 506, such that each center vector $C_i$ activates another center vector $C_i$ when computing the connection weights. A scaling factor may be based on heuristic that computes the P-nearest neighbor, such that:

$$\sigma_i = \frac{1}{P}\sum_{j=1}^P \|C_j - C_i\|^2 \quad (i = 1, 2, \ldots, H)$$

where $C_j$ (for i×1, 2, . . . , H) are the P-nearest neighbors of $C_i$.

Figure 6B:
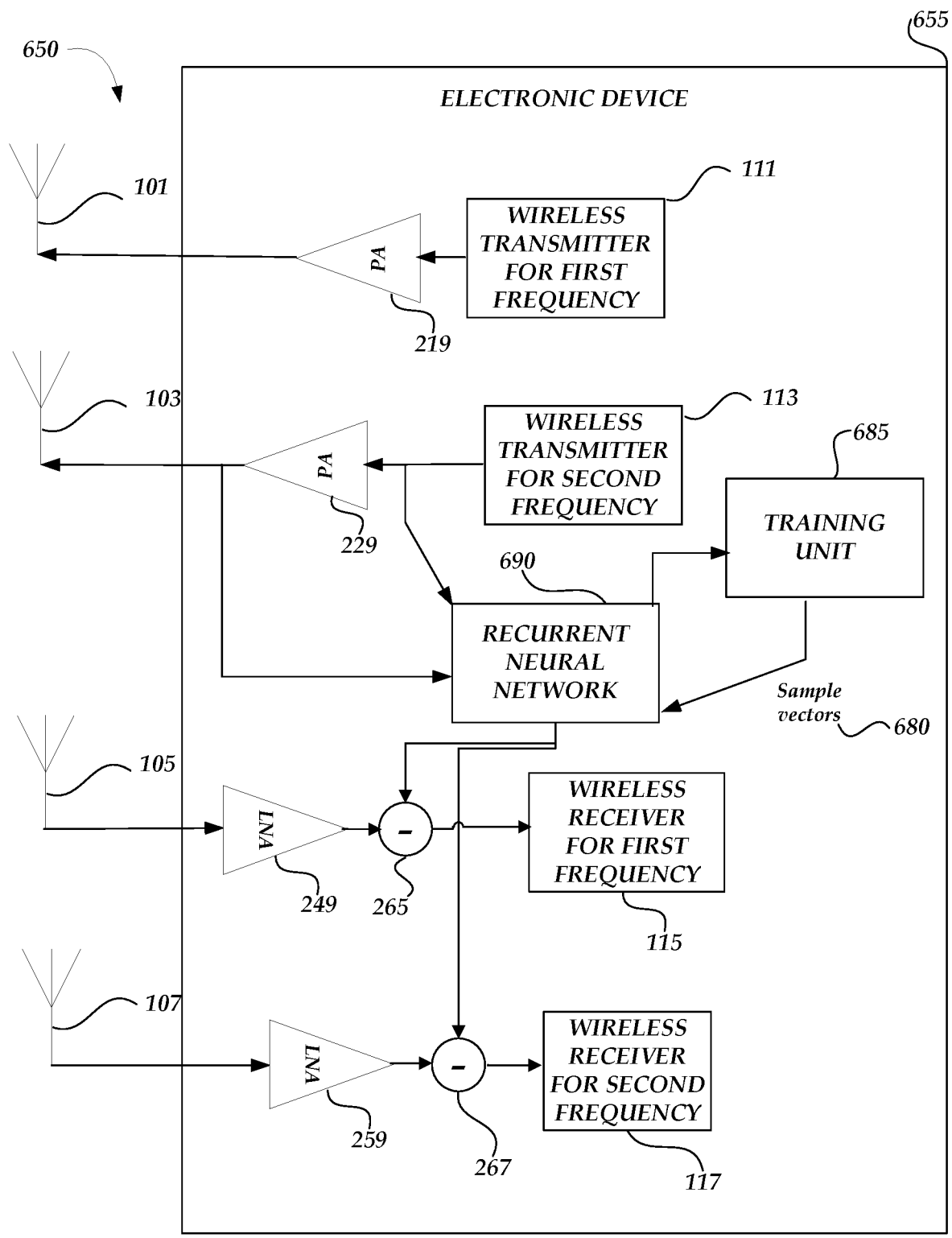
FIG. 6B is a schematic illustration of an electronic device arranged in accordance with examples described herein.

FIG. 6B is a schematic illustration 650 of an electronic device 655 arranged in accordance with examples described herein. The electronic device 655 includes antennas 101, 103, 105, 107; wireless transmitters 111, 113; power amplifiers 219, 229; wireless receivers 115, 117; compensation components 265, 267; and LNAs 249, 259, which may operate in a similar fashion as described with reference to FIG. 2B. The electronic device 655 also includes the recurrent neural network 690 and training unit 685 that may provide sample vectors 680 to the recurrent neural network 690. The recurrent neural network 170 may be utilized to implement the recurrent neural network 690, for example. The training unit 685 may determine center vectors $C_i$ and the connection weights $W_{ij}$, for example, by optimizing the minimized error of adjusted signals (e.g., adjusted signals 508 $y_i(n)$ of FIG. 5A). In the same fashion as described with respect to FIG. 6A, the training unit 685 may determine such center vectors $C_i$ and the connection weights $W_{ij}$ for the electronic device 655.

Figure 7A:
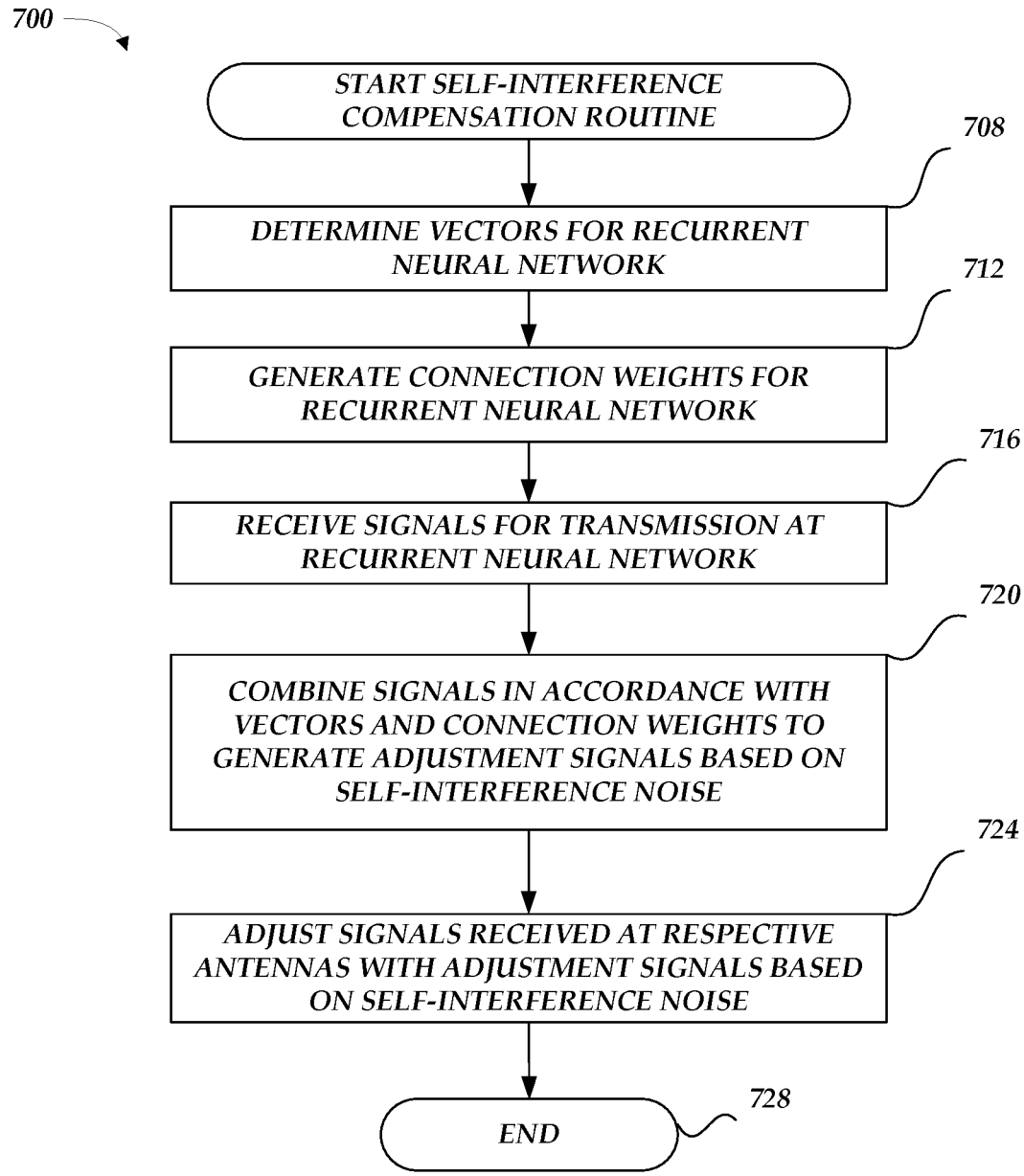
FIG. 7A is a schematic illustration of a full duplex compensation method in accordance with examples described herein.

FIG. 7A is a schematic illustration of a full duplex compensation method 700 in accordance with examples described herein. Example method 700 may be implemented using, for example, electronic device 102, 110 of FIG. 1, electronic device 110 in FIG. 2A, electronic device 270 of FIG. 2B, electronic device 610 of FIG. 6A, electronic device 655 of FIG. 6B, or any system or combination of the systems depicted in the FIG. 1-2, 5A-5E, or 6A-6B described herein. The operations described in blocks 708-728 may also be stored as computer-executable instructions in a computer-readable medium.

Example method 700 may begin with block 708 that starts execution of the self-interference compensation method and recites "determine vectors for recurrent neural network." In the example, the center vectors may be determined according a cluster analysis. For example, an error may be minimized such that the distance from the cluster center to a given training point is minimized. Block 708 may be followed by block 712 that recites "generate connection weights for a recurrent neural network." In the example, the connection weights may be determined according to a linear least-squares optimization or a batch processing example as described herein. Block 712 may be followed by block 716 that recites "receive recurrent neural network signals for transmission at recurrent neural network." Amplified signals $x_1(n)$, $x_2(n)$, $x_3(n)$, $x_N(n)$ 502 may be received as input to a recurrent neural network. In the example, transmitter output may be a stream of transmission data from a corresponding transmitter that is performing RF operations on corresponding signals to be transmitted.

Block 716 may be followed by block 720 that recites "combine signals in accordance with vectors and connection weights to generate adjustment signals based on self-interference noise." For example, various ALUs, such as multiplication units, in an integrated circuit may be configured to operate as the circuitry of FIG. 5A, thereby combining the amplified signals $x_1(n)$, $x_2(n)$, $x_3(n)$, $x_N(n)$ 502 to generate adjusted signals $y_1(n)$, $y_2(n)$, $y_3(n)$, $y_L(n)$ 508 as described herein. Block 720 may be followed by a block 724 that recites "adjust signals received at respective antennas with adjustment signals based on self-interference noise." In the example, compensation components 245, 247 may receive the adjusted signals $y_1(n)$, $y_2(n)$ 241, 243 and compensate an incoming received wireless transmission from antennas 105, 107. In the example, the compensation components 245, 247 may subtract the adjusted signals $y_1(n)$, $y_2(n)$ 241, 243 from the received wireless transmission to produce compensated received signals for the respective wireless receivers 115, 117, thereby achieving full duplex compensation mode. Block 724 may be followed by block 728 that ends the example method 700.

In some examples, the blocks 708 and 712 may be an optional block. For example, determination of the center vectors and the connection weights may occur during a training mode of an electronic device described herein, while the remaining blocks of method 700 may occur during an operation mode of the electronic devices described herein.

Figure 7B:
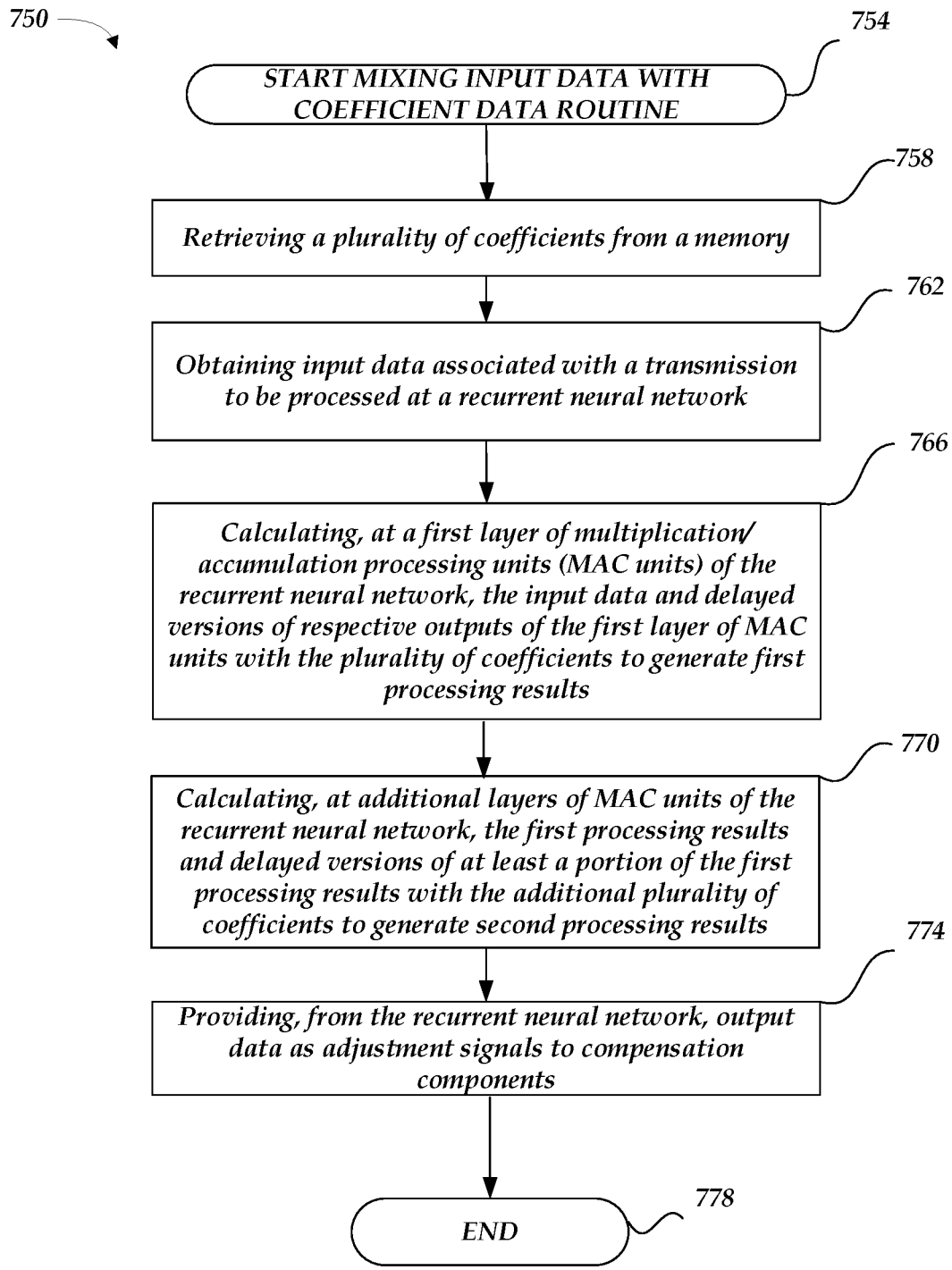
FIG. 7B is a flowchart of a method in accordance with examples described herein.

FIG. 7B is a flowchart of a method 750 in accordance with examples described herein. Example method 750 may be implemented using, for example, electronic device 102, 110 of FIG. 1, electronic device 110 in FIG. 2A, electronic device 270 of FIG. 2B, electronic device 610 of FIG. 6A, electronic device 655 of FIG. 6B, or any system or combination of the systems depicted in the FIG. 1-2, 5A-5E, or 6A-6B described herein. The operations described in blocks 754-778 may also be stored as computer-executable instructions in a computer-readable medium such as the mode configurable control 505, storing the executable instructions 515.

Example method 750 may begin with a block 754 that starts execution of the mixing input data with coefficient data routine. The method may include a block 758 recites "retrieving a plurality of coefficients from a memory." As described herein, a memory look-up (MLU) units can be configured to retrieve a plurality of coefficients and provide the plurality of coefficients as the connection weights for a respective layer of processing elements of a recurrent neural network. For example, the memory may store (e.g., in a database) coefficients representative of self-interference noise among various antennas of an electronic device. In the implementation of recurrent neural network 512 of FIG. 5C, for example, the MLU 514a can be a table look-up that retrieves one or more coefficients (e.g., specific coefficients associated with a first frequency) to be applied to both operands M and N, as well as an additional coefficient to be applied to operand T. Accordingly, MLUs of the recurrent neural network may request the coefficients from a memory part of the implementing computing device, from a memory part of an external computing device, or from a memory implemented in a cloud-computing device. In turn, the plurality of coefficients may be retrieved from the memory as utilized by the recurrent neural network.

Block 758 may be followed by block 762 that recites "obtaining input data associated with a transmission to be processed at a recurrent neural network." The input data may correspond to amplified signals $x_1(n)$, $x_2(n)$ 221, 223 that is received as input data at a recurrent neural network 240 or any of the recurrent neural networks described herein. Block 762 may be followed by block 766 that recites "calculating, at a first layer of multiplication/accumulation processing units (MAC units) of the recurrent neural network, the input data and delayed versions of respective outputs of the first layer of MAC units with the plurality of coefficients to generate first processing results." As described herein, the recurrent neural network utilizes the plurality of coefficients such that mixing the coefficients with input data and delayed versions of respective outputs of the first layer of MAC units generates output data that reflects the processing of the input data with coefficients by the circuitry of FIG. 5C, 5D, or 5E. For example, various ALUs in an integrated circuit may be configured to operate as the circuitry of FIG. 5C, 5D, or 5E, thereby mixing the input data and delayed versions of respective outputs of the first layer of MAC units with the coefficients as described herein. For example, with reference to FIG. 5C, the input data and delayed versions of respective outputs of the first layer of MAC units may be calculated with the plurality of coefficients to generate first processing results, at a first layer of multiplication/accumulation processing units (MAC units). In some examples, various hardware platforms may implement the circuitry of FIG. 5C, 5D, or 5E, such as an ASIC, a DSP implemented as part of a FPGA, or a system-on-chip.

Block 766 may be followed by block 770 that recites "calculating, at additional layers of MAC units, the first processing results and delayed versions of at least a portion of the first processing results with the additional plurality of coefficients to generate second processing results." As described herein, the recurrent neural network utilizes additional plurality of coefficients such that mixing the coefficients with certain processing results and delayed versions of at least a portion of those certain processing results generates output data that reflects the processing of the input data with coefficients by the circuitry of FIG. 5C, 5D, or 5E. For example, with reference to FIG. 5C, the processing results of the first layer (e.g., multiplication processing results) and delayed versions of at least a portion of those processing results may be calculated with the additional plurality of coefficients to generate second processing results, at a second layer of multiplication/accumulation processing units (MAC units). The processing results of the second layer may be calculated with an additional plurality of coefficients to generate the output data B(1) 530.

Block 770 may be followed by block 774 that recites "providing, from the recurrent neural network, output data as adjustment signals to compensation components." As described herein, the output data may be provided to compensation components 245, 247 to compensate or cancel self-interference noise. Once provided, received signals may also be adjusted based on the adjusted signals, such that both signals being transmitted and received are simultaneously being processed, thereby achieving full-duplex transmission. Block 774 may be followed by block 778 that ends the example method 750. In some examples, the block 758 may be an optional block.

The blocks included in the described example methods 700 and 750 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 8:
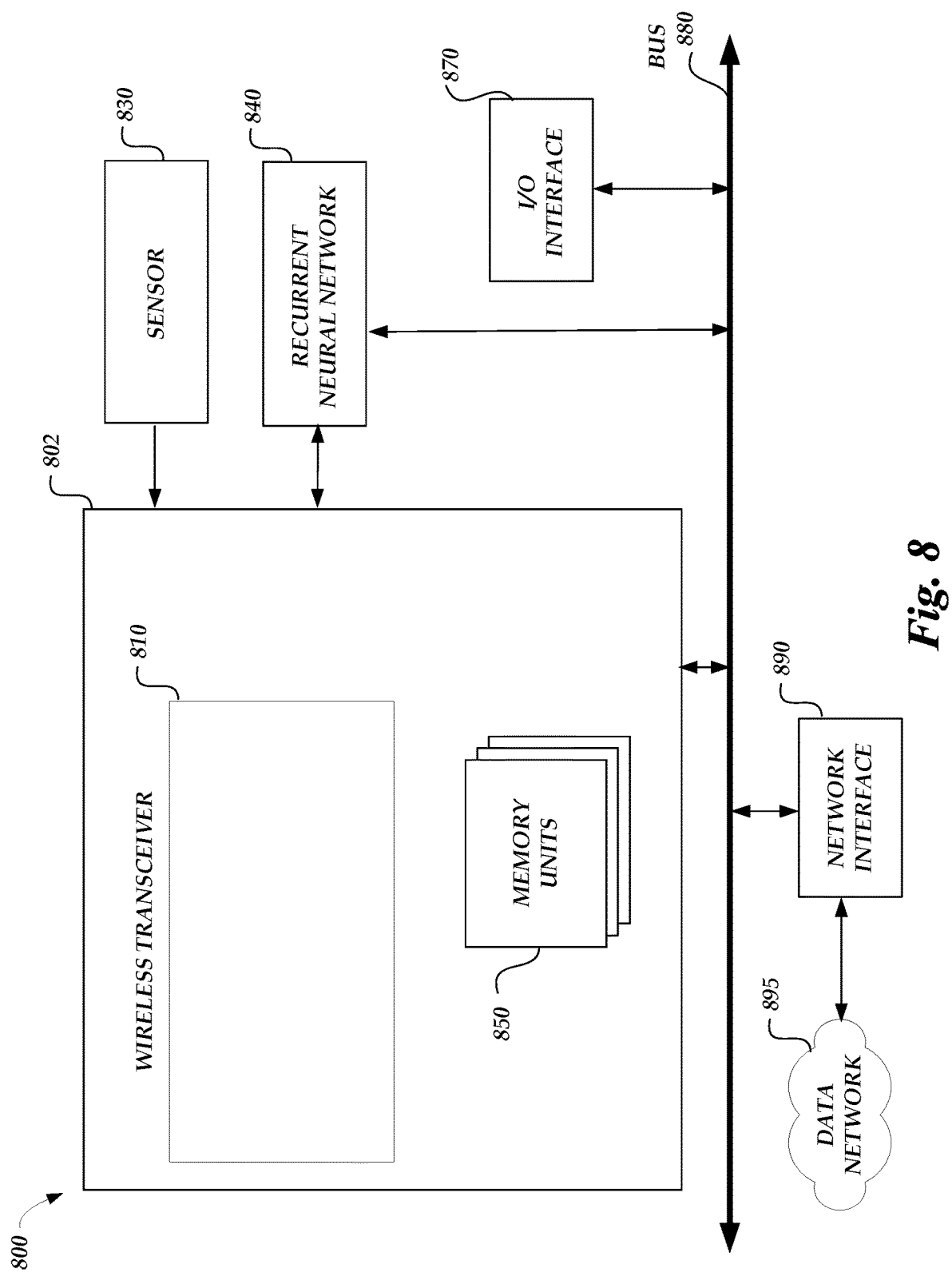
FIG. 8 is a block diagram of a computing device arranged in accordance with examples described herein.

FIG. 8 is a block diagram of an electronic device 800 arranged in accordance with examples described herein. The electronic device 800 may operate in accordance with any example described herein, such as electronic device 102, 110 of FIG. 1, electronic device 110 in FIG. 2A, electronic device 270 of FIG. 2B, electronic device 610 of FIG. 6A, electronic device 655 of FIG. 6B, or any system or combination of the systems depicted in the Figures described herein. The electronic device 800 may be implemented in a smartphone, a wearable electronic device, a server, a computer, an appliance, a vehicle, or any type of electronic device. For example, FIGS. 9-12 describe various devices that may be implemented as the electronic device 800 using a recurrent neural network 840 to generate inference results or train on data acquired from the sensor 830. Generally, recurrent neural networks (e.g., recurrent neural network 840) may make inference results based on data acquired from the sensor 830. For example, in addition to using a RNN for calculating or cancelling self-interference noise, an electronic device 800 may use an RNN to make inference results regarding datasets acquired via a sensor 830 or via a data network 895. Making an inference results may include determining a relationship among one or more datasets, among one or more subsets of a dataset, or among different subsets of various datasets. For example, a determined relationship may be represented as an AI model that the RNN generates. Such a generated AI model may be utilized to make predictions about similar datasets or similar subsets of a dataset, when provided as input to such an AI model. As one skilled in the art can appreciate, various types of inference results may be made by a RNN, which could include generating one or more AI models regarding acquired datasets.

The sensor 830 included in the electronic device 800 may be any sensor configured to detect an environmental condition and quantify a measurement parameter based on that environmental condition. For example, the sensor 830 may be a photodetector that detects light and quantifies an amount or intensity of light that is received or measured at the sensor 830. A device with a sensor 830 may be referred to as a sensor device. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

The electronic device 800 includes a computing system 802, a recurrent neural network 840, an I/O interface 870, and a network interface 890 coupled to a data network 895. The data network 895 may include a network of data devices or systems such as a data center or other electronic devices 800 that facilitate the acquisition of data sets or communicate inference results among devices coupled to the data network 895. For example, the electronic device 800 may communicate inference results about self-interference noise, which are calculated at the recurrent neural network 840, to communicate such inference results to other electronic devices 800 with a similar connection or to a data center where such inference results may be utilized as part of a data set, e.g., for further training in a machine learning or AI system. Accordingly, in implementing the recurrent neural network 840 in the electronic device 800, mobile and sensor devices that operate as the electronic device 800 may facilitate a fast exchange of inference results or large data sets that are communicated to data center for training or inference.

The computing system 802 includes a wireless transceiver 810. The wireless transceiver may include a wireless transmitter and/or wireless receiver, such as wireless transmitter 300 and wireless receiver 400. Recurrent neural network 840 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for device 800.

The computing system 802 includes memory units 850 (e.g., memory look-up unit), which may be non-transitory hardware readable medium including instructions, respectively, for calculating self-interference noise or be memory units for the retrieval, calculation, or storage of data signals to be compensated or adjusted signals based on calculated self-interference noise. The memory units 850 may be utilized to store data sets from machine learning or AI techniques executed by the electronic device 800. The memory units 850 may also be utilized to store, determine, or acquire inference results for machine learning or AI techniques executed by the electronic device 800. In some examples, the memory units 850 may include one or more types of memory, including but not limited to: DRAM, SRAM, NAND, or 3D XPoint memory devices.

The computing system 802 may include control instructions that indicate when to execute such stored instructions for calculating self-interference noise or for the retrieval or storage of data signals to be compensated or adjusted signals based on calculated self-interference noise. Upon receiving such control instructions, the recurrent neural network 840 may execute such control instructions and/or executing such instructions with elements of computing system 802 (e.g., wireless transceiver 810) to perform such instructions. For example, such instructions may include a program that executes the method 700, a program that executes the method 750, or a program that executes both methods 700 and 750. In some implementations, the control instructions include memory instructions for the memory units 850 to interact with the recurrent neural network 840. For example, the computing system 802 may include an instruction that, when executed, facilitates the provision of a read request to the memory units 850 to access (e.g., read) a large dataset to determine an inference result. As another example, the control instructions may include an instruction that, when executed, facilitates the provision of a write request to the memory units 850 to write a data set that the electronic device 800 has acquired, e.g., via the sensor 830 or via the I/O interface 870. Control instructions may also include instructions for the memory units 850 to communicate data sets or inference results to a data center via data network

895. For example, a control instruction may include an instruction that memory units 850 write data sets or inference results about self-interference noise, which are calculated at the recurrent neural network 840, to a cloud server at a data center where such inference results may be utilized as part of a data set, e.g., for further training in a machine learning or AI system or for the processing of communications signals (e.g., to calculate or cancel self-interference noise).

Communications between the recurrent neural network 840, the I/O interface 870, and the network interface 890 are provided via an internal bus 880. The recurrent neural network 840 may receive control instructions from the I/O interface 870 or the network interface 890, such as instructions to calculate or cancel self-interference noise). For example, the I/O interface 870 may facilitate a connection to a camera device that obtain images and communicates such images to the electronic device 800 via the I/O interface 870.

Bus 880 may include one or more physical buses, communication lines/interfaces, and/or point-to-point connections, such as Peripheral Component Interconnect (PCI) bus, a Gen-Z switch, a CCIX interface, or the like. The I/O interface 870 can include various user interfaces including video and/or audio interfaces for the user, such as a tablet display with a microphone. Network interface 890 communications with other electronic devices, such as electronic device 800 or a cloud-electronic server, over the data network 895. For example, the network interface 890 may be a USB interface.

Figure 9:
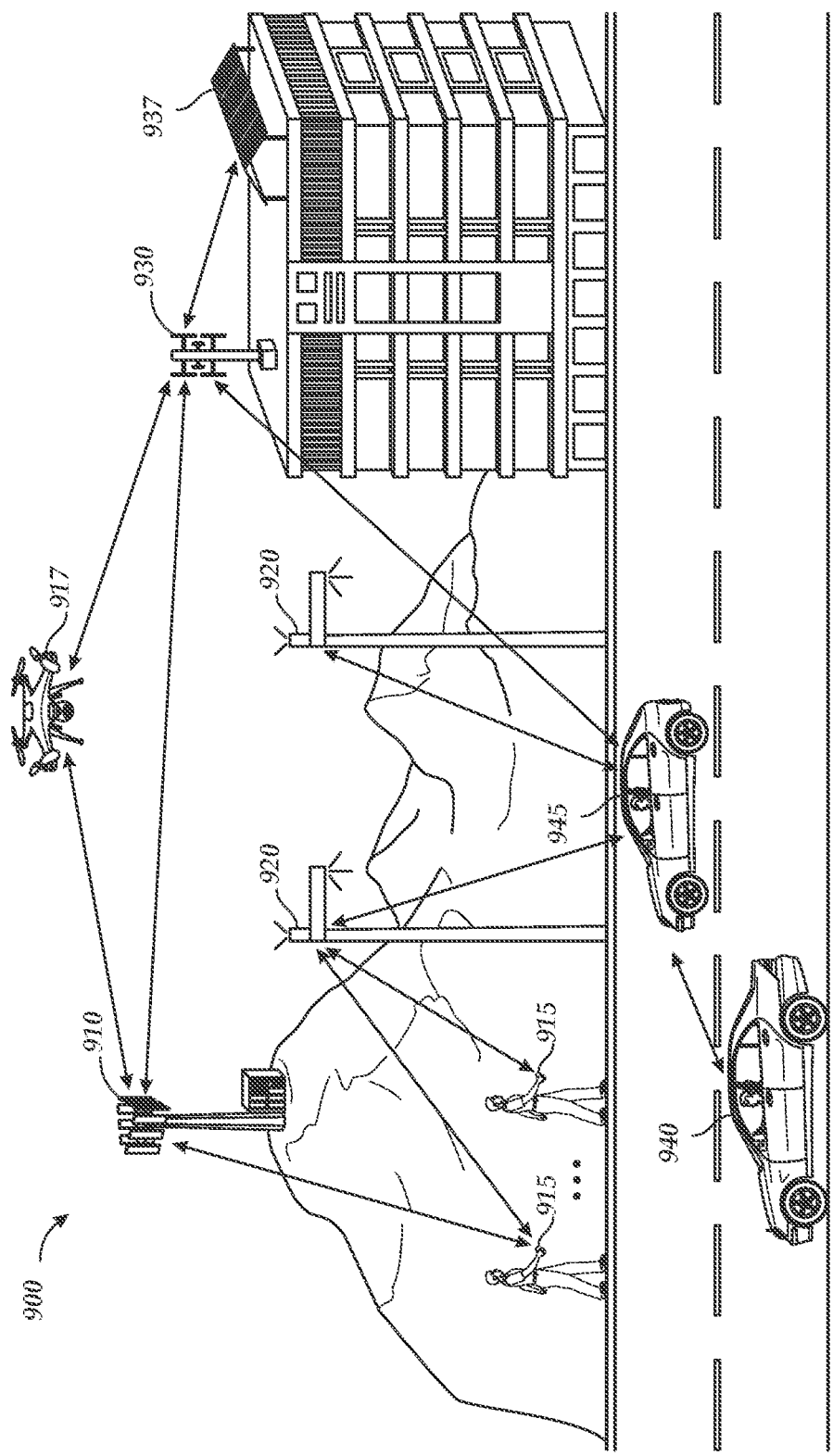
FIG. 9 is a schematic illustration of a wireless communications system arranged in accordance with aspects of the present disclosure.

FIG. 9 illustrates an example of a wireless communications system 900 in accordance with aspects of the present disclosure. The wireless communications system 900 includes a base station 910, a mobile device 915, a drone 917, a small cell 930, and vehicles 940, 945. The base station 910 and small cell 930 may be connected to a network that provides access to the Internet and traditional communication links. The system 900 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), mmWave bands (e.g., 24 GHz), and a NR band (e.g., 3.5 GHz).

The wireless communication system 900 may be implemented as a 5G wireless communication system, having various mobile and sensor endpoints. As an example, the vehicles 940, 945 may be mobile endpoints and the solar cells 937 may be sensor endpoints in the 5G wireless communication system. Continuing in the example, the vehicles 940, 945 and solar cells 937 may collect data sets used for training and inference of machine learning or AI techniques at those respective devices. Accordingly, the system 900 may facilitate the acquisition and communication of data sets or inference results for various devices in the system 900 when implementing such recurrent neural networks as described herein that enable faster training and inference, while also increasing precision of inference results, e.g., including higher-order memory effects in a recurrent neural network 512 of FIGS. 5C-5E. Accordingly, the system 900 may include devices that cancel self-interference noise of one or more devices of the system 900 that are transceiving on both the 4G or 5G bands, for example, such that other devices that may be operating as 5G standalone transceiver systems can communicate with such 4G/5G devices in an efficient and timely manner.

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) (e.g., 1.8 GHz band) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 900 may depict aspects of a radio access network (RAN), and system 900 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 910, communication devices 920, and small cells 930 may be coupled with the core network or with one another, or both, via wired or wireless backhaul links (e.g., S1 interface, X2 interface, etc.).

The system 900 may provide communication links connected to devices or "things," such as sensor devices, e.g., solar cells 937, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 900 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 937, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices.

In such a 5G framework, devices may perform functionalities performed by base stations in other mobile networks (e.g., UMTS or LTE), such as forming a connection or managing mobility operations between nodes (e.g., handoff or reselection). For example, mobile device 915 may receive sensor data from the user utilizing the mobile device 915, such as blood pressure data, and may transmit that sensor data on a narrowband IoT frequency band to base station 910. In such an example, some parameters for the determination by the mobile device 915 may include availability of licensed spectrum, availability of unlicensed spectrum, and/ or time-sensitive nature of sensor data. Continuing in the example, mobile device 915 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 915 may form device-to-device (D2D) connections with other mobile devices or other elements of the system 900. For example, the mobile device 915 may form RFID, WiFi, MultiFire, Bluetooth, or Zigbee connections with other devices, including communication device 920 or vehicle 945. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 915 to provide information (e.g., sensor data) collected on different frequency bands than a frequency band determined by mobile device 915 for transmission of that information.

Moreover, some communication devices may facilitate ad-hoc networks, for example, a network being formed with communication devices 920 attached to stationary objects and the vehicles 940, 945, without a traditional connection to a base station 910 and/or a core network necessarily being formed. Other stationary objects may be used to support communication devices 920, such as, but not limited to, trees, plants, posts, buildings, blimps, dirigibles, balloons, street signs, mailboxes, or combinations thereof. In such a system 900, communication devices 920 and small cell 930 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 915 communicating with base station 910 on a cellular communication band.

The communication devices 920 may form wireless networks, operating in either a hierarchal or ad-hoc network fashion, depending, in part, on the connection to another element of the system 900. For example, the communication devices 920 may utilize a 700 MHz communication frequency to form a connection with the mobile device 915 in an unlicensed spectrum, while utilizing a licensed spectrum communication frequency to form another connection with the vehicle 945. Communication devices 920 may communicate with vehicle 945 on a licensed spectrum to provide direct access for time-sensitive data, for example, data for an autonomous driving capability of the vehicle 945 on a 5.9 GHz band of Dedicated Short Range Communications (DSRC).

Vehicles 940 and 945 may form an ad-hoc network at a different frequency band than the connection between the communication device 920 and the vehicle 945. For example, for a high bandwidth connection to provide time-sensitive data between vehicles 940, 945, a 24 GHz mmWave band may be utilized for transmissions of data between vehicles 940, 945. For example, vehicles 940, 945 may share real-time directional and navigation data with each other over the connection while the vehicles 940, 945 pass each other across a narrow intersection line. Each vehicle 940, 945 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 920 and the vehicle 945, for example, for processing of image data received at both vehicle 945 and vehicle 940, as transmitted by the vehicle 940 to vehicle 945 over the 24 GHz mmWave band. While shown as automobiles in FIG. 9, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 900 in other mmWave bands or other frequency bands, such as 28 GHz, 37 GHz, 38 GHz, 39 GHz, which may be licensed or unlicensed bands. In some cases, vehicles 940, 945 may share the frequency band that they are communicating on with other vehicles in a different network. For example, a fleet of vehicles may pass vehicle 940 and, temporarily, share the 24 GHz mmWave band to form connections among that fleet, in addition to the 24 GHz mmWave connection between vehicles 940, 945. As another example, communication device 920 may substantially simultaneously maintain a 700 MHz connection with the mobile device 915 operated by a user (e.g., a pedestrian walking along the street) to provide information regarding a location of the user to the vehicle 945 over the 5.9 GHz band. In providing such information, communication device 920 may leverage antenna diversity schemes as part of a massive MIMO framework to facilitate time-sensitive, separate connections with both the mobile device 915 and the vehicle 945. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 910 and small cell 930 may wirelessly communicate with devices in the system 900 or other communication-capable devices in the system 900 having at the least a sensor wireless network, such as solar cells 937 that may operate on an active/sleep cycle, and/or one or more other sensor devices. The base station 910 may provide wireless communications coverage for devices that enter its coverages area, such as the mobile device 915 and the drone 917. The small cell 930 may provide wireless communications coverage for devices that enter its coverage area, such as near the building that the small cell 930 is mounted upon, such as vehicle 945 and drone 917.

Generally, a small cell 930 may be referred to as a small cell and provide coverage for a local geographic region, for example, coverage of 200 meters or less in some examples. This may contrasted with at macrocell, which may provide coverage over a wide or large area on the order of several square miles or kilometers. In some examples, a small cell 930 may be deployed (e.g., mounted on a building) within some coverage areas of a base station 910 (e.g., a macrocell) where wireless communications traffic may be dense according to a traffic analysis of that coverage area. For example, a small cell 930 may be deployed on the building in FIG. 9 in the coverage area of the base station 910 if the base station 910 generally receives and/or transmits a higher amount of wireless communication transmissions than other coverage areas of that base station 910. A base station 910 may be deployed in a geographic area to provide wireless coverage for portions of that geographic area. As wireless communications traffic becomes more dense, additional base stations 910 may be deployed in certain areas, which may alter the coverage area of an existing base station 910, or other support stations may be deployed, such as a small cell 930. Small cell 930 may be a femtocell, which may provide coverage for an area smaller than a small cell (e.g., 100 meters or less in some examples (e.g., one story of a building)).

While base station 910 and small cell 930 may provide communication coverage for a portion of the geographical area surrounding their respective areas, both may change aspects of their coverage to facilitate faster wireless connections for certain devices. For example, the small cell 930 may primarily provide coverage for devices surrounding or in the building upon which the small cell 930 is mounted. However, the small cell 930 may also detect that a device has entered is coverage area and adjust its coverage area to facilitate a faster connection to that device.

For example, a small cell 930 may support a massive MIMO connection with the drone 917, which may also be referred to as an unmanned aerial vehicle (UAV), and, when the vehicle 945 enters it coverage area, the small cell 930 adjusts some antennas to point directionally in a direction of the vehicle 945, rather than the drone 917, to facilitate a massive MIMO connection with the vehicle, in addition to the drone 917. In adjusting some of the antennas, the small cell 930 may not support as fast as a connection to the drone 917 at a certain frequency, as it had before the adjustment. For example, the small cell 930 may be communicating with the drone 917 on a first frequency of various possible frequencies in a 4G LTE band of 1.8 GHz. However, the drone 917 may also request a connection at a different frequency with another device (e.g., base station 910) in its coverage area that may facilitate a similar connection as described with reference to the small cell 930, or a different (e.g., faster, more reliable) connection with the base station 910, for example, at a 3.5 GHz frequency in the 5G NR band. Accordingly, the system 900 may enhance existing communication links in providing additional connections to devices that may utilize or demand such links, while also compensating for any self-interference noise generated by the drone 917 in transmitting, for example, in both the 4GE LTE and 5G NR bands. In some examples, drone 917 may serve as a movable or aerial base station.

The wireless communications system 900 may include devices such as base station 910, communication device 920, and small cell 930 that may support several connections at varying frequencies to devices in the system 900, while also compensating for self-interference noise utilizing recurrent neural networks, such as recurrent neural network 170. Such devices may operate in a hierarchal mode or an ad-hoc mode with other devices in the network of system 900. While described in the context of a base station 910, communication device 920, and small cell 930, it can be appreciated that other devices that can support several connections with devices in the network, while also compensating for self-interference noise utilizing recurrent neural networks, may be included in system 900, including but not limited to: macrocells, femtocells, routers, satellites, and RFID detectors.

In various examples, the elements of wireless communication system 900, such as base station 910, a mobile device 915, a drone 917, communication device 920 a small cell 930, and vehicles 940, 945, may be implemented as an electronic device described herein that compensate for self-interference noise utilizing recurrent neural networks. For example, the communication device 920 may be implemented as electronic devices described herein, such as electronic device 102, 110 of FIG. 1, electronic device 110 in FIG. 2A, electronic device 270 of FIG. 2B, electronic device 610 of FIG. 6A, electronic device 655 of FIG. 6B, electronic device 800 of FIG. 8, or any system or combination of the systems depicted in the FIG. 1-2, 5A-5E, 6A-6B, or 8 described herein. Accordingly, any of the devices of system 900 may transceive signals on both 4G and 5G bands; while also compensating for self-interference noise utilizing recurrent neural networks.

Figure 10:
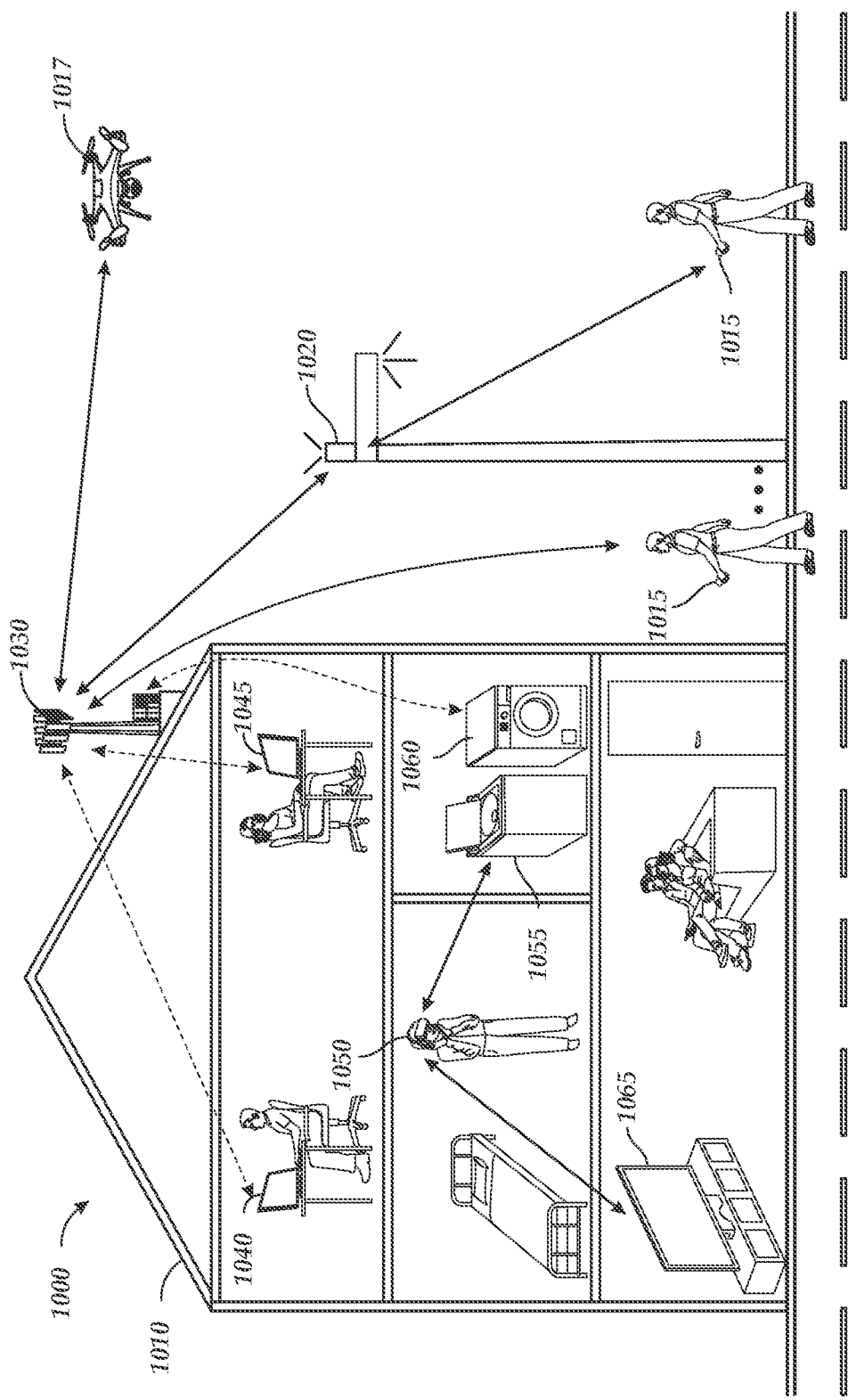
FIG. 10 is a schematic illustration of a wireless communications system arranged in accordance with aspects of the present disclosure.

FIG. 10 illustrates an example of a wireless communications system 1000 in accordance with aspects of the present disclosure. The wireless communications system 1000 includes a mobile device 1015, a drone 1017, a communication device 1020, and a small cell 1030. A building 1010 also includes devices of the wireless communication system 1000 that may be configured to communicate with other elements in the building 1010 or the small cell 1030. The building 1010 includes networked workstations 1040, 1045, virtual reality device 1050, IoT devices 1055, 1060, and networked entertainment device 1065. In the depicted system 1000, IoT devices 1055, 1060 may be a washer and dryer, respectively, for residential use, being controlled by the virtual reality device 1050. Accordingly, while the user of the virtual reality device 1050 may be in different room of the building 1010, the user may control an operation of the IoT device 1055, such as configuring a washing machine setting. Virtual reality device 1050 may also control the networked entertainment device 1065. For example, virtual reality device 1050 may broadcast a virtual game being played by a user of the virtual reality device 1050 onto a display of the networked entertainment device 1065.

The small cell 1030 or any of the devices of building 1010 may be connected to a network that provides access to the Internet and traditional communication links. Like the system 900, the system 1000 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 900. System 1000 may operate and be configured to communicate analogously to system 900. Accordingly, similarly numbered elements of system 1000 and system 900 may be configured in an analogous way, such as communication device 920 to communication device 1020, small cell 930 to small cell 1030, etc.

Like the system 900, where elements of system 900 are configured to form independent hierarchal or ad-hoc networks, communication device 1020 may form a hierarchal network with small cell 1030 and mobile device 1015, while an additional ad-hoc network may be formed among the small cell 1030 network that includes drone 1017 and some of the devices of the building 1010, such as networked workstations 1040, 1045 and IoT devices 1055, 1060.

Devices in communication system 1000 may also form (D2D) connections with other mobile devices or other elements of the system 1000. For example, the virtual reality device 1050 may form a narrowband IoT connections with other devices, including IoT device 1055 and networked entertainment device 1065. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 1050.

In various examples, the elements of wireless communication system 1000, such as the mobile device 1015, the drone 1017, the communication device 1020, and the small cell 1030, the networked workstations 1040, 1045, the virtual reality device 1050, the IoT devices 1055, 1060, and the networked entertainment device 1065, may be implemented as electronic devices described herein that compensate for self-interference noise utilizing recurrent neural networks. For example, the communication device 1020 may be implemented as electronic devices described herein, such as electronic device 102, 110 of FIG. 1, electronic device 110 in FIG. 2A, electronic device 270 of FIG. 2B, electronic device 610 of FIG. 6A, electronic device 655 of FIG. 6B, electronic device 800 of FIG. 8, or any system or combination of the systems depicted in the FIG. 1-2, 5A-5E, 6A-6B, or 8 described herein. Accordingly, any of the devices of system 1000 may transceive signals on both 4G and 5G bands; while also compensating for self-interference noise utilizing recurrent neural networks.

The wireless communication system 1000 may also be implemented as a 5G wireless communication system, having various mobile or other electronic device endpoints. As an example, the mobile devices 1015 may be mobile endpoints and the networked entertainment device 1065 may include a camera (e.g., via an I/O interface 870) in the 5G wireless communication system. Continuing in the example, mobile device 1015 may collect data sets used for training and inference of machine learning or AI techniques at that respective device, e.g., a direction of travel to the building 1010 where networked entertainment device 1065 is located. Using such data sets in AI technique, the wireless communication system 1000 may determine inference results, such as a prediction of the user of mobile device 1015 to arrive at the building 1010 where the networked entertainment device 1065 is located. Moreover, the networked entertainment device 1065 may acquire images of users (e.g., as a dataset) interacting with the networked entertainment device 1065 to determine inference results about the content displayed on networked entertainment device 1065. For example, an inference result may be that the users interacting with the networked entertainment device 1065 would like to interact with additional similar content. Using both inference results, the system 1000 can facilitate predictions about users of one or more devices in system 1000. Such a combined, inference result may include a subset of the inference results of each respective device. Continuing in the example, either the mobile device 1015 or networked entertainment device 1065 can determine a combined, inference results, such as that the user to arrive at the building 1010 where the networked entertainment device 1065 is located may be interested in interacting with additional similar content to that of users of networked entertainment device 1065 interacting with certain content displayed on networked entertainment device 1065.

Therefore, the system 1000 may facilitate the acquisition and communication of data sets or inference results for various devices in the system 1000 when implementing such recurrent neural networks as described herein that enable faster training and inference, while also increasing precision of inference results, e.g., including higher-order memory effects in a recurrent neural network 512 of FIGS. 5C-5E. Accordingly, the system 1000 may include devices that cancel self-interference noise of one or more devices of the system 1000 that are transceiving on both the 4G or 5G bands, for example, such that other devices that may be operating as 5G standalone transceiver systems can communicate with such 4G/5G devices in an efficient and timely manner. In various implementations of system 1000, the devices displayed on or in the building 1010 may be referred to as "smart home" 5G devices that acquire data sets and determine inference results regarding content or users interacting with those devices. For example, the "smart home" 5G devices may include the networked workstations 1040, 1045, virtual reality device 1050, IoT devices 1055, 1060, and networked entertainment device 1065.

Figure 11:
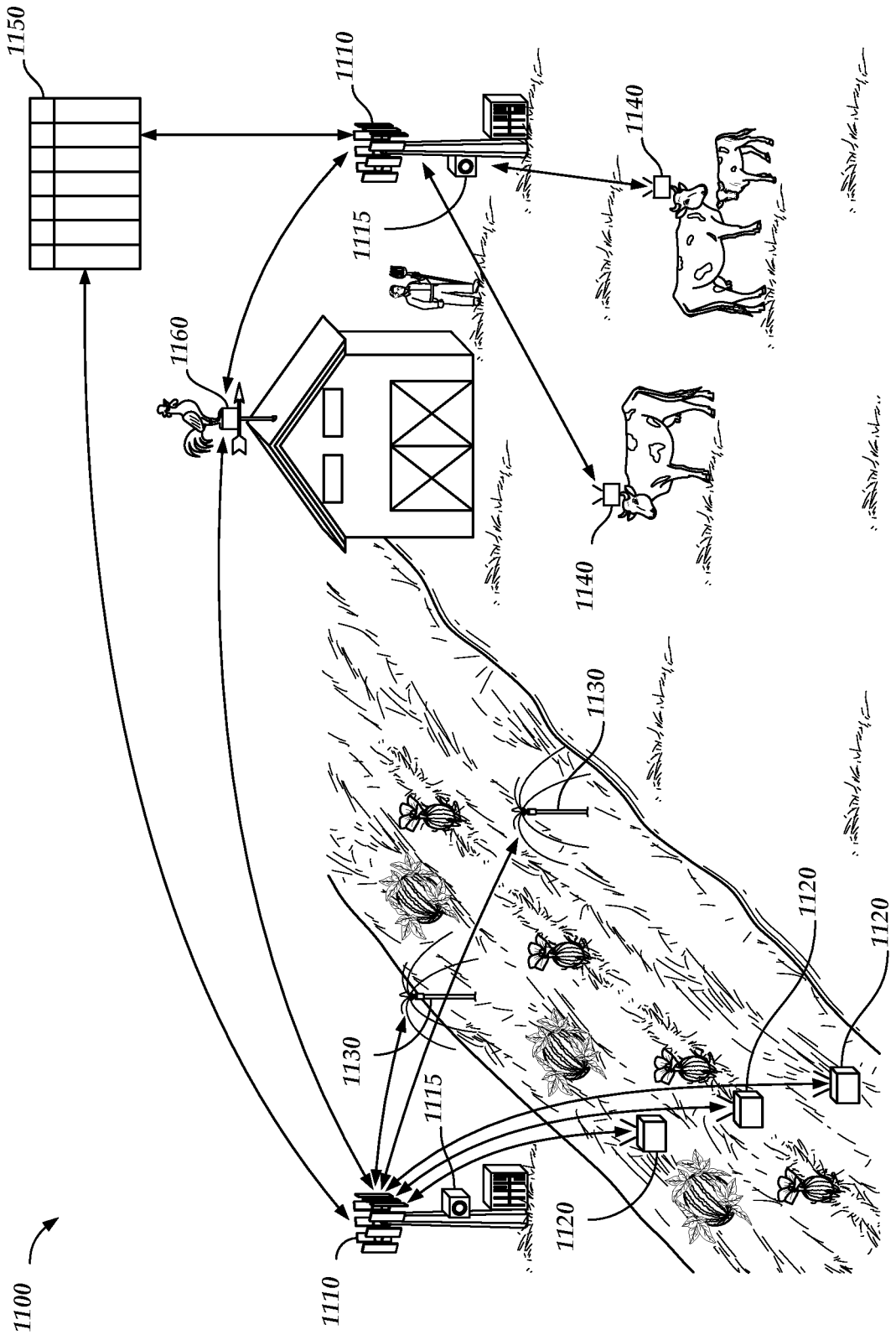
FIG. 11 is a schematic illustration of a wireless communications system arranged in accordance with aspects of the present disclosure.

FIG. 11 illustrates an example of a wireless communication system 1100 in accordance with aspects of the present disclosure. The wireless communication system 1100 includes small cells 1110, camera devices 1115, communication devices 1120, sensor devices 1130, communication devices 1140, data center 1150, and sensor device 1160. In the depicted system 1100, a small cell 1110 may form a hierarchal network, for an agricultural use, with a camera device 1115, communication devices 1120, sensor devices 1130, and sensor device 1160. Such a network formed by small cell 1110 may communicate data sets and inference results among the networked devices and the data center 1150. Continuing in the depicted system 1100, another small cell 1110 may form another hierarchal network, for another agricultural use, with communication devices 1140, data center 1150, and sensor device 1160. Similarly, such a network formed by the additional small cell 1110 may communicate data sets and inference results among the networked devices and the data center 1150. While depicted in certain agricultural networks with particular small cells 1110, it can be appreciated that various networks, whether hierarchal or ad-hoc, may be formed among the devices, cells, or data center of wireless communication system 1100. Additionally or alternatively, like the system 900 or system 1000, it can be appreciated that similarly-named elements of system 1100 may be configured in an analogous way, such as communication device 920 to communication device 1120, communication device 1020 to communication device 1140, or small cell 930 to small cell 1110, etc.

Like the system 1000, devices in system 1100 may also D2D connections with other mobile devices or other elements of the system 1000. For example, the communication device 1140 may form a narrowband IoT connections with other devices, including sensor device 1160 or communication device 1120. As described above, in some examples, D2D connections may be made using licensed spectrum bands, and such connections may be managed by a cellular network or service provider, e.g., a cellular network or service provider of small cell 1110. Accordingly, while the above example was described in the context of a narrowband IoT, it can be appreciated that other device-to-device connections may be utilized by the devices of system 1100.

In various examples, the elements of wireless communication system 1100, such as the camera device 1115, communication devices 1120, sensor devices 1130, communication devices 1140, sensor device 1160, may be implemented as electronic devices described herein that compensate for self-interference noise utilizing recurrent neural networks. For example, the sensor device 1160 may be implemented as electronic devices described herein, such as electronic device 102, 110 of FIG. 1, electronic device 110 in FIG. 2A, electronic device 270 of FIG. 2B, electronic device 610 of FIG. 6A, electronic device 655 of FIG. 6B, electronic device 800 of FIG. 8, or any system or combination of the systems depicted in the FIG. 1-2, 5A-5E, 6A-6B, or 8 described herein. Accordingly, any of the devices of system 1100 may transceive signals on both 4G and 5G bands; while also compensating for self-interference noise utilizing recurrent neural networks.

The wireless communication system 1100 may also be implemented as a 5G wireless communication system, having various mobile or other electronic device endpoints. As an example, the camera device 1115, including a camera (e.g., via an I/O interface 870) may be a mobile endpoint; and communication devices 1120 and sensor devices 1130 may be sensor endpoints in a 5G wireless communication system. Continuing in the example, the camera device 1115 may collect data sets used for training and inference of machine learning or AI techniques at that respective device, e.g., images of watermelons in an agricultural field. Such image data sets may be acquired by the camera device and stored in a memory of the camera device 1115 (e.g., such as memory units 850) to communicate the data sets to the data center 1150 for training or processing inference results based on the image data sets. Using such data sets in an AI technique, the wireless communication system 1100 may determine inference results, such as a prediction of a growth rate of the watermelons based on various stages of growth for different watermelons in the agricultural field, e.g., a full-grown watermelon or an intermediate growth of a watermelon as indicated by a watermelon flower on the watermelon. For example, the data center 1150 may make inference results using a recurrent neural network 840 on a cloud server implementing the electronic device 800, to provide such inference results for use in the wireless communication system 1100.

Continuing in the example of the 5G communication system processing inference results with mobile and/or sensor endpoints, the communication devices 1120 may communicate data sets to the data center 1150 via the small cell 1110. For example, the communication devices 1120 may acquire data sets about a parameter of the soil of the agricultural field in which the watermelons are growing via a sensor included on the respective communication device 1120 (e.g., a sensor 830). Such parameterized data sets may also be stored at the communication device 1120 or communicated to the data center 1150 for further training or processing of inference results using ML or AI techniques. While a status of the agricultural field has been described with respect to the example of acquiring data sets about a parameter of the field, it can be appreciated that various data sets about a status of the agricultural field can be acquired, depending on sensors utilized by a communication device 1120 to measure parameters of the agricultural field.

In some implementations, the communication device 1120 may make inference results at the communication device 1120 itself. In such implementations, the communication device 1120 may acquire certain parameterized data sets regarding the soil and make inference results using a recurrent neural network 840 on the communication device 1120 itself. The inference result may be a recommendation regarding an amount of water for the soil of the agricultural field. Based on such an inference result, the communication device 1120 may be further configured to communicate that inference result to another device along with a control instruction for that device. Continuing in the example, the communication device 1120 may obtain such an inference result and generate an instruction for sensor device 1130 to increase or decrease an amount of water according to the inference result. Accordingly, inference results may be processed at devices of system 1100 or at the data center 1150 based on data sets acquired by the various devices of system 1100.

Continuing in the example of the 5G communication system processing inference results with mobile and/or sensor endpoints, the sensor device 1130 may communicate data sets to the data center 1150 via the small cell 1110. For example, the sensor device 1130 may acquire data sets about water usage in the agricultural field in which the watermelons are growing because the sensor device is sprinkler implemented as an electronic device as described herein, such as electronic device 800. For example, the sensor device 1130 may include a sensor 830 that measures water usage, such as a water gauge. Accordingly, the sensor device 1130 may acquire a data set regarding the water usage to be stored at memory units 850 or communicated to a data center 1150 for processing of inference results. Such parameterized data sets may also be stored at the communication device 1120 or communicated to the data center 1150 for further training or processing of inference results using ML or AI techniques. While a status of water usage has been described with respect to the example of a sprinkler and a water gauge, it can be appreciated that various data sets about a status of the water usage can be acquired, depending on sensors utilized by a sensor device 1120 to acquire data sets about water usage.

Additionally or alternatively in the example of the 5G communication system processing inference results, the sensor device 1160 may communicate data sets or make inference results for use by one of the other devices of the system 1100 or the data center 1150. For example, the sensor device 1160 can acquire a dataset regarding a windspeed or other environmental condition of the agricultural setting of system 1100. In the example, the sensor device 1160 may implement the electronic device having a sensor 830 as an anemometer. Accordingly, in the example the sensor 830 may acquire a windspeed and store a data set regarding that wind speed in one or more memory units 850. In some implementations, the sensor device 1160 may utilize the recurrent neural network 840 to make inference results regarding the data set stored in the memory units 850. For example, an inference result may be that a certain wind speed in a particular direction is indicative of precipitation. Accordingly, that inference results may be communicated in a 5G transmission, including while other signals are communicated on a 4G band at the sensor device 1160 or small cell 1110, to the small cell 1110.

In some implementations, the small cell 1110 may further route such an inference result to various devices or the data center 1150. Continuing in the example, the inference result from the sensor device 1160 may be utilized by the sensor devices 1130 to adjust a water usage in the agricultural field. In such a case, the sensor devices 1130 may process the inference results from the sensor device 1130 at a recurrent neural network(s) 840 of the respective sensor devices 1130 to adjust the water usage in the agricultural field growing watermelons based on the inference result that a certain wind speed in a particular direction is indicative of precipitation. Accordingly, advantageously, the system 1100, in acquiring data sets and processing inference results at respective recurrent neural networks 840, may provide a sustainability advantage in conserving certain natural resources that the devices of system 1100 may interact with, such as the sensor devices 1130 interacting with a water natural resource. Using such inference results, the system 1100 can facilitate predictions about natural resources utilized by the agricultural field devices in system 1100.

As another example of the wireless communication systems 1100 implementing a 5G wireless communication system, having various mobile or other electronic device endpoints, another camera device 1115, including a camera (e.g., via an I/O interface 870) and communication devices 1140 attached to certain agricultural livestock (e.g., cows as depicted in FIG. 11) may be additional mobile endpoints; and sensor device 1160 may be a sensor endpoint in a 5G wireless communication system. In the example, the communication devices 1140 may be implemented as certain narrowband IoT devices that may utilize less energy, resulting in power-efficiency and may utilize less complex signaling frameworks, such that devices may transmit asynchronously on particular bands. The I/O interface 870 of the communication devices may be coupled to a Global Positioning System (GPS) device that provides a location of the communication devices 1140 attached to certain agricultural livestock. The respective communication devices 1140 may acquire respective location data sets that track the movement of the livestock in an agricultural field. Advantageously, the communication devices 1140 may provide such data sets to other devices in the system 1100, such as the data center 1150, for further processing of inference results regarding the respective location data sets. Such data sets may be communicated, from the respective communication devices 1140, in a 5G transmission; while other signals are communicated on a 4G band at the communication devices 1140 or small cell 1110, to the small cell 1110.

Continuing in the example, the camera device 1115 may also acquire images of the livestock with the communication devices 1140 attached thereto, for further processing of inference results with the respective location datasets. In an example, the image data sets acquired by the camera device 1115 and the location data sets acquired by the communication devices 1140 may be communicated to the data center 1150 via the small cell 1110. Accordingly, the data center 1150 may make an inference result based on the image and location data sets. For example, a recurrent neural network 840 on a cloud server, implemented as electronic device 800 at the data center 1150, may make an inference result that predicts when the livestock are to be removed from the agricultural field due to a consumption of a natural resource. The inference result may be based on the condition of the agricultural field based on images from the image data set and the temporal location of the livestock indicative of how long the livestock have consumed a particular natural resource (e.g., grass) based on the location data set. In some examples, the cloud server at the data center 1150 (or another cloud server at the data center 1150) may further process that inference result with an additional data set, such as a data set regarding the wind speed acquired by the sensor device 1160, to further process that inference result with an inference result regarding a precipitation prediction based on a certain wind speed in a particular direction. Accordingly, multiple inference results may be processed at the data center 1150 based on various data sets that the devices of system 1100 acquire.

Therefore, the system 1100 may facilitate the acquisition and communication of data sets or inference results for various devices in the system 1100 when implementing such recurrent neural networks as described herein that enable high-capacity training and inference, while also increasing precision of inference results, e.g., including higher-order memory effects in a recurrent neural network 512 of FIGS. 5C-5E. For example, various devices of system 1100 may facilitate processing of data acquired, e.g., to efficiently offload such data to data center 1150 for AI or machine learning (ML) techniques to be applied. Accordingly, the system 1100 may include devices that cancel self-interference noise of one or more devices of the system 1100 that are transceiving on both the 4G or 5G bands, for example, such that other devices that may be operating as 5G stand-alone transceiver systems can communicate with such 4G/5G devices in an efficient and timely manner.

Figure 12:
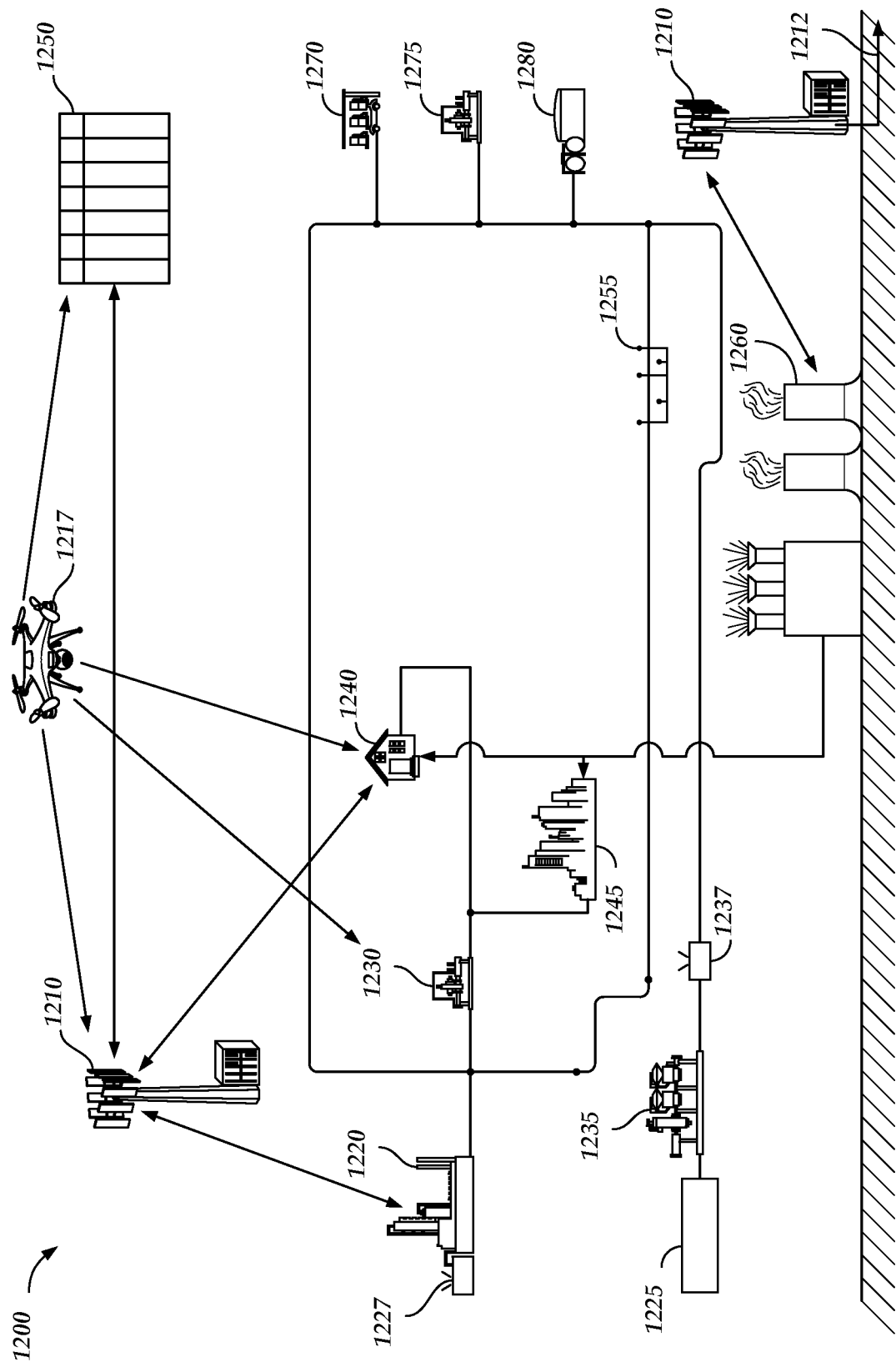
FIG. 12 is a schematic illustration of a communications system arranged in accordance with aspects of the present disclosure.

FIG. 12 illustrates an example of a communication system 1200 in accordance with aspects of the present disclosure. The communication system 1200 includes small cells 1210, wired communication link 1212, drone 1217, industrial user 1220, industrial communication device 1227, substation 1230, industrial pipeline 1225, pipeline receiving station 1235, pipeline communication device 1237, residential user 1240, commercial user 1245, data center 1250, sensor device 1255, power generation user 1260, fuel station 1270, substation 1275, and fuel storage 1280.

In the depicted communication system 1200, small cells 1210 may form a hierarchal network to provide a status of the fuel for various users of the industrial pipeline system, thereby facilitating fuel transmission, distribution, storage, or power generation based on distributed fuel. The fuel may be various types of gas or oil, for example, crude oil, diesel gas, hydrogen gas, or natural gas. The fuel may be provided and utilized by an industrial user 1220, substation 1230 or substation 1275, residential user 1240, commercial user 1245, or fuel station 1270. Various statuses regarding the fuel may be provided to small cells 1210, drone 1217, data center 1250, or wired communication link 1212 by the various communication devices in such an industrial communication system 1200. For example, industrial communication device 1227, pipeline communication device 1237, or sensor device 1255 may provide a status as to a flow of the fuel through the pipeline network depicted in FIG. 12. Additionally or alternatively, the fuel may be provided through the pipeline network for use in power generation at power generation user 1260 or for storage at fuel storage 1280. The fuel is provided to the pipeline network by industrial pipeline 1225 at pipeline receiving station 1235.

As fuel flows through the pipeline network, industrial communication device 1227, pipeline communication device 1237, or sensor device 1255 may be implemented as electronic devices 800 with sensors 830 or I/O interfaces 870 coupled to various I/O devices to receive data input as to a status of the fuel. Accordingly, data sets regarding the fuel may be acquired by the industrial communication device 1227, pipeline communication device 1237, or sensor device 1255 for further processing of inference results regarding a status of the fuel. For example, the pipeline communication device 1237 may communicate via a 5G communications signal a status indicative of power consumption at various users of the pipeline network, such as industrial user 1220, residential user 1240, or commercial user 1245. As another example, substation 1230 or substation 1275 may provide a power generation status as to power generated by elements of pipeline network coupled to the substations 1230 or substation 1275. Accordingly, substation 1230 may provide a power generation status of industrial user 1220; and substation 1275 may provide a power generation status as power generation user 1260. Such various statuses may be provided to the data center 1250 via drone 1217 or small cells 1210 communicating with devices located at the respective users of the pipeline network or devices located at the substations 1230 or 1275. In the implementation of system 1200, a fuel storage status may also be provided to the data center 1250 by the fuel storage 1280.

While system 1200 is depicted in a particular pipeline network system, it can be appreciated that various networks, whether hierarchal or ad-hoc, may be formed among the devices, cells, or data center 1250 of wireless communication system 1200. Additionally or alternatively, like the system 900, system 1000, system 1100, it can be appreciated that similarly-named elements of system 1200 may be configured in an analogous way, such as communication device 920 to pipeline communication device 1237, drone 917 to drone 1217, or small cell 930 to small cell 1210, etc.

Like the system 1100, devices in system 1200 may also D2D connections with other mobile devices or other elements of the system 1200. For example, the pipeline communication device 1237 may form a narrowband IoT connections with other devices, including industrial communication device 1227 or sensor device 1255. As described above, in some examples, D2D connections may be made using licensed spectrum bands, and such connections may be managed by a cellular network or service provider, e.g., a cellular network or service provider of small cell 1210. Accordingly, while the above example was described in the context of a narrowband IoT, it can be appreciated that other device-to-device connections may be utilized by the devices of system 1200.

In various examples, the elements of wireless communication system 1200, such as the industrial communication device 1227, pipeline communication device 1237, or sensor device 1255, may be implemented as electronic devices described herein that compensate for self-interference noise utilizing recurrent neural networks. For example, the sensor device 1255 may be implemented as electronic devices described herein, such as electronic device 102, 110 of FIG. 1, electronic device 110 in FIG. 2A, electronic device 270 of FIG. 2B, electronic device 610 of FIG. 6A, electronic device 655 of FIG. 6B, electronic device 800 of FIG. 8, or any system or combination of the systems depicted in the FIG. 1-2, 5A-5E, 6A-6B, or 8 described herein. Accordingly, any of the devices of system 1200 may transceive signals on both 4G and 5G bands; while also compensating for self-interference noise utilizing recurrent neural networks.

In an example of processing industrially-acquired data sets of the system 1200, the devices of system 1200, such as industrial communication device 1227, pipeline communication device 1237, or sensor device 1255, and users of system 1200 may communicate, via communicated 5G signals, data sets regarding a status of the fuel, power consumption, or power generation, to the data center 1250 for further processing of inference results. In an example, a fuel flow status at sensor device 1255 may be communicated to the data center 1250 via the small cell 1210. As another example, a power consumption status of residential user 1240 may be communicated via a 5G communications signal to the data center 1250 via small cell 1210 or drone 1217. As yet another example, a power generation status may be communicated via a 5G communications signal to the small cell 1210 from power generation user 1260, and then further communicated to the data center 1250 via a wired communication link 1212. Accordingly, the data center 1250 may acquire data sets from various communication devices or users of system 1200. The data center may process one or more inference results based on such acquired data sets. For example, a recurrent neural network 840 on a cloud server, implemented as electronic device 800 at the data center 1250, may make an inference result that predicts when a fuel shortage or surplus may occur based on a power consumption status at various users of the system 1200 and a fuel flow status received from pipeline communication device 1237 detecting a fuel flow from pipeline 1225 via pipeline receiving station 1235. In some examples, the cloud server at the data center 1250 (or another cloud server at the data center 1250) may further process that inference result with one or more additional data sets, to further process that inference result with one or more other inference results. Accordingly, multiple inference results may be processed at the data center 1250 based on various data sets that the devices of system 1200 acquire. Therefore, the devices of system 1200 may facilitate processing of data acquired, e.g., to efficiently offload such data to data center 1250 for AI or machine learning (ML) techniques to be applied.

Accordingly, the system 1200 may facilitate the acquisition and communication of data sets or inference results for various devices in the system 1200 when implementing such recurrent neural networks as described herein that enable higher-capacity training and inference, while also increasing precision of inference results, e.g., including higher-order memory effects in a recurrent neural network 512 of FIGS. 5C-5E. Accordingly, the system 1200 may include devices that cancel self-interference noise of one or more devices of the system 1200 that are transceiving on both the 4G or 5G bands, for example, such that other devices that may be operating as 5G standalone transceiver systems can communicate with such 4G/5G devices in an efficient and timely manner.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
    a plurality of antennas including a first antenna configured to transmit at a first frequency;
    a plurality of wireless transceivers configured to transmit signals and receive signals to antennas of the plurality of antennas; and
    a plurality of layers of multiplication/accumulation units (MAC units), including:
        a first layer configured to mix a plurality of signals as input data and delayed versions of respective outputs of the first layer of MAC units using a plurality of coefficients to generate first intermediate processing results; and
        additional layers of MAC units of the plurality of layers of MAC units, each additional layer of MAC units configured to mix the first intermediate processing results and delayed versions of respective outputs of the respective additional layer of MAC units using additional coefficients of the plurality of coefficients to generate second intermediate processing results,
    wherein a recurrent neural network (RNN) is configured to provide a plurality of adjusted signals as output data, the output data based partly on the second intermediate processing results.

2. The apparatus of claim 1, further comprising a plurality of memory look-up units (MLUs) configured to store and provide respective the first or second intermediate processing results, wherein a portion of the plurality of memory look up units configured to provide output data according to the input data being mixed using the plurality of coefficients.

3. The apparatus of claim 2, further comprising a plurality of delay units configured to provide the delayed versions of the respective outputs of the first layer of MAC units based on the first or second intermediate processing results provided by respective MLUs of the plurality of MLUs.

4. The apparatus of claim 1, wherein the RNN is configured for compensation of an interfering harmonic frequency of the first frequency.

5. The apparatus of claim 1, wherein the plurality of antennas further includes a second antenna configured to transmit at a second frequency, and wherein the interfering harmonic frequency of the first frequency is based on a difference of the second frequency and the first frequency.

6. The apparatus of claim 1, wherein a number of the additional layers of MAC units is associated with a number of the plurality of antennas.

7. An apparatus comprising:
a plurality of antennas including an antenna configured to transmit at a frequency;
a plurality of wireless transceivers configured to transmit signals and receive signals to antennas of the plurality of antennas;
a plurality of layers of multiplication/accumulation units (MAC units), including:
a first layer configured to mix a plurality of signals as input data and delayed versions of respective outputs of the first layer of MAC units using a plurality of coefficients to generate first intermediate processing results; and
additional layers of MAC units of the plurality of layers of MAC units, each additional layer of MAC units configured to mix the first intermediate processing results and delayed versions of respective outputs of the respective additional layer of MAC units using additional coefficients of the plurality of coefficients to generate second intermediate processing results; and
a plurality of delay units configured to provide the delayed versions of the respective outputs of the first layer of MAC units based on the first or second intermediate processing results.

8. The apparatus of claim 7, further comprising a plurality of memory look-up units (MLUs) configured to store and provide respective the first or second intermediate processing results to the plurality of delay units, wherein a portion of the plurality of memory look up units configured to provide output data according to the input data being mixed using the plurality of coefficients.

9. The apparatus of claim 7, wherein a recurrent neural network (RNN) is configured to provide a plurality of adjusted signals as output data, the output data based partly on the second intermediate processing results.

10. The apparatus of claim 9, wherein the RNN is configured for compensation of an interfering harmonic frequency of the frequency.

11. The apparatus of claim 7, wherein:
the antenna is a first antenna and the frequency is a first frequency; and
the plurality of antennas further includes a second antenna configured to transmit at a second frequency, and wherein the interfering harmonic frequency of the first frequency is based on a difference between the second frequency and the first frequency.

12. The apparatus of claim 7, wherein a number of the additional layers of MAC units correlates with a number of the plurality of antennas.

13. The apparatus of claim 12, wherein the RNN further comprises a plurality of processing units configured for bit manipulation and configured to receive the respective amplified signal.

14. The apparatus of claim 13, further comprising a plurality of delay units, each delay unit associated with a respective MAC unit of the plurality of MAC units and configured to provide the delayed versions of respective outputs of the plurality of MAC units based on a portion of the respective noise processing results provided by respective MLUs of the plurality of MLUs.

15. The apparatus of claim 12, further comprising a plurality of memory look-up units (MLUs) configured to store and provide respective noise processing results, wherein a portion of the plurality of the MLUs configured to provide output data based on the respective amplified signals being mixed using a plurality of coefficients.

16. The apparatus of claim 12, wherein a first power amplifier of the plurality of power amplifiers is configured to amplify a first signal associated with a first frequency and to generate a first amplified signal comprising first amplifier noise associated with the first frequency, and wherein a second power amplifier of the plurality of power amplifiers is configured to amplify a second signal associated with a second frequency and to generate a second amplified signal comprising second amplifier noise associated with the second frequency.

17. The apparatus of claim 12, wherein the apparatus implements an Internet-of-Things (IoT) smart home device, an IoT agricultural device or an IoT industrial device.

18. An apparatus comprising:
a plurality of power amplifiers configured to amplify signals as respective amplified signals;
a plurality of antennas, each antenna configured to transmit a respective amplified signal; and
a recurrent neural network (RNN) coupled to each antenna of the plurality of antennas, the RNN including a plurality of multiplication/accumulation (MAC) units, each MAC unit configured to generate a plurality of noise processing results based on the respective amplified signal and a delayed version of at least one of the plurality of noise processing results, each MAC unit further configured to generate a respective adjustment signal of a plurality of adjustment signals based on each noise processing result.

* * * * *